(12) United States Patent
Frank et al.

(10) Patent No.: US 11,762,917 B2
(45) Date of Patent: *Sep. 19, 2023

(54) DATA STRUCTURE VISUALIZATION AND MANAGEMENT FOR REAL-TIME DATA

(71) Applicant: Viralocity Software, LLC, Laguna Hills, CA (US)

(72) Inventors: Linda A Frank, Mission Viejo, CA (US); Mark F. Moussa, Mission Viejo, CA (US)

(73) Assignee: Viralocity Software, LLC, Laguna Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/151,373

(22) Filed: Jan. 6, 2023

(65) Prior Publication Data

US 2023/0153362 A1  May 18, 2023

Related U.S. Application Data

(63) Continuation of application No. 17/003,861, filed on Aug. 26, 2020, now abandoned, which is a (Continued)

(51) Int. Cl.
*G06F 16/904* (2019.01)
*G06Q 10/109* (2023.01)
*G06F 16/901* (2019.01)

(52) U.S. Cl.
CPC .......... *G06F 16/904* (2019.01); *G06F 16/901* (2019.01); *G06Q 10/109* (2013.01)

(58) Field of Classification Search
CPC .... G06F 16/901; G06F 16/904; G06Q 10/109
(Continued)

(56) References Cited

U.S. PATENT DOCUMENTS

2009/0083365 A1* 3/2009 Feldman ................ G06Q 30/02
709/201
2009/0100332 A1* 4/2009 Kanjilal ............... G06Q 10/109
715/234

(Continued)

OTHER PUBLICATIONS

Facebook Finds A Friend in Windows Mobile; Windows Mobile's social networking app is the first to let users to upload videos to Facebook directly and tightly integrates with a phone's contacts and calendar data. InformationWeek: NA. United Business Media LLC. (May 8, 2009).*

(Continued)

*Primary Examiner* — Timothy Padot
(74) *Attorney, Agent, or Firm* — Kasha Law LLC; John R. Kasha; Kelly L. Kasha

(57) ABSTRACT

Techniques and architectures for managing one or more data structures and/or distributing real-time data associated with the one or more data structures are discussed herein. For example, the techniques and architectures may implement data structures to manage data associated with one or more data-streaming events. The techniques and architectures may provide visualizations to view aspects of the data structures, the one or more data-streaming events, and/or other data associated with the data structures. The techniques and architectures may also facilitate control access to the data structures and/or data associated therewith.

11 Claims, 40 Drawing Sheets

Related U.S. Application Data continuation-in-part of application No. 15/909,455, filed on Mar. 1, 2018, now Pat. No. 10,762,474, which is a continuation-in-part of application No. 14/995,200, filed on Jan. 14, 2016, now abandoned.

(60) Provisional application No. 62/992,803, filed on Mar. 20, 2020, provisional application No. 62/465,244, filed on Mar. 1, 2017, provisional application No. 62/103,508, filed on Jan. 14, 2015.

(58) Field of Classification Search
USPC .......................................................... 707/746
See application file for complete search history.

(56) References Cited

U.S. PATENT DOCUMENTS

| | | | | |
|---|---|---|---|---|
| 2009/0158200 | A1* | 6/2009 | Palahnuk | G06Q 30/00 715/781 |
| 2011/0071878 | A1* | 3/2011 | Gingras | G06Q 10/1093 705/7.18 |
| 2011/0154204 | A1* | 6/2011 | Narayanaswamy | H04M 3/56 709/204 |
| 2013/0242708 | A1* | 9/2013 | Siu | G06Q 10/109 368/10 |
| 2013/0339877 | A1* | 12/2013 | Skeen | G06F 3/0484 707/754 |
| 2014/0149886 | A1* | 5/2014 | Los | G06Q 10/1093 715/753 |
| 2014/0310045 | A1* | 10/2014 | Meltzer | G06Q 10/1095 705/7.19 |
| 2016/0189109 | A1* | 6/2016 | Le | H04L 67/306 705/7.19 |

OTHER PUBLICATIONS

Enlista Corporation Announces New Calendar Sharing Software. PR Newswire Feb. 10, 2004: NA.*

Web conferencing: be here from there. Erlanger, Leon. PC Magazine 24.16: 32(3). Ziff Davis, Inc. (Sep. 20, 2005).*

When.com Launches Free Personalized Event and Calendar Service; Innovative New Service Makes It Easier to Find Events That Match Your Interests. Business/Technology Editors. Business Wire [New York] Nov. 2, 1998: 1.*

CommuniGate Systems: Communigate Systems Opens the Door for Macandlinux High-Performance Calendaring and Scheduling With The Caldav Standard;—New Open standard Scheduling features enables Apple EnterpriseClass Solution M2 Presswire [Coventry] Jan. 22, 2008: 1.*

* cited by examiner

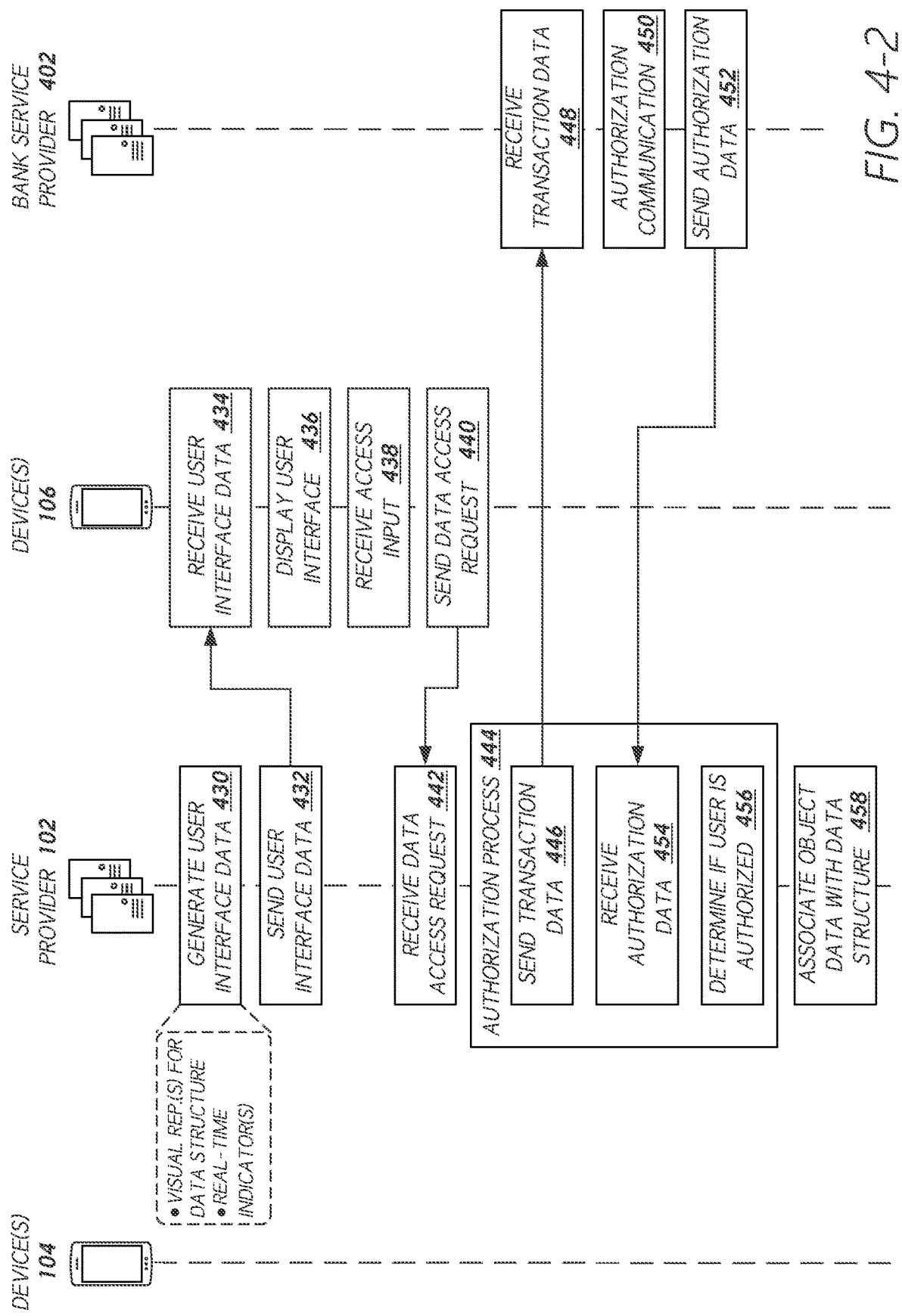

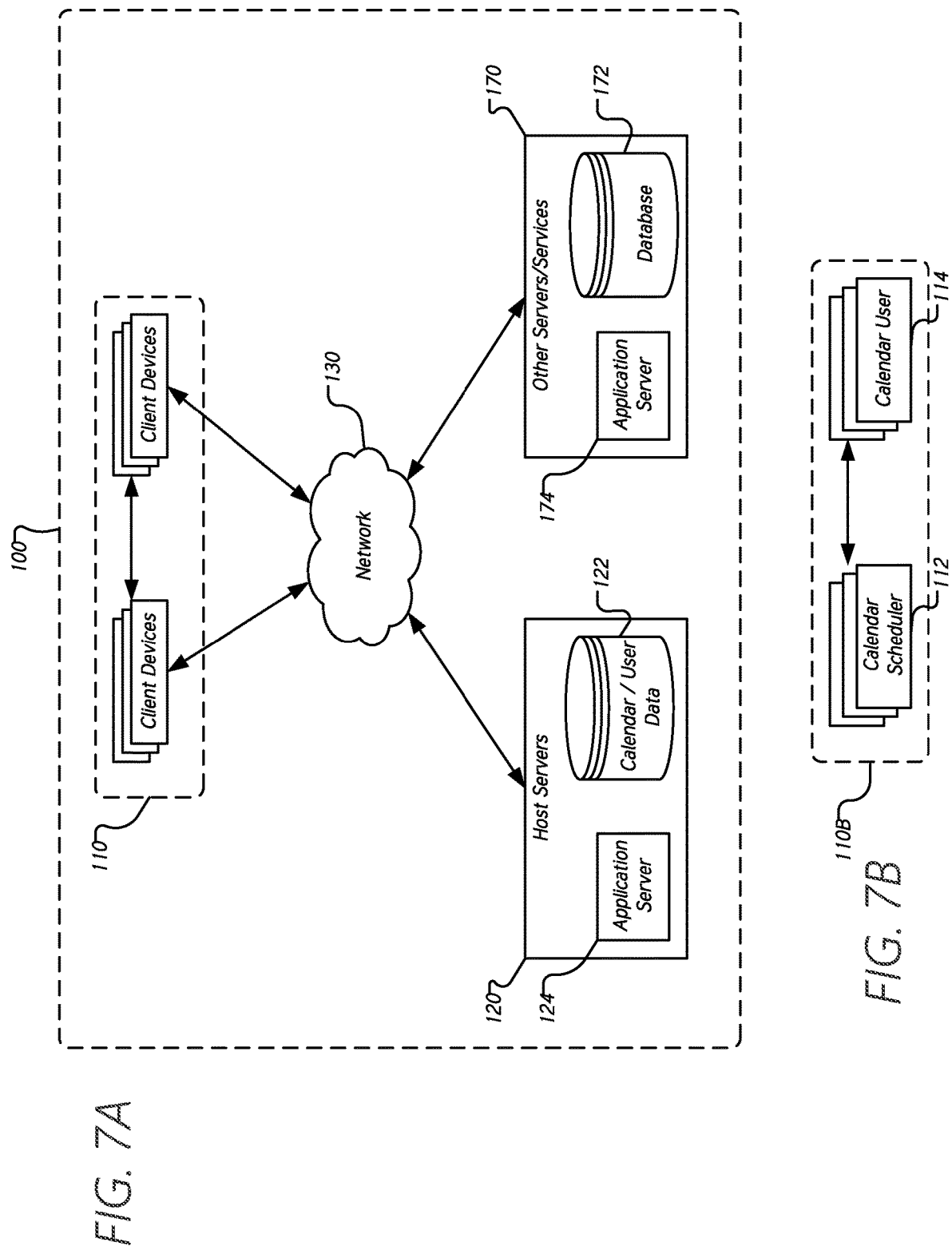

DATA STRUCTURE VISUALIZATION AND MANAGEMENT FOR REAL-TIME DATA

CROSS-REFERENCE TO RELATED APPLICATIONS

This application is a continuation of U.S. patent application Ser. No. 17/003,861, filed Aug. 26, 2020 and entitled "Data Structure Visualization and Management for Real-Time Data," which is a continuation-in-part of U.S. patent application Ser. No. 15/909,455, filed Mar. 1, 2018 and entitled "Electronic Calendar Devices," now U.S. Pat. No. 10,762,474, which is a continuation-in-part of U.S. patent application Ser. No. 14/995,200, filed on Jan. 14, 2016, entitled "Electronic Calendar Devices,", which claims priority to U.S. Provisional Patent Application No. 62/103,508, filed on Jan. 14, 2015, entitled "Electronic Calendar Management." U.S. patent application Ser. No. 15/909,455 claims priority to U.S. Provisional Application No. 62/465,244, filed on Mar. 1, 2017 and entitled "Electronic Calendar Devices." U.S. patent application Ser. No. 17/003,861 claims priority to U.S. Provisional Patent Application No. 62/992,803, filed Mar. 20, 2020 and entitled "Data Structure Visualization and Management for Real-Time Data." The entire contents of all of these applications are incorporated herein by reference.

BACKGROUND

Field

The present disclosure relates to the field of data management and user interfaces.

Description of the Related Art

Data may be provided to one or more remote devices over a network in a live manner. However, it is difficult to manage such data due to the time constraints associated with distributing the data. For example, data distribution may consume substantial computing, storage, and/or network resources, resulting in delays, resources issues, and so on. As more users consume data and the data increases in size, the difficulty in managing and distributing such data increases. Furthermore, it is often difficult to understand the underlying format or structure in which data is represented.

BRIEF DESCRIPTION OF THE DRAWINGS

Various embodiments are depicted in the accompanying drawings for illustrative purposes and should in no way be interpreted as limiting the scope of the disclosure. In addition, various features of different disclosed embodiments can be combined to form additional embodiments, which are part of this disclosure. Various reference numbers are used in the drawings and this disclosure, wherein the same reference number may correspond to the same or a different item/element/feature. The reference numbers should generally be interpreted in view of the content of the detailed description. For example, a reference number that is described in the detailed description in the context of one figure should generally be interpreted as referring to the item/element in that figure. In some embodiments, the same reference number may be used in different figures to refer to different items/elements/features.

FIGS. 4-1 through 4-4 illustrates example data flow diagrams showing certain data transmissions and/or processes for devices of a system according to one or more embodiments.

FIGS. 5-1 through 5-7 illustrate examples interfaces that may be presented via a content creation device to manage a data structure associated with a content creator according to one or more embodiments.

FIGS. 6-1 through 6-9 illustrate examples interfaces that may be presented via a content consumption device to acquire and/or view data associated with a data structure according to one or more embodiments.

FIGS. 7A and 7B are block diagrams of calendar management systems in accordance with one or more embodiments disclosed herein.

FIG. 8 is a block diagram providing a representation of a host server in accordance with one or more embodiments.

FIG. 9 is a block diagram providing a representation of a client device according to one or more embodiments.

DETAILED DESCRIPTION

Figure 1:
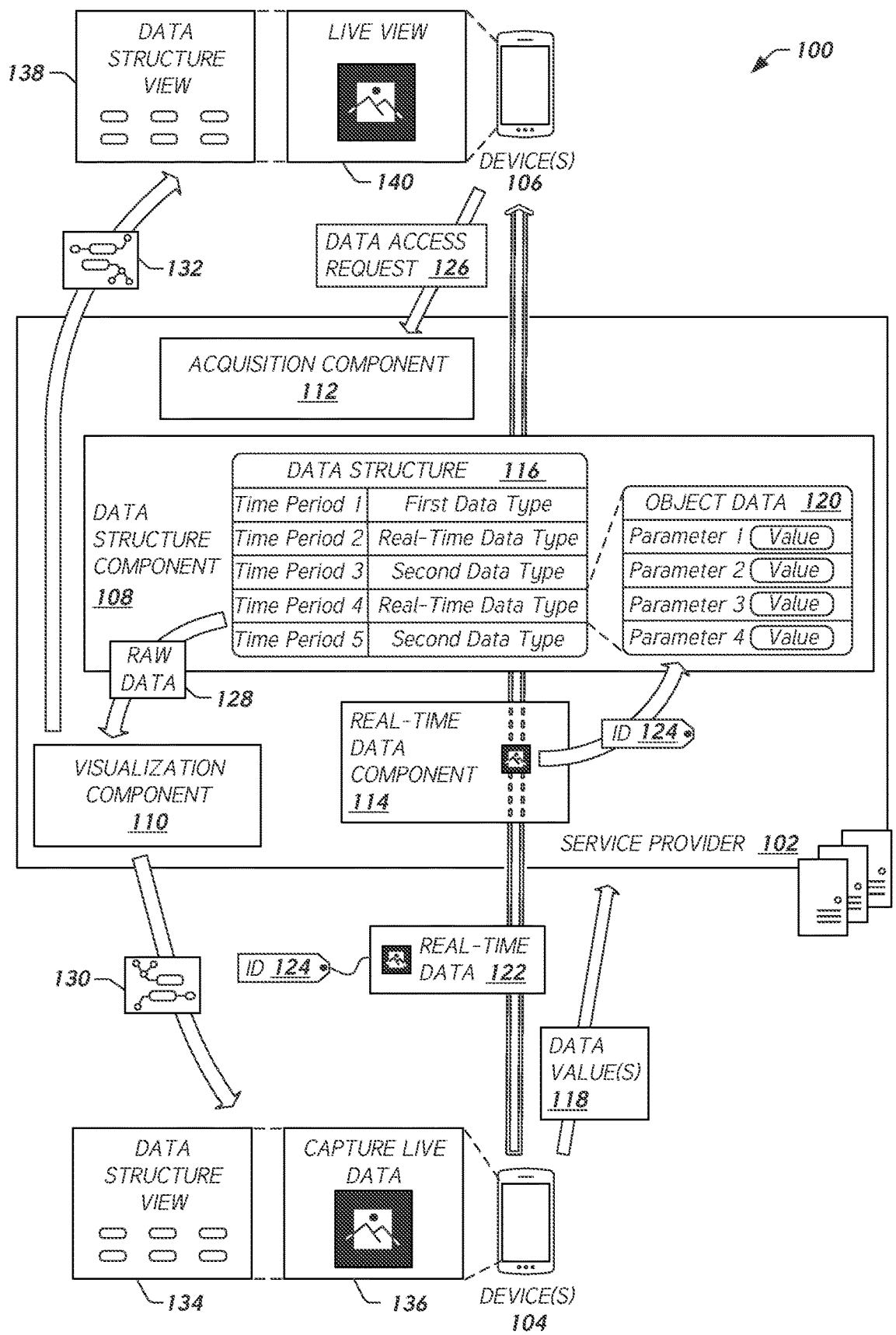
FIG. 1 illustrates an example architecture in which the techniques described herein may be implemented.

The headings provided herein are for convenience only and do not necessarily affect the scope or meaning of the claimed subject matter. Although certain embodiments and examples are disclosed below, the subject matter extends beyond the specifically disclosed embodiments to other alternative embodiments and/or uses, and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As noted above, real-time data is difficult to manage and/or distribute. As more users consume data and data sizes increase, data distribution may consume more computing, storage, and/or network resources. Furthermore, it is often difficult to understand the underlying format or structure in which data is represented.

The present disclosure relates to techniques and architectures for managing one or more data structures and distributing real-time data associated with the one or more data structures. For example, the techniques and architectures may implement data structures to manage data associated with one or more data-streaming events. The techniques and architectures may provide visualizations to view aspects of the data structures, the one or more data-streaming events, and/or other data associated with the data structures. The techniques and architectures may also facilitate control access to the data structures and/or data associated therewith. In some embodiments, a first type of user interface may be provided to a content creator to view information regarding a data structure associated with the content creator, create event object data for storage within the data structure, generate real-time data to associate with the event object data, and so on. Further, a second type of user interface may be provided to a content consumer to view information regarding a data structure of a content creator, view information regarding a data structure of the content consumer, acquire access rights to real-time data associated with a data structure, and so on. In some embodiments, a plurality of data structures may be managed for multiple content creators, enabling data to be distributed to remote devices associated with content consumers in real-time as the data is being created by the content creators.

The techniques and architectures discussed herein may efficiently manage and/or distribute data (including real-time data). For example, data may be associated with a data structure in the form of object data to manage information regarding a data-streaming event and/or distribute real-time data associated with the data-streaming event. By doing so, computing, storage, and/or network resources may be conserved/reduced (e.g., in comparison to other techniques). In examples, the techniques and architectures discussed herein may avoid/reduce delays in distributing real-time data between multiple content creators and multiple content consumers, which may be located remotely to the content creators over one or more networks. Furthermore, the techniques and architectures may provide visualizations regarding data associated with a data structure, such to depict aspects of a data structure, view real-time data, and so on.

FIG. 1 illustrates an example architecture 100 in which the techniques described herein may be implemented. The architecture 100 includes a service provider 102 configured to manage one or more data structures, provide visualizations regarding the one or more data structures, distribute real-time data associated with the one or more data structures, and/or perform a variety of other operations. The architecture 100 may also include one or more devices 104 and/or one or more devices 106 that are each configured to communicate with the service provider 102 and/or each other over one or more networks. Each of the one or more devices 104 and/or the one or more devices 106 may be associated with a user. For ease of discussion, the one or more devices 104 may be referred to as "the content creation device 104" with an associated an user referred to as a "content creator," while the one or more devices 106 may be referred to as "the content consumption device 106" with an associated user referred to as a "content consumer." However, a content creation device may in some cases be a content consumption device, or vice versa.

A data structure may include a storage component configured to organize/store data in a particular manner/format. For example, a data structure may include a plurality of data slots (also referred to as "blocks"), with each of the data slots being configured to store or to be associated with the same or different types of data, such as the same or different object data, values, variables, and so on. In some embodiments, a data slot is associated with a time period, such as a month, a week, a day, an hour, a block of hours, a minute/second, a block of minutes/seconds, etc. Such data structure may be referred to as "a time-based data structure." A data structure may include and/or represent an array, a list, a record, an object, a node graph, a collection of nodes, and so on. In some embodiments, a data structure may include one or more additional data structures and/or object data included/embedded therein, such as a data structure that includes another data structure in a data slot.

Object data may refer to data or a data structure having one or more parameters and/or one or more values associated with the one or more parameters. A parameter may include any identifier/indicator used to identify data, while a value may include data that may be associated with a parameter (e.g., data of the same type as the parameter). In some embodiments, object data may include or represent data associated with an event, such as a data-streaming event, a non-data-streaming event, or any other event.

In some embodiments, a data structure includes/represents a calendar and/or object data includes/represents data for an event/item of the calendar. To illustrate, a data structure may include/represent a calendar with each data slot representing a period of time (e.g., an hour, a day, a week, a block of hours/minutes/seconds, etc.). Here, each data slot may include/store object data for an event/item of the calendar, such as a data-streaming event, a non-data-streaming event, or another event.

The service provider 102 may include a data structure component 108, a visualization component 110, an acquisition component 112, and/or a real-time data component 114 to facilitate various functionality discussed herein. For example, the data structure component 108 may be configured to manage one or more data structures, the visualization component 110 may be configured to provide visual representations regarding one or more data structures and/or other data, the acquisition component 112 may be configured to manage access and/or acquisition of real-time data and/or other data, and/or the real-time data component 114 may be configured to distribute real-time data from a content creation source to one or more devices over a network. In some embodiments, the data structure component 108, the visualization component 110, the acquisition component 112, and/or the real-time data component 114 may be configured to operate in cooperation and/or exchange data to facilitate operations.

The data structure component 108 may be configured to create one or more data structures, associate the one or more data structures with one or more content creators and/or content consumers, create/associate data with the one or more data structures, and so on. For example, a content creator may provide input via the device 104 (which may be via a visualization interface) requesting that a data structure be generated. In response, the data structure component 108 may generate the data structure 116 and associate the data structure 116 with the content creator and/or the device 104. Additionally, or alternatively, the content creator may provide input via the device 104 regarding an event/item (which may be provided via a visualization interface). The input may include one or more data values 118 regarding the event/item, which may be sent to the service provider 102. The data structure component 108 may generate object data 120 and associate/store the one or more data values 118 in one or more value fields of the object data 120. The object data 120 may be associated with/stored in a data slot specified by the input (e.g., a data slot for a time period specified by the content creator). The content creator may provide input to create object data for any number of data slots.

In the example of FIG. 1, the data structure 116 is filled/associated with three different types of data, including a first type of data, a second type of data, and real-time data. That is, each data slot may store or be associated with object data of a particular data type. As shown, the object data 120 is of a real-time data type indicating that the object data 120 is or may be associated with real-time data, as discussed in further detail below. Here, the object data 120 is associated with a data slot for "Time Period 4." However, any number of different data types (e.g., types of object data) may be included/associated with the data structure 116. Further, any data slot may be associated with any type of data. In some embodiments, the data structure component 108 may receive one or more data values for an event and analyze the one or more data values to determine a type of object data to create for an event/item.

The real-time data component 114 may be configured to associate real-time data with a data structure and/or distribute the real-time data. For example, the content creation device 104 may be configured to generate real-time data 122 for an event/item and send the real-time data 122 to the service provider 102 along with an identifier 124, such as an identifier identifying the event/item, object data associated with the event/item, and so on. The real-time data component 114 may use the identifier 124 to associate the real-time data 122 with the appropriate data structure and/or object data. For example, the real-time data component 114 may determine that the object data 120 includes the same identifier as that sent with the real-time data 122. Based on such determination, the real-time data 122 may be stored/associated with the object data 120.

The real-time data component 114 may also be configured to distribute real-time data. For example, upon determining that the real-time data 122 is associated with the object data 120, the real-time data component 114 may determine one or more content consumers that are associated with the object data 120. The real-time data component 114 may determine a content consumption device for a content consumer and send the real-time data 122 to the content consumption device. In some embodiments, the real-time data 122 is queued for the content consumer and sent to the content consumption device when requested by the content consumption device. In the example of FIG. 1, the content consumption device 106 is associated with the object data 120 (e.g., has acquired access to the real-time data 122 via the acquisition component 112, as discussed below). As such, the real-time data 122 is provided to the content consumption device 106 (with or without the identifier 124).

In some embodiments, the real-time data component 114 may operate in cooperation with one or more other service providers (not illustrated in FIG. 1) to facilitate real-time distribution of data to one or more devices over a network. For example, the real-time data component 114 may instruct another service provider to communicate directly with a content creation device and/or a content consumption device. The other service provider may cause real-time data to be distributed from a content creation device to one or more content consumption devices. In examples, once the other service provider has been notified to facilitate distribution of the real-time data, the service provider 102 may not be directly involved in the process. Further, in some embodiments, functions of the real-time data component 114 may be entirely (or partially) implemented by another service provider, which may be associated with a different entity than the service provider 102. As such, the real-time data component 114 may be implemented partially or entirely by another service provider.

In some embodiments, real-time data may refer to data that is configured to be distributed in real-time (i.e., a live manner). For example, real-time data may refer to data that is received and distributed to one or more devices over a network as soon as the data is received. In examples, real-time data may be subjected to some processing, which may occur in a relatively quick manner (e.g., taking less than a threshold amount of time) to avoid delays. In some embodiments, real-time data may be stored for later presentation, such as in an on-demand manner.

The acquisition component 112 may be configured to control access to data associated with the service provider 102. For example, the acquisition component 112 may limit access to real-time data associated with a data structure to devices/users that have acquired access rights. A device/user may gain access rights by submitting value (e.g., purchasing an event/item) and/or otherwise satisfying one or more authorization criteria. To illustrate, a content consumer may use the content consumption device 106 to request access to real-time data that may be associated with the object data 120 (e.g., in the future). The content consumption device 106 may send a data access request 126 to the service provider 102, specifically the acquisition component 112. The data access request 126 may include information to acquire or authorize acquisition of an event/item. The information may include transaction data to facilitate a financial transaction. The acquisition component 112 may perform an authorization process to determine if the content consumer is authorized to make such acquisition. The authorization process may include communicating with one or more other service providers, such as one or more bank processing services. If authorized, the acquisition component 112 may associate the content consumer and/or the content consumption device 106 with the object data 120. For example, a user/device identifier identifying the content consumer/the content consumption device 106 may be stored/associated with the object data 120. Thereafter, when real-time data is associated with the object data 120, the real-time data may be provided to the content consumer/content consumption device 106. In the example of FIG. 1, the real-time data 122 is associated with the object data 120 as the real-time data 122 is being received from the content creation device 104. As such, the real-time data 122 may be provided to the content consumption device 106 (e.g., in a streaming manner as the real-time data 122 is received).

The visualization component 110 may be configured to provide visual representations regarding data associated with the service provider 102. For example, the visualization component 110 may retrieve raw data 128 from the data structure component 108, such as raw data associated with a data structure and/or object data. Based on such data, the visualization component 110 may generate user interface data 130, 132, which may represent a user interface (e.g., a visualization interface), one or more visual representations for elements of the user interface, one or more visual representations for elements of a data structure/object data, and so on. The user interface data 130, 132 may be provided to the content creation device 104 and/or the content consumption device 106 to view/manipulate/update various aspects of data associated with a data structure and/or object data. For example, the visualization component 110 may send the user interface data 130 to the content creation device 104 to visualize one or more aspects of a data structure (via an interface 134) and/or to facilitate capturing of real-time data (via an interface 136). Additionally, or alternatively, the visualization component 110 may send the user interface data 132 to the consumer device 106 to visualize one or more aspects of a data structure (via an interface 138) and/or to view real-time data (via an interface 140). In some embodiments, the visualization component 110 may enable raw data and/or other forms of data to be visualized in an efficient manner to understand data structures, object data, and/or other elements, which may be relatively complex in some examples.

The service provider 102, the device 104, and/or the device 106 may be configured to communicate with each other over one or more networks. For example, the service provider 102, the device 104, and/or the device 106 may send/receive data in a wireless and/or wired manner over one or more networks. The one or more networks may comprise one or more personal area networks (PANs), one or more local area networks (LANs), one or more wide area networks (WANs), one or more Internet area networks (IANs), one or more cellular networks, the Internet, and so on. The one or more networks may include one or more wireless and/or one or more wired networks. In some embodiments, the service provider 102, the device 104, and/or the device 106 may implement a wireless technology, such as Bluetooth, Wi-Fi, near-field communication (NFC), or the like.

A content creator may refer to any individual associated with generating data. For example, a content creator may refer to an artist, celebrity, producer, influencer, comedian, athlete, writer, fitness professional, organization, racing team, politician, promoter, agent, president/leader of an organization, or any another user that may use a device to capture content and/or to be represented within content. Content may include image-based data (e.g., still images, video images, etc.), audio data, 3-Dimensional (3D) data, depth data (e.g., data indicative of distances from an imaging device), etc. In some embodiments, a content creator may refer to an individual that desires to market content. In examples, reference to a content creator may refer to a content creator directly and/or a user associated with the content creator, such as a camera crew, an assistant, and so on. In some embodiments, a content creator may assign/designate an administrator (e.g., a publicist, a promoter, an agent, a manager, an assistant, etc.) to manage a data structure/account associated with the content creator.

A content consumer may refer to any individual that consumes data. For example, a content consumer may refer to a user that views, listens to, or otherwise consumes data generated by a content creator. In some embodiments, a content consumer refers to a fan of a content creator, such as a user that follows a content creator. Further, in some embodiments, a content creator may also be a content consumer, or vice versa.

Figure 2:
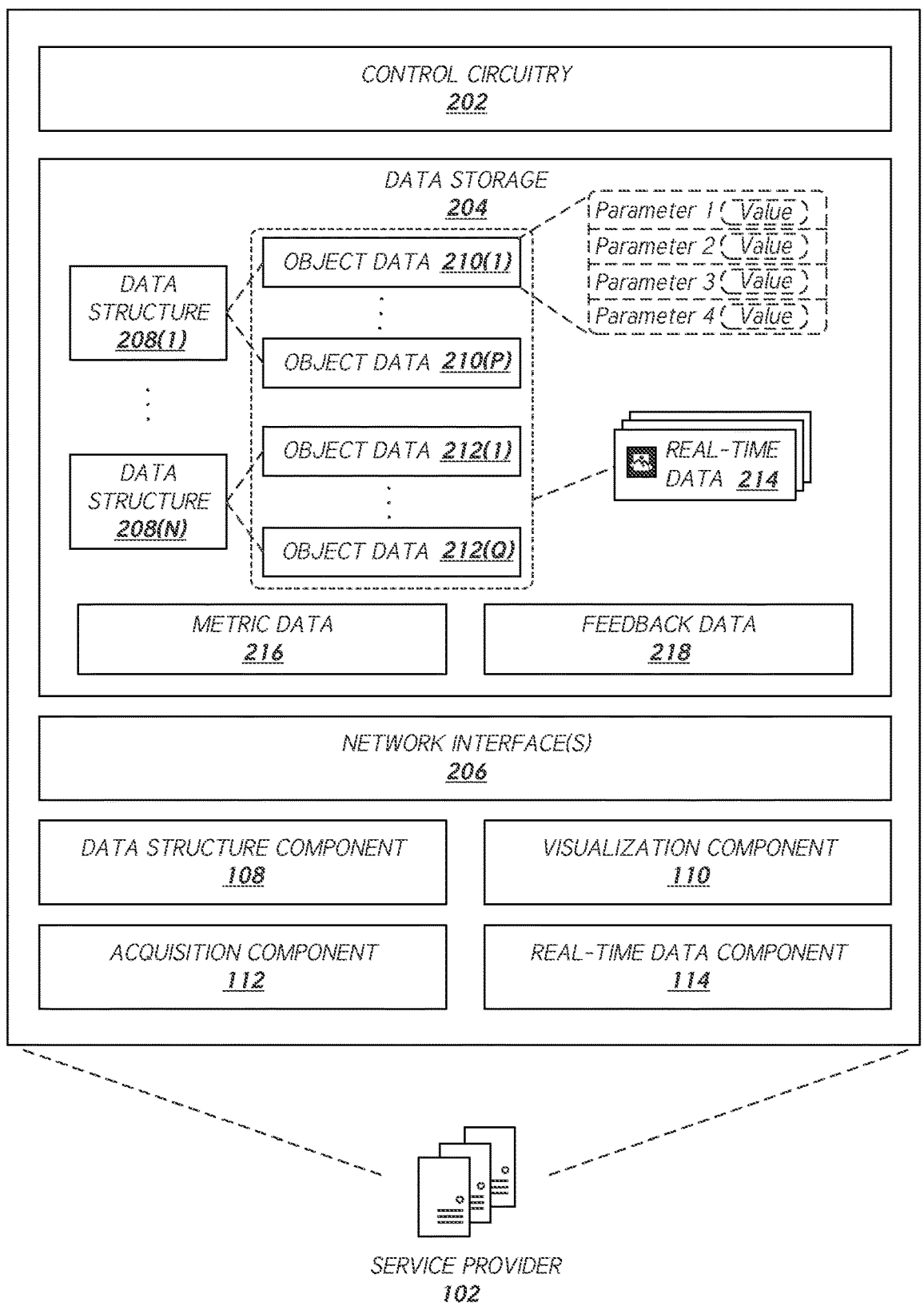
FIG. 2 illustrates additional example details of the service provider of FIG. 1 according to one or more embodiments.

FIG. 2 illustrates additional example details of the service provider 102 of FIG. 1 according to one or more embodiments. The service provider 102 may be implemented as one or more computing devices, such as one or more servers, one or more desktop computers, one or more laptops computers, or any other type of device configured to process data. In some embodiments, the one or more computing devices are configured in a cluster, data center, cloud computing environment, or a combination thereof. In some embodiments, the one or more computing devices of the service provider 102 are implemented as a remote computing resource that is located remotely to a content consumption device and/or content creation device. In other embodiments, the one or more computing devices of the service provider 102 are implemented as local resources that are located locally at a content consumption device and/or content creation device. As illustrated, the service provider 102 may include control circuitry 202, data storage 204, one or more network interfaces 206, the data structure component 108, the visualization component 110, the acquisition component 112, and the real-time data component 114. The various components of the service provider 102 may be electrically and/or communicatively coupled using certain connectivity circuitry/devices/features, which may or may not be part of the control circuitry 202.

The control circuitry 202 may include one or more processors, such as one or more central processing units (CPUs), one or more microprocessors, one or more graphics processing units (GPUs), one or more digital signal processors (DSPs), and/or other processing circuitry. Alternatively, or additionally, the control circuitry 202 may include one or more application specific integrated circuits (ASIC), one or more field-programmable gate arrays (FPGAs), one or more program-specific standard products (ASSPs), one or more complex programmable logic devices (CPLDs), and/or the like. The control circuitry 202 may be configured to execute one or more instructions stored in the data storage 204 to thereby perform one or more operations to implement various functionality discussed herein. The control circuitry 202 may operate in cooperation with any of the components of the service provider 102 to facilitate such functionality.

The data storage 204 can include any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media. In examples, the data storage 204 may store one or more instructions that are executable by the control circuitry 202 to facilitate various functionality discussed herein.

In some embodiments, the data structure component 108, the visualization component 110, the acquisition component 112, and/or the real-time data component 114 may be implemented as one or more instructions stored in the data storage 204, which are configured to be executed by the control circuitry 202 to perform various operations discussed herein. Further, in some embodiments, the data structure component 108, the visualization component 110, the acquisition component 112, and/or the real-time data component 114 may be implemented as one or more application specific integrated circuits (ASIC), one or more field-programmable gate arrays (FPGAs), one or more program-specific standard products (ASSPs), one or more complex programmable logic devices (CPLDs), and/or the like. For ease of discussion, the data structure component 108, the visualization component 110, the acquisition component 112, and the real-time data component 114 are illustrated as separate components. However, it should be understood that such components may be implemented as any number of components to implement the functionality discussed herein (e.g., combined or separated into additional components). In some embodiments, the data structure component 108, the visualization component 110, the acquisition component 112, and/or the real-time data component 114 are configured to store data in the data storage 204.

The one or more network interfaces 206 may be configured to communicate with one or more devices over a communication network. For example, the one or more network interfaces 206 may send/receive data in a wireless or wired manner over a network. A communication network can include a local area network (LAN), a wide area network (WAN) (e.g., the Internet), a personal area network (PAN), a body area network (BAN), etc. In some embodiments, the one or more network interfaces 206 may implement a wireless technology such as Bluetooth, Wi-Fi, near field communication (NFC), or the like. In some embodiments, the one or more network interfaces 206 may include a transceiver (e.g., transceiver circuitry embodied in one or more devices) configured to transmit/receive signals wirelessly.

The data structure component 108 may be configured to manage one or more a plurality of data structures 208(1)-208(N), where "N" represents a number greater than "1." As illustrated, each data structure may store/associate with object data. For example, the data structure 208(1) may include one or more of object data 210(1)-210(P) and the data structure 208 (N) may include one or more of object data 212(1)-212(Q), where "P" and "Q" each represent a number greater than "1." Each object data may include one or more parameters and/or one or more values associated with the one or more parameters, respectively, as shown in FIG. 2. Each parameter may store a value (also referred to as "value data").

Non-limiting example values (which may be associated with a corresponding parameter) include:
- a date/time value indicating of a date and/or time of an event/item (including a start and/or end time of the event/item);
- a name value indicating of a name of an event/item;
- an event/object type value indicating a type of the object data (e.g., the object data is associated with a data-streaming event/item, a non-data-streaming event/item, any other type of event/item);
- an acquisition value indicating a value needed to acquire access rights to an event/item (e.g., a price for acquiring access rights to real-time data that may be associated with the object data);
- an owner identifier identifying a user that created a data structure/object data (e.g., a content creator identifier identifying a content creator that created the object data/data structure);
- an access value indicating one or more users that have acquired access rights to an event/item (e.g., a list of content consumer identifiers identifying content consumers that have acquired access to real-time data associated with the object data);
- a subscription value indicating one or more users that have subscribed to receive updates regarding a data structure (e.g., a list of content consumer identifiers identifying content consumers that have followed (or otherwise signed-up to receive updates to) a data structure);
- a link indicating a website associated with the object data (e.g., a web address associated with an event/item);
- an event/item/object data identifier identifying an event/item and/or object data associated with the event/item (e.g., which may be used to associate real-time data with the object data);
- a location value indicating a location of an event/item;
- a real-time data identifier identifying real-time data associated with object data;
- a data structure identifier identifying an associated data structure for object data;
- a share identifier for a data structure and/or object data (which may be provided to a content consumer and/or content creator to enable access to the data structure and/or the object data);
- a media data value that may include one or more media items associated with object data (e.g., images, videos, conversation data, etc., that may generally be associated with object data before an event occurs); and/or
- a comment value that may include one or more comments/notes regarding an event.

The data structure component 108 may be configured to manage a data structure and/or object data for a content creator and/or a content consumer. As one example, a content creator may create a data structure for one or more events associated with the content creator. The content creator may make the data structure available for access to any number of content consumers. The data structure component 108 may operate in cooperation with the visualization component 110 to provide user interface data regarding one or more events to a content consumer. As another example, a content consumer may create a data structure to manage one or more events/items associated with the content consumer. In some embodiments, object data associated with a first data structure may be associated with a second data structure. For example, a content consumer may associate object data for an event of a content creator with a data structure associated with the content consumer. In some embodiments, the service provider 102 may implement one or more data structures to efficiently manage data for a plurality of content creators and/or a plurality of content consumers. For example, the service provider 102 may manage relatively large amounts of data and/or relatively complex pieces of data through use of data structures.

In some embodiments, the real-time data component 114 may associate real-time data 214 with one or more of the data structures 208 and/or the object data 210, 212. For example, the real-time data component 114 may receive real-time data and an identifier for an event from a content creator. The real-time data component 114 may operate in cooperation with the data structure component 108 to select, based on the identifier, object data with which to associate with the real-time data. To illustrate, real-time data may be associated with specific object data when an identifier provided with the real-time data (e.g., a unique identifier indicative of an event/item) is matched to an identifier associated with the object data (e.g., a unique identifier indicative of the same event/item). In examples, real-time data may be associated with a data structure and/or object data as the real-time data is being received and/or distributed to one or more devices by the real-time data component 114.

In some embodiments, the data structure component 108 and/or the visualization component 110 may provide a notification regarding a data structure. For example, a content consumer (and/or a content creator) may subscribe to receive notifications regarding changes to a data structure. If the data structure component 108 detects that new object data is created for the data structure, the visualization component 110 may provide a notification to the content consumer, which may include one or more visualizations regarding the new object data. The one or more visualizations may be indicative of one or more parameters and/or one or more values associated with the new object data.

The visualization component 110 may be configured to provide one or more interfaces/interface elements related to one or more data structures and/or object data. For example, the visualization component 110 may generate user interface data for a user interface that enables a user to create a data structure and/or object data for the data structure. Additionally, or alternatively, the visualization component 110 may generate user interface data for a user interface that enables a user to view information regarding a data structure and/or object data for the data structure. In some embodiments the visualization component 110 may generate different user interface data for different types of users, such as a first type of user interface data for content creators and a second type of user interface data for content consumers. This may enable the service provider 102 to control access to data associated with the service provider 102.

In some embodiments, user interface data may include data representing one or more visual representations for a data structure. For example, the visualization component 110 may convert data from one or more of the data structures 208 (including the object data 210, 212) into one or more graphical user interface elements. A graphical user interface element may include an icon, a window, a control/widget, a graph, a tab, a menu, a menu bar, a pointer, an animation, text, an image, audio, and so on. In examples, a graphical user interface element may allow relatively complex data of a data structure/object data to be presented in an understandable format, such as a displayable format that is viewable by a content consumer and/or a content creator.

In some embodiments, the service provider 102 may be configured to generate metric data 216 regarding one or more data structures and/or real-time data. For example, the data structure component 108 and/or the acquisition component 108 may analyze the plurality of data structures 208 and/or transaction data over time to determine metrics, including times/dates when data structures/object data are created, times/dates of events, times/dates of real-time data, data sizes of real-time data, times/dates when real-time data is distributed, availability times/dates, acquisition values (e.g. prices for accessing data), and so on. The data structure component 108 and/or the acquisition component 108 may generate the metric data 216 indicative of such metrics, which may be made available to a content creator and/or a content consumer using the visualization component 110. As one example, the data structure component 108 may analyze data structures to identify a data slot/time period that is most available across content consumers and provide a notification to a content creator indicative of the data slots/time period (e.g., as a suggested time period to schedule an event). The content creator may use such information to schedule an event for the time slot/time period. As another example, the acquisition component 112 may analyze transaction data regarding acquisitions of data associated with events (e.g., data regarding a financial transaction, which may identify a price, a financial instrument used for the transaction, a bank, an account, the date/time of the transaction, and so on) to identify a collective acquisition value for a particular event and/or multiple events associated with a content creator. The service provider 102 may provide a notification indicative of the collective acquisition value.

In some embodiments, the real-time data component 114 may be configured to facilitate feedback data 218 regarding real-time data. For example, the visualization component 110 may be configured to provide a user interface to display real-time data to a content consumer and/or receive feedback regarding the real-time data. The content consumer may provide feedback via a user interface to indicate how the real-time data is being received by the content consumer. For instance, a user may provide input/select a thumbs-up, thumbs down, rating, ranking, score, and so on, for real-time data that is being viewed by the user. Such feedback may be stored as the feedback data 218.

In some embodiments, the feedback data 218 may be provided to a content creator (and/or a content consumer) to inform the content creator of how real-time data is received. In examples, the feedback data 218 may be provided in substantially real-time, so that the content creator may view feedback while the real-time data is being distributed by the content creator. Alternatively, or additionally, the feedback data 218 may be provided at a different time. In some embodiments, the real-time data component 114 may determine a time during real-time data that is associated with a particular amount of positive/negative feedback, such as a period of time when the most positive/negative feedback is received, a period of time that has more than a threshold of positive/negative feedback, and so on. Such information may be stored with or associated with the feedback data 218 and/or provided to a content creator/content consumer. In some embodiments, the feedback data 218 may indicate an average feedback over a period of time, such as over the last number of minutes.

In some embodiments, the real-time data component 114 may provide information to facilitate real-time data capture using one or more imaging devices. For example, a content creator may desire to broadcast an event using one or more camera systems (e.g., professional camera systems, which may include an encoder). To enable such set up, the real-time data component 114 may generate information for the one or more camera systems to use to associate data captured by the one or more camera systems with the event, such as an encryption key (which may be entered into a camera system), a website for distributing the capture data, one or more credentials, and so on. In examples, a content creator may interface with the service provider 102 to view the information that may be used for the one or more camera systems. Further, in examples, the one or more camera systems may be connected to a content creation device and the information may be provided directly to the one or more camera systems.

In some embodiments, the service provider 102 may enable a content creator to distribute content to a select group of content consumers. For example, a content creator may record a video and select a group of content consumers to receive the video. The service provider 102 may provide a user interface to record the video and/or select the group of content consumers (e.g., which may include search functionality, drop-down menus, or other elements to designate a particular group of content consumers, such as content consumers that are following the content creator or other types of content consumers). The service provider 102 may distribute the video to the group of content consumers. The video may be viewed through content consumption devices associated with the content consumers, such as by being notified in a notification section and/or viewing the video through an interface on the content-consumer side. In examples, content consumers may provide feedback data regarding the video.

In some embodiments, the service provider 102 may manage an account for one or more content consumers and/or content creators. For example, the service provider 102 may manage funds, digital currency, rewards, points, etc. A content consumer may earn value for an account by performing certain actions/behaviors, such as purchasing access to an event, saving an event, following a content creator, and so on. A content consumer may use value in an account with the service provider 102 to acquire access to an event, reduce a value required to acquire access to an event, and so on. In examples, a content consumer may share value in an account with another content consumer.

In some embodiments, the service provider 102 may perform a verification process to determine an identity of a content creator or another user. For example, the service provider 102 may require an identity of a content creator to be verified before the content creator can create an account with the service provider 102 (e.g., register with the system). To do so, a content creator may be required to provide a video or still-image of his or herself (e.g., a video that represents a face of the content creator) and/or input a unique code (e.g., PIN) through an interface. The unique code may have been sent to the content creator separately. To illustrate, the content creator may be required to say their name and provide a unique code while recording a video. In examples, the service provider 102 may present the video or still-image to a user/administrator for visual verification of the identity of the content creator. Further, in examples, the service provider 102 may use facial recognition techniques to determine the identity of the content creator. In some embodiments, if a content creator is not verified within a particular period of time, the content creator may need to begin the process again.

Figure 3:
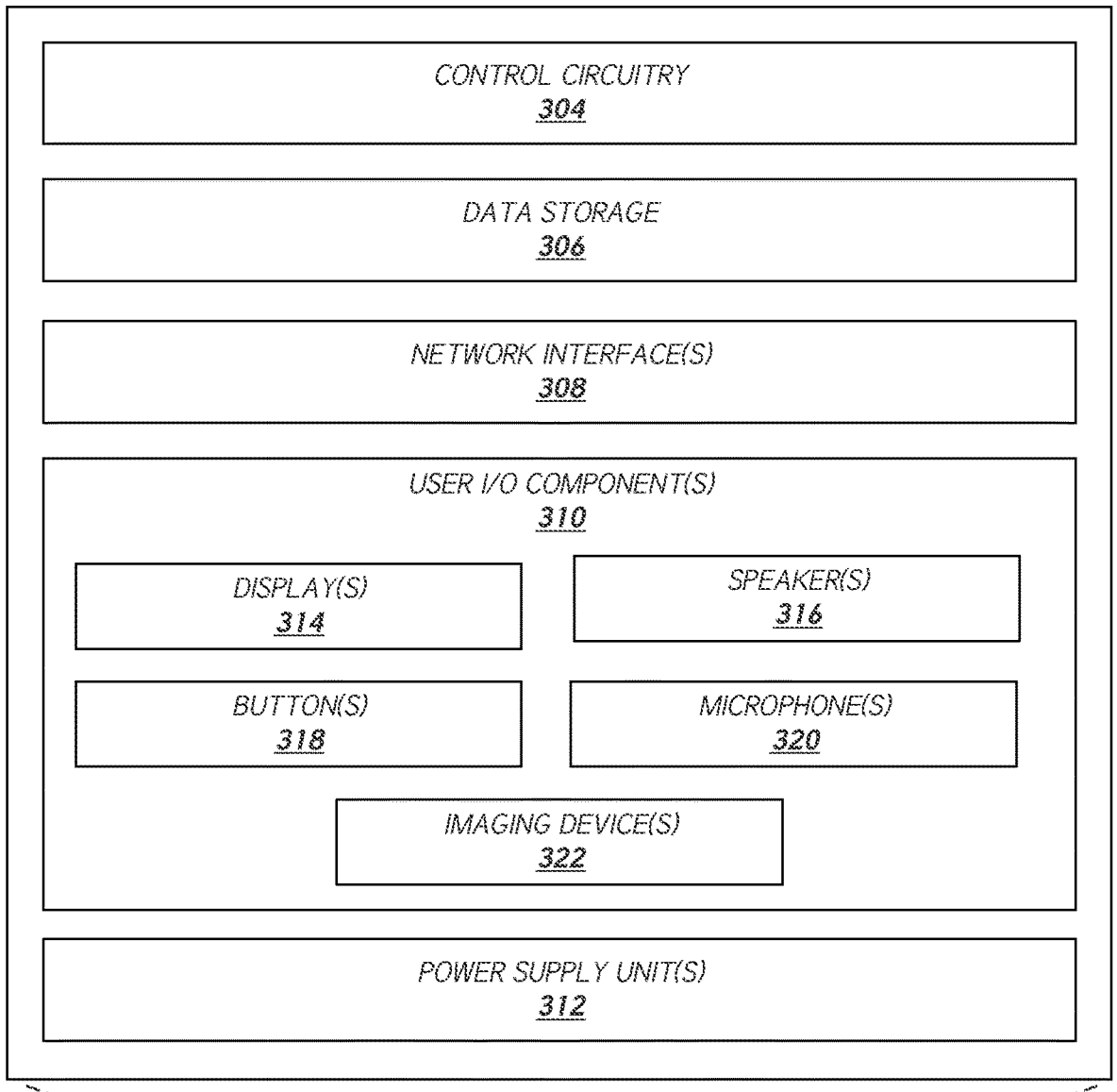
FIG. 3 illustrates details of an example user device according to one or more embodiments.

FIG. 3 illustrates details of an example user device 302, such as the device 104 and/or the device 106 of FIG. 1, according to one or more embodiments. The user device 302 may be implemented as one or more computing devices, such as one or more desktop computers, one or more laptops computers, one or more servers, one or more smartphones, one or more electronic reader devices, one or more mobile handsets, one or more personal digital assistants, one or more portable navigation devices, one or more portable gaming devices, one or more tablet computers, one or more wearable devices (e.g., a watch), one or more portable media players, one or more televisions, one or more set-top boxes, one or more computer systems in a vehicle, one or more appliances, one or more cameras, one or more security systems, one or more home-based computer systems, one or more projectors, and so on. As illustrated, the user device 302 may include control circuitry 304, data storage 306, one or more network interfaces 308, one or more user input/output devices 310, and one or more power supply unit(s) 312. The various components of the user device 302 may be electrically and/or communicatively coupled using certain connectivity circuitry/devices/features, which may or may not be part of the control circuitry 304.

The control circuitry 304 may include one or more processors, such as one or more central processing units (CPUs), one or more microprocessors, one or more graphics processing units (GPUs), one or more digital signal processors (DSPs), and/or other processing circuitry. Alternatively, or additionally, the control circuitry 304 can include one or more application specific integrated circuits (ASIC), one or more field-programmable gate arrays (FPGAs), one or more program-specific standard products (ASSPs), one or more complex programmable logic devices (CPLDs), and/or the like. The control circuitry 304 may be configured to execute one or more instructions stored in the data storage 306 to thereby perform one or more operations to implement various functionality discussed herein. The control circuitry 304 can operate in cooperation with any of the components of the user device 302 to facilitate such functionality.

The data storage 306 can include any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media. The data storage 306 may store one or more instructions that are executable by the control circuitry 304 to facilitate various functionality discussed herein.

The one or more network interfaces 308 may be configured to communicate with one or more devices over a communication network. For example, the one or more network interfaces 308 may send/receive data in a wireless or wired manner over a network. A communication network can include a local area network (LAN), a wide area network (WAN) (e.g., the Internet), a personal area network (PAN), a body area network (BAN), etc. In some embodiments, the one or more network interfaces 308 may implement a wireless technology such as Bluetooth, Wi-Fi, near field communication (NFC), or the like. In some embodiments, the one or more network interfaces 308 may include a transceiver (e.g., transceiver circuitry embodied in one or more devices) configured to transmit/receive signals wirelessly.

The one or more user I/O components 310 may include one or more electronic displays 314 configured to display data, one or more speakers 316 configured to output an audio signal, one or more buttons 318 configured to receive input, one or more microphones 320 configured to detect sound and convert the sound into an electrical signal, and/or one or more imaging devices 322. The one or more displays 314 can include one or more liquid-crystal (LCD) displays, light-emitting diode (LED) displays, organic LED displays, plasma displays, electronic paper displays, and/or any other type of technology. In some embodiments, the one or more displays 314 include one or more touchscreens configured to receive input and/or display data. The one or more buttons 318 can include one or more mechanical push-buttons configured to be depressed or pushed, one or more touch buttons configured to receive touch input, or any other type of button. The one or more imaging devices 322 can include one or more cameras configured to capture an image(s) of an environment, one or more depth/range sensors configured to generate depth information for an environment, and so on. Although the one or more user I/O components 310 are illustrated as separate components, any of the components can be implemented together.

The one or more user I/O components 310 can be configured to receive input from a user and/or provide output to the user. In one example, the one or more user I/O components 310 provide a user interface via the one or more displays 314 with information regarding a data structure/object data/real-time data, and a user can provide input via the user interface. In some embodiments, a user can provide speech input via the microphone(s) 320 and the user device 302 and/or another device can perform operations requested by the speech input. In some embodiments, a user can provide input via the one or more displays 314/the one or more buttons 318, and the user device 302 and/or another device can perform an operation based on the input. In some embodiments, one or more of the user I/O components 310 or other components can operate to receive gesture input (e.g., the imaging device(s) 322 can capture an image(s) of a user making a gesture(s) and the gesture(s) can be processed using gesture recognition to identify an operation being requested).

The power supply unit(s) 312 can be configured to manage power for the user device 302, such as power provided to and/or received from one or more components of the user device 302. In some embodiments, the power supply unit(s) 312 includes one or more batteries, such as a lithium-based battery, a lead-acid battery, an alkaline battery, and/or another type of battery. That is, the power supply unit(s) 312 may comprise one or more devices and/or circuitry configured to provide a source of power and/or provide power management functionality. Further, in some embodiments, the power supply unit(s) 312 includes a mains power connector that is configured to couple to an alternating current (AC) or direct current (DC) mains power source.

Figures 1, 4:
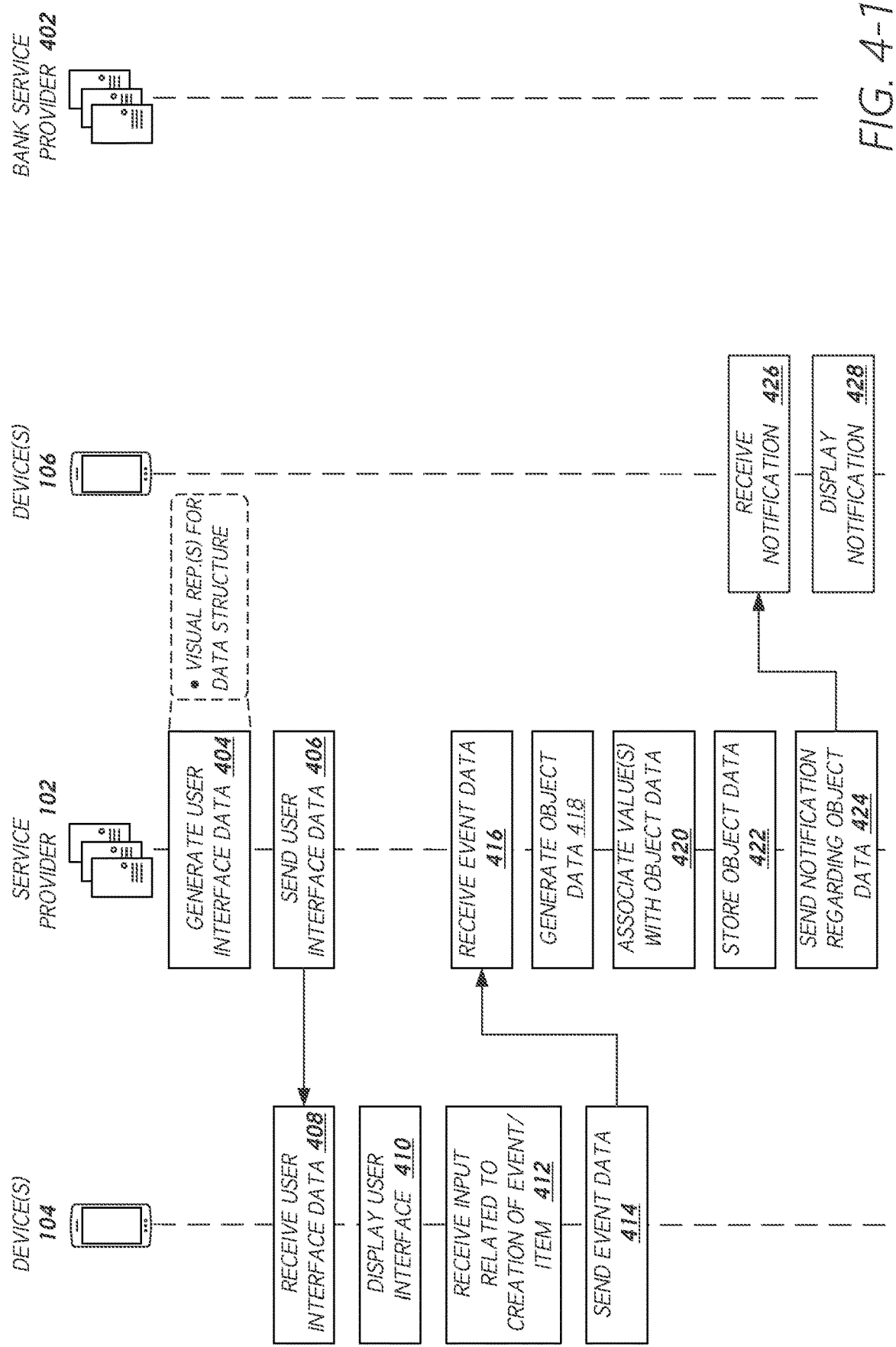
Figures 3, 4:
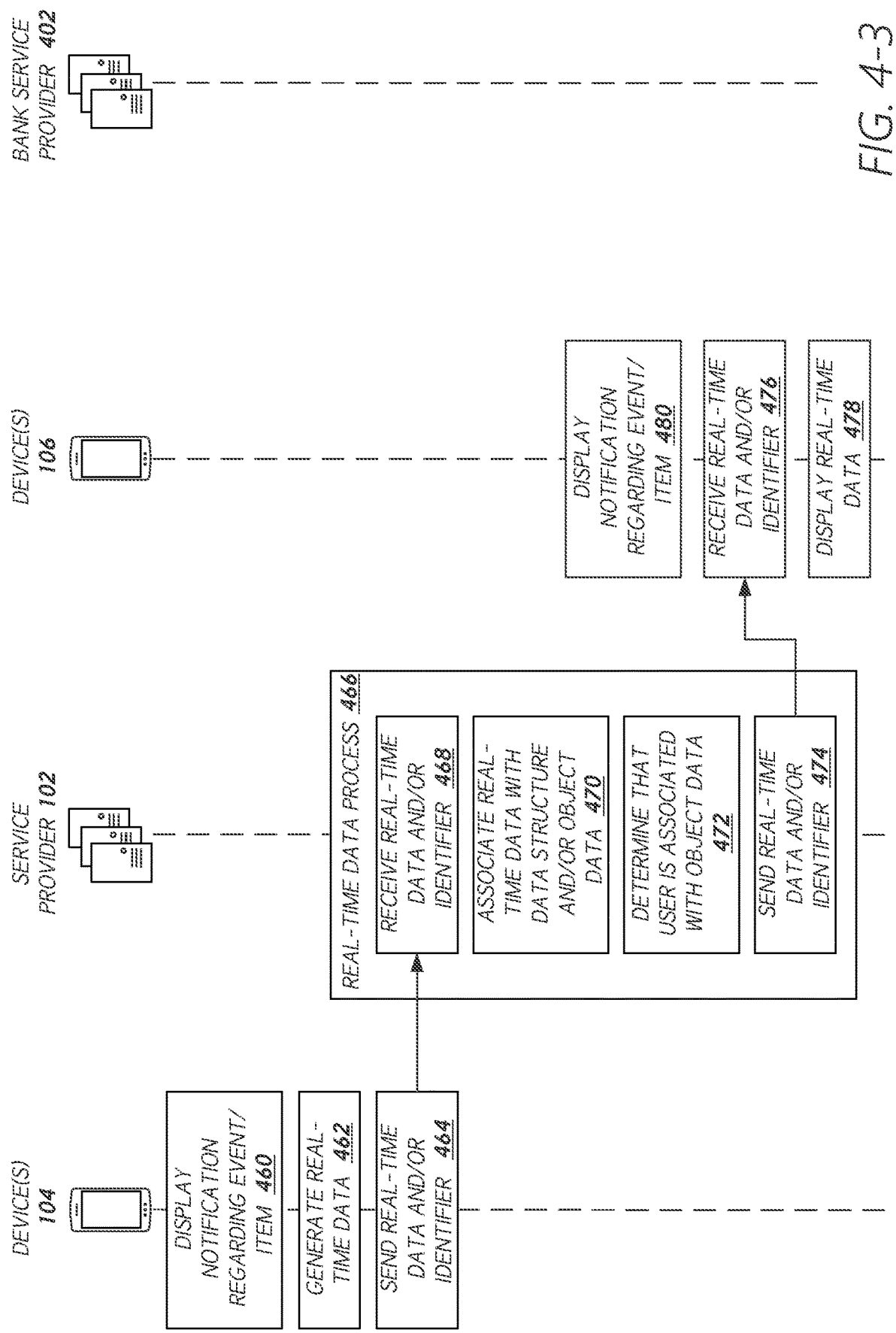
Figure 4:
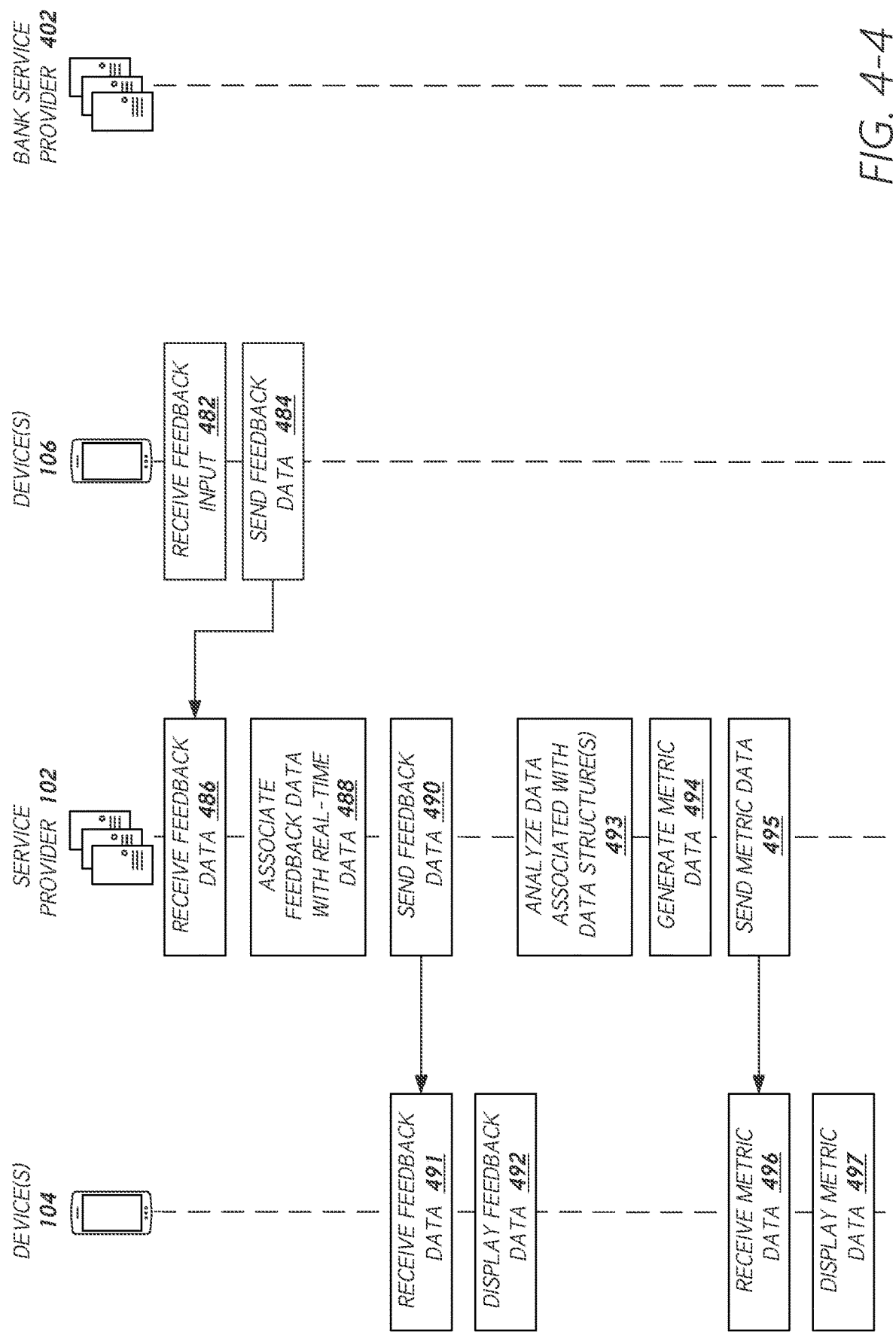

FIGS. 4-1 through 4-4 illustrates example data flow diagrams showing certain data transmissions and/or processes for devices of a system in accordance with one or more embodiments. Each block may represent one or more operations that may be implemented in hardware, software, or a combination thereof. In the context of software, an operation may represent computer-executable instructions stored on one or more computer-readable media that, when executed by control circuitry, perform the recited operation. Computer-executable instructions may include routines, programs, objects, components, data structures, and the like that perform particular functions or implement particular abstract data types. In some embodiments, vertical positioning of certain blocks in a diagram may represent relative temporal occurrence of an operation associated with such blocks. However, it should be understood that vertical positioning does not represent temporal characteristics in some embodiments.

For ease of discussion, the data flow diagrams of FIGS. 4-1 through 4-4 are discussed in the context of the devices/components of FIG. 1, as well as a bank service provider 402. In examples, the bank service provider 402 may be implemented as one or more computing devices, such as one or more servers, one or more laptops computers, and so on, which may include control circuitry and/or data storage. However, any of the data flow diagrams may be implemented in the context of other architectures. In examples, communication between the content creation device 104, the service provider 102, the content consumption device 106, and/or the bank service provider 402 may be carried out over one or more networks in a wireless and/or wired manner. In some embodiments, generating data for display, sending the data to another device for display on the other device, and/or displaying the data may be referred to as "causing display of the data."

In FIG. 4-1, at block 404, the service provider 102 may generate user interface data. The user interface data may represent a user interface (e.g., a user interface for a content creator), one or more visual representations for a data structure/object data, and so on. In some embodiments, the user interface data may indicate that one or more data slots of a data structure are filled or empty. If filled, the user interface data may include data associated with the filled data slot.

At block 406, the service provider 102 may send (e.g., transmit) the user interface data to the content creation device 104. At block 408, the content creation device 104 may receive the user interface data from the service provider 102.

At block 410, the content creation device 104 may display a user interface. For example, based on the user interface data, the content creation device 104 may display a user interface that includes one or more visual representations for a data structure. The user interface may enable a content creator to view, create, and/or update data associated with a data structure, such as a data structure associated with the content creator. In some embodiments, the content creation device 104 may store at least some user interface data locally to facilitate display of a user interface.

At block 412, the content creation device 104 may receive input related to creation of an event/item. For example, a content creator may provide input via the content creation device 104 regarding creation/update of an event/item for a data structure (e.g., creation of an event for a calendar). The input may include one or more values to create/update the event/item. Based on such input, the content creation device 104 may generate event data that includes the one or more values.

At block 414, the content creation device 104 may send the event data to the service provider 102. At block 416, the service provider 102 may receive the event data from the content creation device 104.

At block 418, the service provider 102 may generate object data. For example, based on the event data provided by the content creation device 104, the service provider 102 may generate event object data indicative of an event/item for a data structure. The object data may include one or more parameters that may be associated with one or more values, which may initially be empty. In some embodiments, the object data may be of a real-time data type indicating that the object data is associated with or may be associated with real-time data. Here, the object data may include particular parameters/values for real-time data and/or may be configured in a particular format to distribute real-time data in an efficient manner. In other embodiments, the object data may be of a different type.

At block 420, the service provider 102 may associate one or more values with the object data. For example, the service provider 102 may associate one or more of the values included in the event data from the content creation device 104 with corresponding parameters in the object data. To illustrate, the service provider 102 may analyze the one or more values included in the event data to determine a data type of a value. The service provider 102 may fill in a parameter (e.g., an associated value field) with a value that has the same/similar data type.

At block 422, the service provider 102 may store the object data in association with a data structure. For example, the service provider 102 may store or otherwise associate the object data with a data slot of a data structure associated with a content creator of the content creation device 104.

Although blocks 418-422 are illustrated as being performed by the service provider 102, in some embodiments, the content creation device 104 may alternatively, or additionally, perform one or more of such blocks. Here, event data may not be sent to the service provider 102, and the content creation device 104 may generate object data for an event/item based on input received via the content creation device 104. The content creation device 104 may send the object data to the service provider 102 to associate the object data with a data structure or otherwise make the object data available.

At block 424, the service provider 102 may send a notification regarding the object data to the content consumption device 106. For example, if a content consumer has subscribed to receive updates regarding a data structure of a particular content creator (e.g., is following the particular content creator), the service provider 102 may notify the content consumer of an update to the data structure upon creation of object data for the data structure.

At block 426, the content consumption device 106 may receive the notification from the service provider 102. At block 428, the content consumption device 106 may display the notification. For example, the content consumption device 106 may display the notification via a user interface designed for display of information regarding a data structure. Additionally, or alternatively, the content consumption device 106 may display the notification within a pop-up window or other window on the content consumption device 106.

In FIG. 4-2, at block 430, the service provider 102 may generate user interface data. The user interface data may represent a user interface (e.g., a user interface for a content consumer), one or more visual representations for a data structure/object data, one or more real-time data indicators indicative of real-time data, and so on. In some embodiments, the user interface data may include one or more visual representations for a data structure/object data associated with a content creator.

At block 432, the service provider 102 may send (e.g., transmit) the user interface data to the content consumption device 106. At block 434, the content consumption device 106 may receive the user interface data from the service provider 102.

At block 436, the content consumption device 106 may display a user interface. For example, based on the user interface data, the content consumption device 106 may display a user interface that includes one or more visual representations for a data structure/object data associated with a content creator. The user interface may enable the content consumer to view and/or gain access to data associated with a data structure, such as a data structure for a content creator. In some embodiments, the content consumption device 106 may store at least some user interface data locally to facilitate display of a user interface.

At block 438, the content consumption device 106 may receive access input. For example, the content consumption device 106 may receive a request from a content consumer to acquire access rights to an event of a data structure and/or data associated with the event/item.

At block 440, the content consumption device 106 may send a data access request to the service provider 102. For example, based on the access input, the content consumption device 106 may generate a data access request and send the data access request to the service provider 102. The data access request may identify the content consumer, the content consumption device 106, and/or the object data that the content consumer is requesting to access. In some embodiments, the data access request may include transaction data to facilitate acquisition of object data, such as data to facilitate a financial transaction. At block 442, the service provider 102 may receive the data access request from the content consumption device 106.

At block 444, the service provider 102 may perform an authorization process to acquire access to an event/item and/or data associated with the event/item. The authorization process may be performed based on/in response to receiving the data access request. The authorization process may include one or more of blocks 446-456 to determine if a content consumer/transaction is authorized to acquire access to the event/item and/or data associated with the event/item.

At block 446, the service provider 102 may send transaction data to the bank service provider 402. The transaction data may indicate a monetary value for acquiring access to the event/item (e.g., a price for viewing the event), a content consumer requesting the access (e.g., the buyer/purchaser), a content creator associated with the event/object data (e.g., the seller/merchant), a bank or other institute associated with processing the transaction, and so on.

At block 448, the bank service provider 402 may receive the transaction data. At block 450, the bank service provider 402 may perform one or more authorization communications to determine if the content consumer is authorized for the transaction. For example, the bank service provider 402 may determine if there are sufficient funds in an account, such as a bank account associated with the content consumer. At block 452, the bank service provider 402 may send authorization data indicative of whether or not the content consumer is authorized for the transaction (e.g., whether or not the transaction has been processed, whether or not there are sufficient funds, etc.).

At block 454, the service provider 102 may receive the authorization data from the bank service provider 402. At block 456, the service provider 102 may determine if the user is authorized to access the event/item and/or object data associated with the event/item. For example, if the authorization data indicates that a transaction is processed/authorized for a content consumer, the service provider 102 may determine that the content consumer is authorized to access the event/item. In contrast, if the authorization data indicates that the transaction was not processed/authorized for a content consumer, the service provider 102 may determine that the content consumer is not authorized to access the event/item. In some embodiments, the service provider 102 may provide a notification to a content consumer indicative of whether or not the content consumer is authorized to access an event/item.

In some embodiments, the authorization process 444 may be performed without communicating with the bank service provider 402. For example, the service provider 102 may manage funds/value in a digital account (e.g., a digital currency, rewards, points, etc.). A content consumer may use such account to acquire access to an event/item. Here, the service provider 102 may determine if there are sufficient funds/value in the account to acquire access to the event/item. In some embodiments, a content consumer or another user may receive funds/value from the service provider 102 by performing particular tasks, such as following a content creator, purchasing/watching real-time data, promoting a content creator, and so on.

At block 458, the service provider 102 may associate object data with a data structure. In some examples, if the authorization process 444 determines that a content consumer is authorized to access an event/item of a content creator, the service provider 102 may associate at least a portion of object data for the event/item with a data structure that is associated with the content consumer (e.g., associate a calendar event of a content creator with a calendar of a content consumer). Further, in some examples, object data may be associated with a data structure of a content consumer without having performed the authorization process 444. For example, a content consumer may desire to save object data for an event/item of a data structure associated with a content creator to a data structure associated with the content consumer. If the event/item requires acquisition, the event/item may be acquired at a later time (e.g., using the authorization process 444).

In FIG. 4-3, at block 460, the content creation device 104 may display a notification regarding an event/item in a data structure. For example, in response to detecting that an event is about to occur (e.g., in less than a threshold amount of time), and the event is associated with distributing real-time data, the content creation device 104 may display a notification that the event is about to occur (e.g., as a reminder). In some embodiments, the service provider 102 may notify the content creation device 104 that the event is about to occur.

At block 462, the content creation device 104 may generate real-time data. For example, the content creation device 104 may capture real-time data regarding an environment in which the content creation device 104 is located. The real-time data may be associated with an event/item of a data structure, such as a data-streaming event. In some embodiments, the real-time data may include real-time image data, such as a live video. At block 464, the content creation device 104 may send the real-time data and/or an identifier indicative of the event/item to the service provider 102. In examples, the identifier may comprise a unique identifier identifying the event/item/object data.

At block 466, the service provider 102 may perform a real-time data process. For example, the real-time data process may include one or more of blocks 468-474 to facilitate distribution of the real-time data over one or more networks to one or more devices, which may be located remotely to the service provider 102.

At block 468, the service provider 102 may receive the real-time data and/or the identifier from the content creation device 104. At block 470, the service provider 102 may associate the real-time data with a data structure and/or object data associated with the event/item. For example, the service provider 102 may use the identifier from the content creation device 104 to identify object data for the event/item. The service provider 102 may store or otherwise associate the real-time data with the object data. In some embodiments, the real-time data is stored in a database associated with the service provider 102.

At block 472, the service provider 102 may determine that a user is associated with the object data. For example, the service provider 102 may determine that the object data is associated with a data structure of a content consumer (e.g., at least a portion of the object data has been stored in the data structure of the content consumer) and/or that the object data includes an access value for the content consumer (e.g., indicative of the content consumer being authorized to access the associated event/item).

At block 474, the service provider 102 may send the real-time data and/or the identifier of the event/item to the content consumption device 106. At block 476, the content consumption device 106 may receive the real-time data and/or the identifier.

At block 478, the content consumption device 106 may display the real-time data. For example, the real-time data may be displayed via a user interface that is dedicated to providing information regarding a data structure, such as a calendar-type user interface that is designed for calendar data.

In some embodiments, the content consumption device 106 may display a notification regarding the real-time data, at block 480. For example, in response to detecting that an event is about to occur (e.g., in less than a threshold amount of time), and/or the event is associated with distributing real-time data, the content consumption device 106 may display a notification that the event is about to occur. In some embodiments, the service provider 102 may notify the content consumption device 106 that the event is about to occur.

In FIG. 4-4, at block 482, the content consumption device 106 may receive feedback input. For example, while real-time data is being displayed via the content consumption device 106, a content consumer may provide a thumbs-up, thumbs down, rating, ranking, score, and so on, regarding the real-time data. The feedback input may be provided via the same user interface that is used to display the real-time data, in some cases.

At block 484, the content consumption device 106 may send feedback data to the service provider 102. The feedback data may include or be based on the feedback input. As such, the feedback data may be indicative of how the real-time data is being received by the content consumer. In some embodiments, the feedback data may include an identifier indicative of the event/item and/or the real-time data.

At block 486, the service provider 102 may receive the feedback data from the content consumption device 106. At block 488, the service provider 102 may associate the feedback data with real-time data. For example, the service provider 102 may use the identifier in the feedback data to identify an event/item and/or real-time data. In some embodiments, the service provider 102 may store the feedback data in a database associated with the service provider 102.

At block 490, the service provider 102 may send at least a portion of the feedback data to the content creation device 104. In some embodiments, the feedback data may be sent in the form of user interface data, which is displayable via a user interface. The feedback data may be sent while the real-time data is being distributed and/or at another time. At block 491, the content creation device 104 may receive the feedback data from the service provider 102.

At block 492, the content creation device 104 may display at least a portion of the feedback data. For example, the feedback data may be displayed to a content creator that captured the real-time data. In some embodiments, the feedback data is displayed to the content creator as the real-time data is being captured, such as in an overlaid manner over a camera view. This may enable the content creator to view how the real-time data is being received in a live manner. However, the feedback data may be displayed at any time, such as after a data-streaming event (e.g., a broadcast). In some embodiments, the feedback data may be displayed in a graph or with another visual representations to indicate how positive/negative the reception is of the real-time data.

At block 493, the service provider 102 may analyze data associated with one or more data structures. In examples, the service provider 102 may analyze one or more data structures to identify a data slot/time period that is most available across content consumers, a data slot/time period that is most filled (e.g., scheduled), a type of object data that is most/least associated with a data structure (e.g., data structures that include more real-time events than other types of events), a data slot/time period that is most filled for a particular type of data object data (e.g., evenings are most frequently scheduled for real-time data events), and so on. Further, in examples, the service provider 102 may analyze transaction data to identify a most/least/average acquisition value for real-time data (e.g., an average price for an event/item), a type of content consumer that is most/least frequently authorized/not authorized to access an event/item, a total number of acquisitions of a particular event/item (e.g., a number of purchases of an event/item), a total monetary value paid for a particular event/item (e.g., total revenue for publishing real-time data for the event/item), a total number of acquisitions of events/items associated with a content creator (e.g., a number of purchases of events/items associated with the content creator), a total monetary value paid for events/items associated with a content creator (e.g., total revenue earned by a content creator for multiple events/items), and so on. Moreover, in examples, the service provider 102 may analyze feedback data to identify a data slot/time period during which the most/least amount of positive/negative feedback is received.

At block 494, the service provider 102 may generate metric data based on the analysis of the data. The metric data may be indicative of any of the information identified in the analysis. At block 495, the service provider 102 may send the metric data to the content creation device 104. In some embodiments, the metric data may additionally, or alternatively, be sent to the content consumption device 106. In examples, the metric data may be provided as a recommendation, such as a suggested time to a content creator to schedule an event (e.g., a time period during which the most content consumers may likely view the event).

At block 496, the content creation device 104 may receive the metric data from the service provider 102. At block 497, the content creation device 104 may display the metric data. In some embodiments, the metric data is received and/or displayed during a real-time event. However, the metric data may be received and/or displayed at any time, such as after a real-time event.

FIGS. 5-1 through 5-7 and FIGS. 6-1 through 6-9 illustrate example interfaces that may be presented according to one or more embodiments. The interfaces (also referred to as "user interfaces") may be provided via a web browser, an application (e.g., a mobile application, desktop application etc.), and so on. The interfaces of FIGS. 5-1 through 5-7 may generally be presented via a content creation device to manage a data structure associated with a content creator. Meanwhile, the interfaces of FIGS. 6-1 through 6-7 may generally be presented via a content consumption device. However, the interfaces may be presented via any device. Further, in examples, a service provider may communicate with a content creation device and/or a content consumption device to facilitate one or more of the interfaces. The interfaces of FIGS. 5-1 through 5-7 and FIGS. 6-1 through 6-9 are discussed in the context of calendar data, with a data structure representing a calendar and object data representing an event, such as a concert, a book release, a live performance, etc. However, it should be appreciated that the interfaces may be displayed in a similar manner in other contexts. In some embodiments, an event may include a data-streaming event (also referred to as a "real-time event" or "live event") associated with distributing data (e.g., image-based data) in real-time over one or more networks. In some embodiments, a data-streaming event may be viewed upon acquiring the data-streaming event (e.g., upon acquiring access to the data-streaming event). In such cases, a data-streaming event may be referred to as a pay-per-view event.

Figures 1, 5:
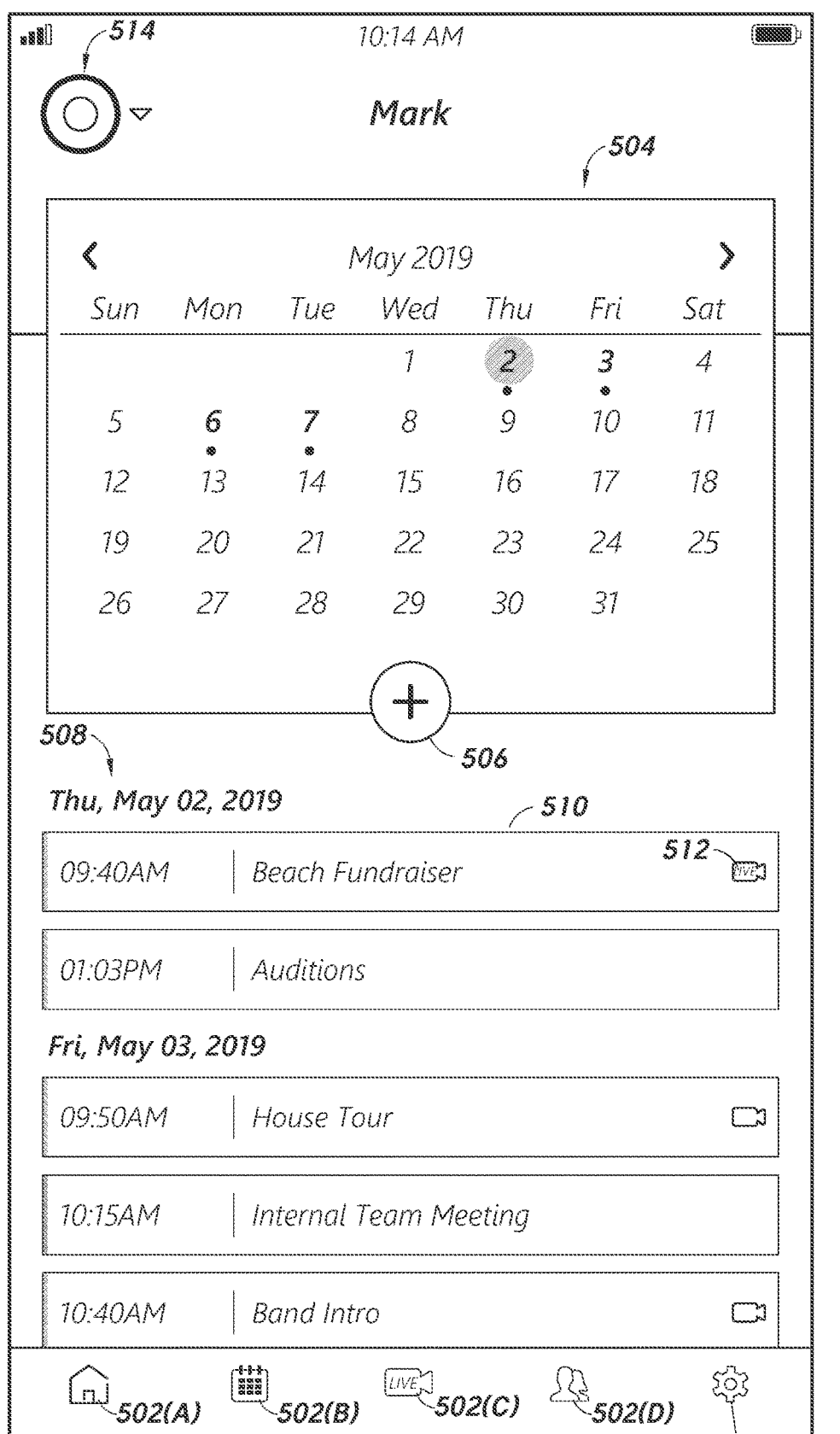
Figures 2, 5:
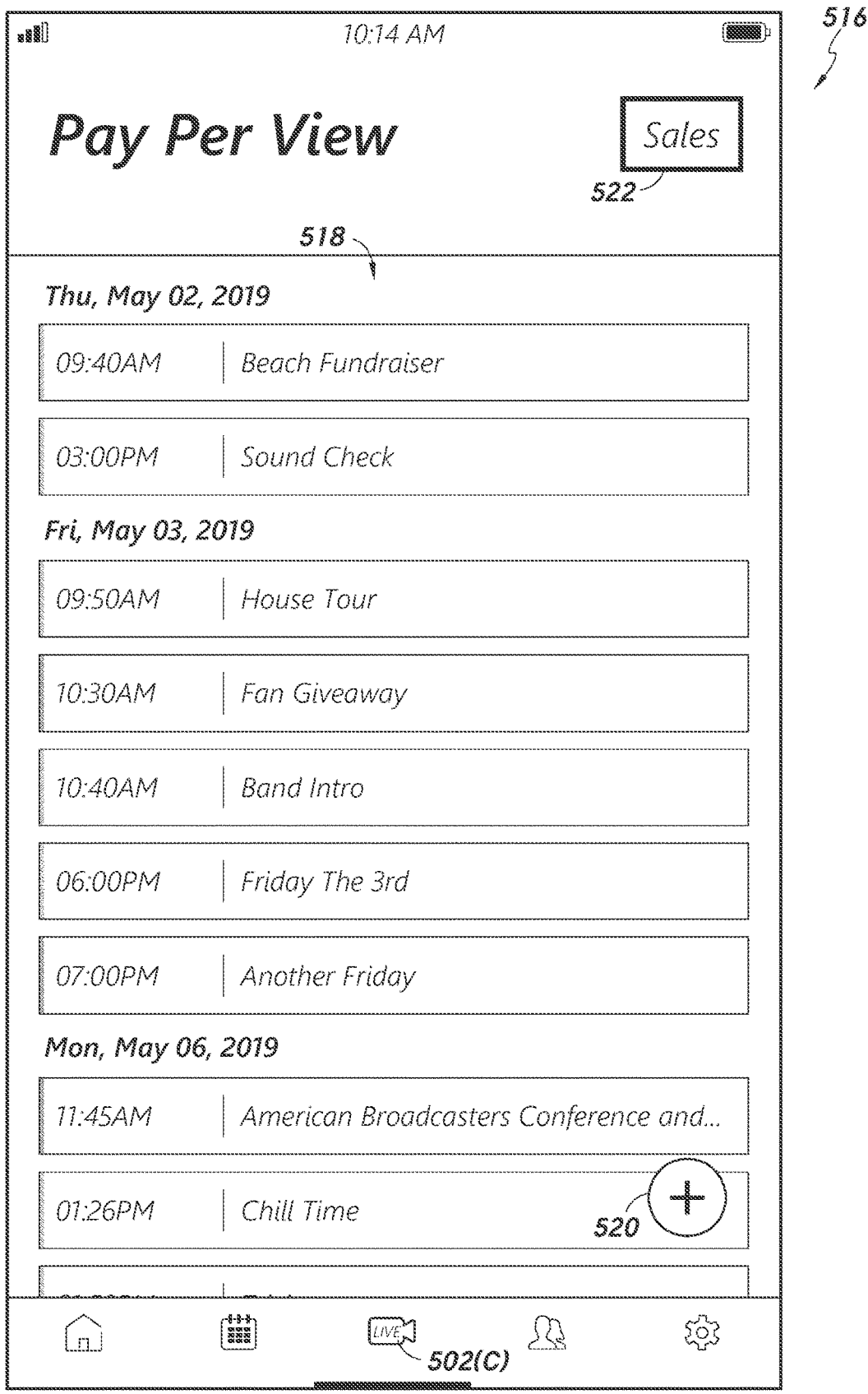
Figures 3, 5:
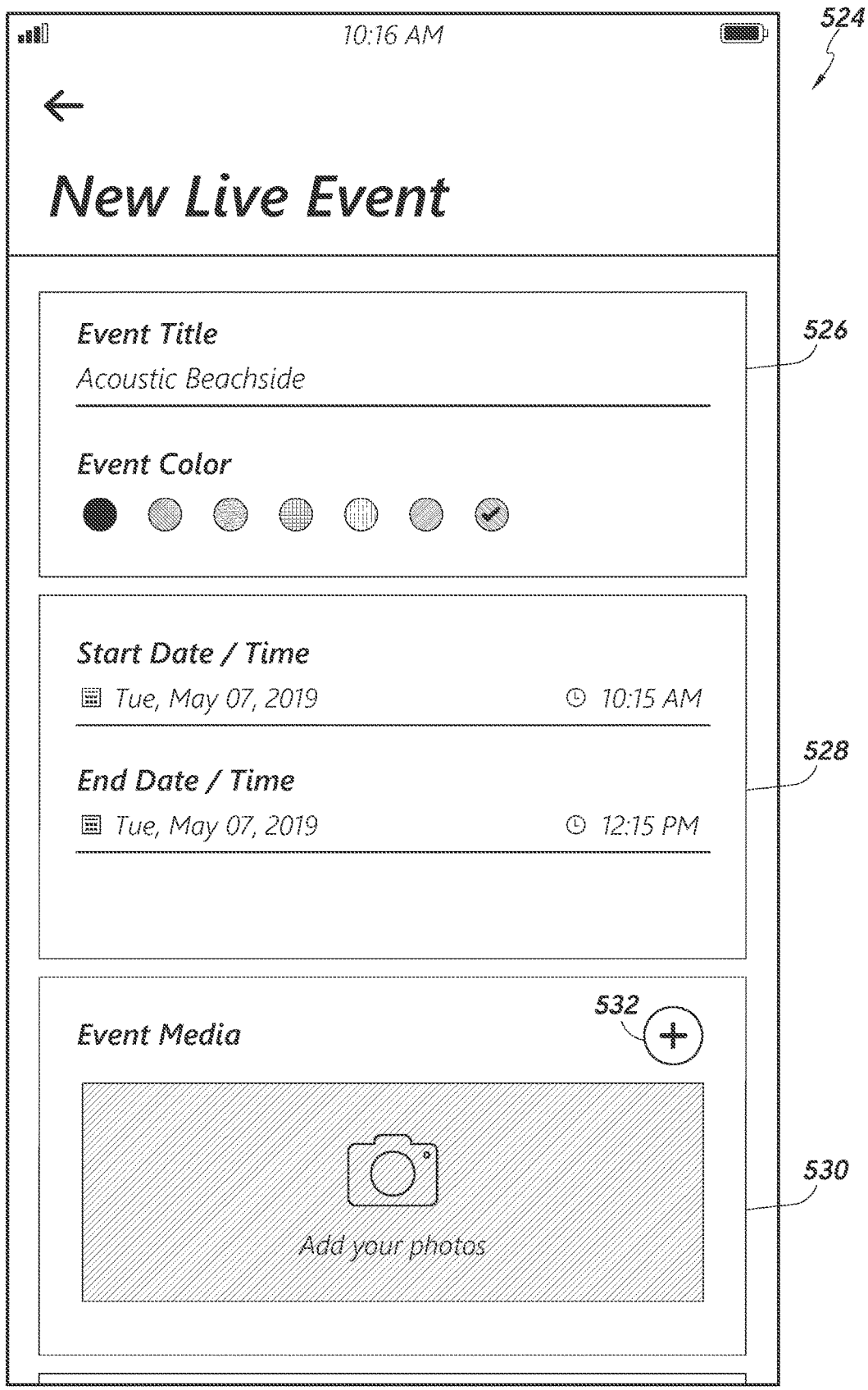
Figures 4, 5:
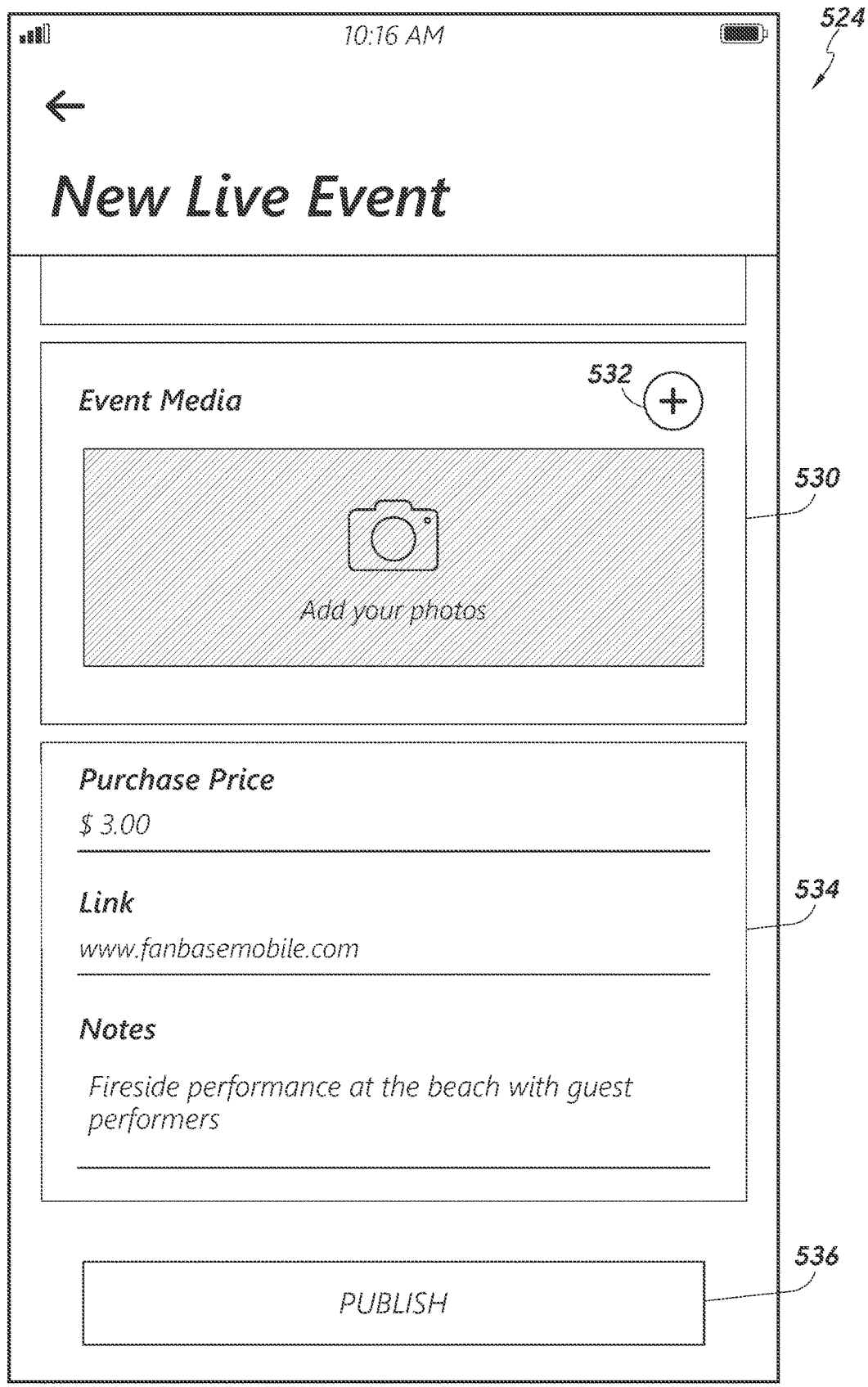
Figure 5:
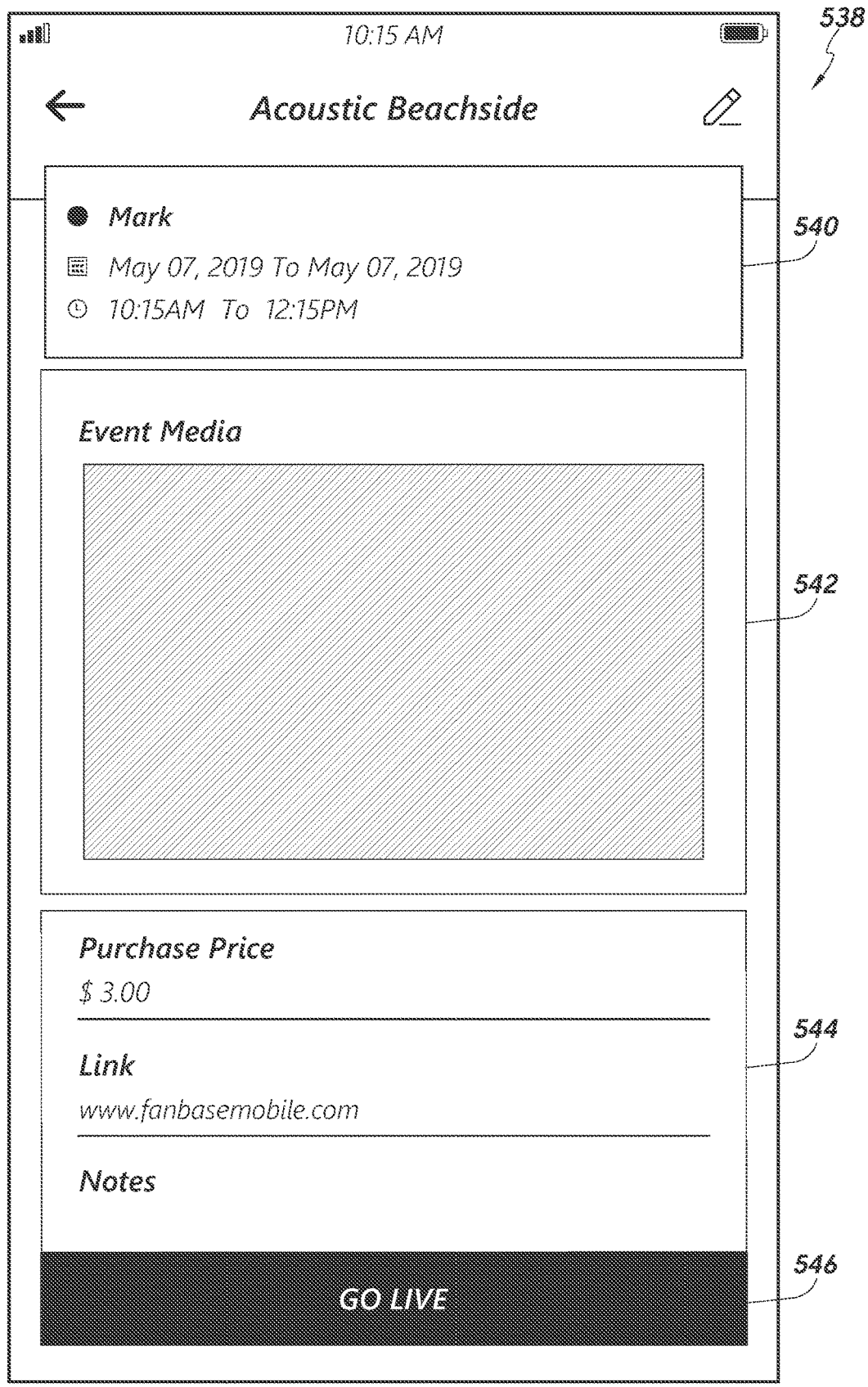

FIG. 5-1 illustrates an example interface 500 to provide information regarding a calendar associated with a content creator (e.g., with a username of "Mark"). The user interface 500 may include a plurality of visual representations 502(A)-502(E) (also referred to as "icons 502") to navigate to different screens/interfaces (e.g., when selected by the content creator). For example, the visual representation 502(A) may enable the content creator to navigate to a home screen (e.g., a main calendar view for the content creator, such as that of FIG. 5-1), the visual representation 502(B) may enable the content creator to manage draft events (e.g., view draft events, edit draft events, publish draft events, and so on), the visual representation 502(C) may enable the content creator to navigate to a list view of data-streaming events (e.g., FIG. 5-2), the visual representation 502(D) may enable the content creator to view content consumers that are following the content creator (e.g., following a calendar of the content creator or otherwise following the content creator), and the visual representation 502(E) may enable the content creator to configure one or more settings.

The interface 500 includes a calendar section 504 that presents a calendar associated with the content creator. The calendar section 504 includes a visual representation 506 which, when selected, enables an event to be added to the calendar, as discussed in further detail below. The user interface 500 also includes an event list section 508 that lists events that have been scheduled for a period of time. In this example, the content creator has selected May 2 in the calendar section 504 and the event list section 508 is updated to show events on May 2 or after. Here, events that are data-streaming events are illustrated with a real-time data indicator. For instance, the event 510 is illustrated with a real-time data indicator 512 (also referred to as "the live event indicator 512"), which may indicate that the event is associated with streaming data. That is, the event will include capturing real-time data by a content creation device and distributing the real-time data to one or more content consumption devices in a streaming manner (e.g., in substantially real-time). In examples, a real-time data indicator may include the term "live," as illustrated for the real-time data indicator 512. The interface 500 also includes an icon 514 to represent the content creator, which may be set or otherwise configured for an account associated with the content creator.

FIG. 5-2 illustrates an example interface 516 to provide a list 518 of data-streaming events, such as upcoming pay-per-view events that have been scheduled. In this example, the interface 516 is presented upon selection of the visual representation 502(C). The list 518 may include data-streaming events that have been scheduled beginning on the date May 2, which was selected in FIG. 5-1. Although not illustrated with real-time data indicators, any of the events may be listed with a real-time data indicator. Here, each of the data-streaming events is a pay-per-view event, which requires acquisition of the event (e.g., through a financial transaction). The interface 516 also includes a visual representation 520 which, when selected, enables an event to be added to the calendar, as discussed in further detail below. Further, the interface 516 includes an icon 522 which, when selected, presents transaction data for the content creator (e.g., FIG. 5-7).

FIGS. 5-3 and 5-4 illustrates an example interface 524 to create a new event. In examples, the interface 524 may be presented upon selection of the icon 506 in FIG. 5-1 and/or upon selection of the icon 520 and FIG. 5-2. The interface 524 may enable the content creator to provide one or more values for the creation of an event. In examples, the portion of the interface 524 that is shown in FIG. 5-3 may be initially displayed and the portion of the interface 524 that is shown in FIG. 5-4 may be displayed when the content creator scrolls down or otherwise navigates within the interface 524.

As shown in FIG. 5-3 the interface 524 may include a window 526 to input a title for the event and/or designate a color to be associated with the event in the calendar. Further, the interface 524 may include a window 528 to input a date/time for the event and a window 530 to associate content with the event (e.g., a media item). For example, the content creator may select an icon 532 to upload/capture a content item for the event listing in the calendar, such as an image, video, audio, or other content. Such content may be displayed when information about the event is viewed.

As shown in FIG. 5-4, the interface 524 may also include a window 534 to provide an acquisition value for acquiring access to the event (e.g., a price for viewing the event), a link to associate with the event (e.g., a website), and notes to associate with the event (e.g., text in the example of FIG. 5-4). This may allow the content creator to establish a customized price for an event. In some embodiments, the interface 524 may include an interface item to enable a content creator to input a location for an event (e.g., a public appearance location, a location of a concert, etc.). Further, in some embodiments, information may be input into the interface 524 (and/or any other interface) via a drop-down menu. For example, the purchase price field of the window 534 may be implemented as a drop-down menu with predetermined amounts.

Upon selecting a button 536 in the interface 524, as shown in FIG. 5-4, the new event may be created in the calendar based on the values provided via the interface 524. That is, the new event may be scheduled in the calendar associated with the content creator based on the information received through the interface 524. In examples, the values may be sent to a service provider for creation of an event for a calendar of the content creator. Once the event has been created, the event may be made available to one or more content consumers (or otherwise available), so that the one or more content consumers may view events that are scheduled by the content creator, save events to calendars associated with the one or more content consumers, and/or purchase access to the event, if desired. Once created, the new event may also be made available within a calendar view on the content-creator side, such as via the interface 500 of FIG. 5-1, the interface 516 of FIG. 5-2, and/or other interfaces discussed herein.

FIG. 5-5 illustrates an example interface 538 to initiate broadcasting real-time data for a data-streaming event. In examples, the interface 538 may be displayed upon selection of the event within a calendar view, such as via selection of the event in the interface 500 of FIG. 5-1, the interface 516 of FIG. 5-2, and/or another interface. The interface 538 includes a window 540 with information indicating a content creator of the event, a date for the event, and a time for the event. The interface 538 also includes a window 542 to provide a content item that is been associated with the event and a window 544 indicating a purchase price for the event, a link for the event, and notes for the event. Upon selection of a button 546, a content creation device associated with the interface 538 may begin capturing real-time data (e.g., via the interface of FIG. 5-6) and making the real-time data available to others, such as by sending the real-time data to a service provider for distribution. In examples, the button 546 may only be selected (and real-time data captured for distribution) at or after the start time of the event. However, in other examples the button 546 may be selected prior to the start time of the event, such as within a number of seconds/minutes before the event starts. In some embodiments, the interface 538 may include a count-down time that indicates an amount of time until the event starts.

Figures 5, 6:
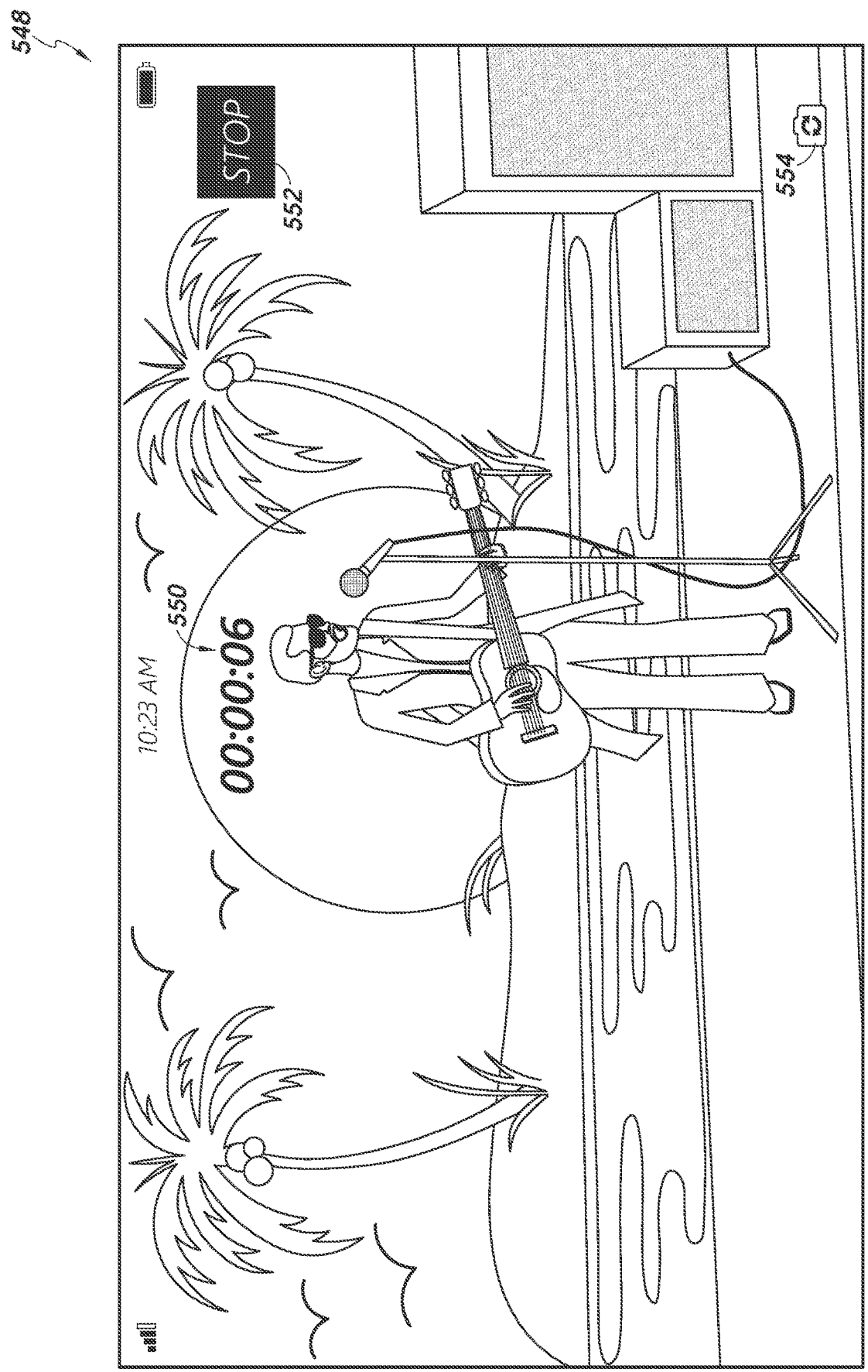

FIG. 5-6 illustrates an example interface 548 to present real-time data regarding a data-streaming event. In examples, the interface 548 may be displayed upon selection of the button 546 in FIG. 5-5. The interface 548 may display real-time data via the content creation device as the real-time data is being captured by the content creation device. The interface 548 may display an amount of time 550 that has elapsed since initiating capture of the real-time data, a button 552 to stop recording of the real-time data, and an icon 554 to switch the recording between a forward-facing camera and a rear-facing camera of the content creation device. The real-time data may be sent to a service provider for distribution to one or more content consumers. In examples, if a broadcast is interrupted while capturing real-time data, the interface 538 of FIG. 5-5 may be displayed again to enable the content creator to reinitiate the live feed. In some examples, there may be a limit on how long a data-streaming event may last. However, in other examples, a data-streaming event may last as long as desired. In some embodiments, feedback data from content consumers may be displayed via the interface 548. Further, in some embodiments, the interface 548 may provide a visual representation indicative of a number of users that are currently viewing the real-time data, such as a number of users, a graph for a number of users that are joining the data streaming event, and so on.

In the example of FIG. 5-6 the interface 548 is displayed in a landscape mode. In some embodiments, the interface 548 may be displayed in a default mode, even if the content creation device is positioned in an orientation that would normally be associated with a different mode. To illustrate, the interface 548 may be displayed in a landscape mode, even if the device is oriented for a portrait mode. This may force a content creator to a particular orientation to capture real-time data in the landscape mode, which may be better suited for broadcast in some examples. However, the interface 548 may be displayed in any orientation mode (e.g., a landscape mode, a portrait mode, etc.) and/or switch between orientations.

Figures 5, 6, 7:
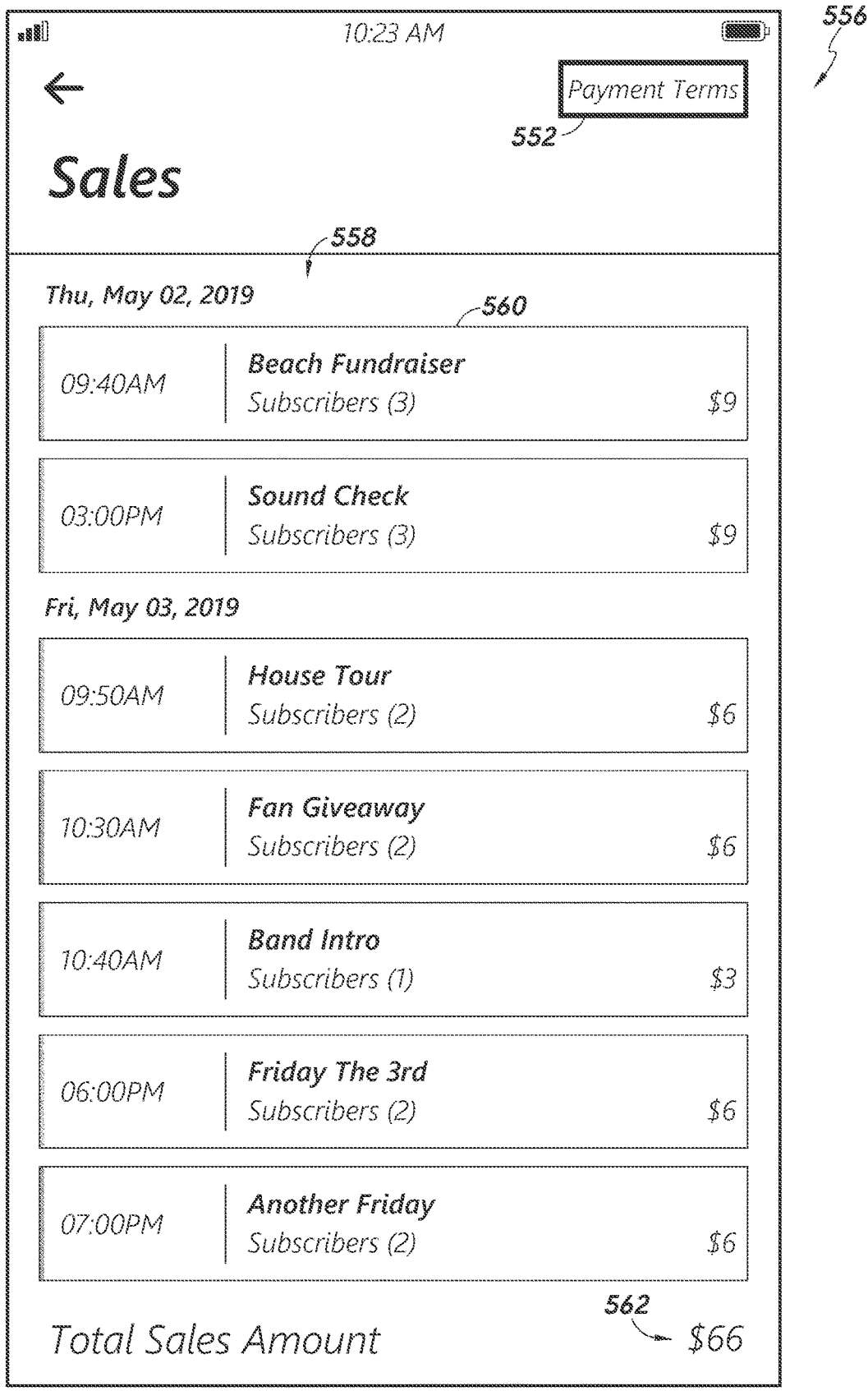

FIG. 5-7 illustrates an example interface 556 to present subscription and acquisition information regarding data-streaming events for a content creator. In examples, the interface 556 may be displayed upon selection of the icon 522 in FIG. 5-2. The interface 556 includes a list 558 of data-streaming events that have occurred for the content creator and/or data-streaming event that are scheduled to occur, along with subscription and acquisition information regarding the data-streaming events. For example, the list 558 includes information for an event 560 indicating a number of users have acquired access to the event 560 (i.e., 3 subscribers) and the total value/revenue earned from such acquisitions (i.e., $9). The interface 556 also presents a total value/revenue 562 earned from acquisitions of events associated with the content creator (i.e., $66).

In some embodiments, a service provider may provide 100% of the value/revenue associated with data-streaming events to a content creator. Alternatively, in some embodiments, the service provider may take a portion of value/revenue. In examples, a portion of monetary value that is paid to a content creator is based on a type of the content creator. To illustrate, a first type of content creator (e.g., associated with more sales, having used the pay-per-view service a longer period of time, associated with a particular classification, etc.) may receive a larger portion of sales in comparison to a second type of content creator (e.g., associated with less sales, having used the pay-per-view service a shorter period of time, etc.). In examples, the interface 556 may present a total value/revenue (e.g., a gross amount of sales) and/or a total value/revenue owed to a content creator (e.g., a net amount of sales).

In some embodiments, a notification regarding a location of a content creator may be sent to one or more content consumers. As one example, a content creator may provide input via an interface (such as any of the interfaces of FIGS. 5-1 through 5-7) to indicate that the content creator is at a location where an event is to occur (e.g., the content creator has checked-in). A notification may be sent to one or more content consumers that have purchase access to the event and/or are otherwise associated with the event. As another example, a location of a content creation device may be tracked, with the consent of a content creator, and a notification may be automatically sent to one or more content consumers when the content creator is at a location of an event. As yet another example, a notification may be automatically sent to one or more content consumers when the content creator begins broadcasting for the event.

FIG. 6-1 illustrates an example interface 600 to provide information regarding a calendar associated with a content creator (e.g., with a username of "Mark") to a content consumer. The user interface 600 may include a plurality of visual representations 602(A)-602(E) (also referred to as "icons 602") to navigate to different screens/interfaces (e.g., when selected by a content consumer). For example, the visual representation 602(A) may enable the content consumer to view a home screen (e.g., FIG. 6-1), the visual representation 602(B) may enable the content consumer to search for events and/or calendars, the visual representation 602(C) may enable the content consumer to navigate to a list view of data-streaming events (e.g., FIG. 6-2), the visual representation 602(D) may enable the content consumer to view a notification(s) regarding calendars of content creators (e.g., FIG. 6-9), and the visual representation 602(E) may enable the content consumer to configure one or more settings.

The interface 600 includes a calendar section 604 that presents a calendar associated with a content creator, such as a content creator that the content consumer may be following, search for, etc. The user interface 600 also includes an event list section 606 that lists events associated with the content creator for a selected time. In this example, the content consumer has selected May 7 in the calendar section 604 and the event list section 606 is updated to show events on May 7. Events that are data-streaming events may be illustrated with a real-time data indicator. For instance, the event 608 is illustrated with a real-time data indicator 610 (also referred to as "the live event indicator 610"). The real-time data indicator 610 may indicate that the event is associated with streaming data. In examples, a real-time data indicator may include the term "live," as illustrated for the indicator 610. The content consumer may select any of the events in the event list section 606 to view information about the event and/or acquire access to the event. The interface 600 also includes an icon 612 for an image or other content representing the content creator and an icon 614 to follow (or unfollow) the content creator. For example, upon selecting the icon 614, the content consumer may subscribe to receive notifications regarding calendar events that are added to the calendar of the content creator (e.g., follow the content creator). Although the interface 600 includes events associated with a particular content creator in the example of FIG. 6-1, the interface 600 may include events for one or more content creators.

FIG. 6-2 illustrates an example interface 616 to provide a list 618 of data-streaming events, such as data-streaming events associated with one or more content creators. In examples, the interface 616 is presented upon selection of the visual representation 602(C) and selection of a tab 620 in the interface 616. The list 618 may include information regarding data-streaming events for one or more content creators that have been scheduled for May 7, which was selected in FIG. 6-1. Here, each of the data-streaming events is a pay-per-view event, which requires acquisition of the event. For example, the information associated with the event 622 (titled "Acoustic Beachside") indicates that the event for the content creator (i.e., "Mark") starts at 10:15 AM on May 7 and may be purchased for three dollars. The content consumer may select any of the events in the list 618 to view information about the event and/or acquire access to the event. The interface 616 also includes a search field 624 and buttons 626 to search through data-streaming events and/or content creators (e.g., filter data-streaming events/content creators to specific search terms, time periods, etc.). In examples, a content consumer may search for a calendar of a specific content creator, a calendar associated with a particular category, events of a particular category/time period, and so on. The interface 616 also includes a tab 628 to view data-streaming events that have been purchased by the content consumer (e.g., FIG. 6-8).

FIG. 6-3 illustrates an example interface 630 to facilitate acquisition of a data-streaming event. In examples, the interface 630 may be displayed upon selection of an event, such as via selection of the event in the interface 600 of FIG. 6-1, selection of the event 622 in the interface 616 of FIG. 6-2, and/or another interface. The interface 630 includes a window 632 with information indicating a content creator of the event, a date for the event, and a time for the event. The interface 630 also includes a window 634 to provide a content item that is been associated with the event and a window 636 indicating a purchase price for the event, a link for the event, and notes for the event.

Further, the interface 630 includes a button 638 that, when selected, initiates a transaction to acquire access to the data-streaming event (e.g., purchase access rights to the event in the amount of the purchase price). For example, selection of the button 638 may cause display of an interface 640 illustrated in FIG. 6-4. The interface 640 may include a window 642 with event summary information, which may be pertinent to purchasing the event. The interface 640 may include a button 644 that, when selected, may cause a content consumer device to send a data access request to a service provider to initiate an authorization process for the content consumer. If the transaction is authorized, the event may be associated with the content consumer, such as included in a list of purchased events (e.g., FIG. 6-8). Once acquired, the content consumer may view the event in a live manner while the event is occurring and/or in an on-demand manner after the event (e.g., FIG. 6-5). In some embodiments, upon selecting the button 644 to purchase the event, one or more windows and/or additional user interfaces may be displayed to select a type of payment (e.g., credit card, bank account, mobile payment, and/or other account), view that a payment that is successful/unsuccessful, and so on.

Although many examples are discussed in the context of a content consumer selecting an event associated with a content creator and purchasing the event, in some embodiments the content consumer may add the event to a calendar associated with the content consumer. In examples, if the event is a pay-per-view event, the content consumer may later access the calendar associated with the content consumer and acquire access to the event. As such, a content consumer may add any type of event from a calendar of a content creator to a calendar associated with the content consumer and/or may acquire access to the event at any time.

FIG. 6-5 illustrates an example interface 646 to initiate display of data associated with a data-streaming event. In examples, the interface 646 may be presented upon purchasing the data-streaming event and/or selecting the data-streaming event in an interface. As shown, the interface 646 may include various information from the interface 630 of FIG. 6-3, such as the windows 632-636 regarding the data-streaming event. The interface 646 also includes a button 648 to view real-time data associated with the data-streaming event. For example, at and/or after the start time of the event, the content consumer may select the button 648 and view real-time data that is streamed from a content creation device associated with the content creator. FIG. 6-6 illustrates an example interface 650 to provide data for the event in real-time (e.g., in a streaming manner as the event occurs). In some embodiments, a content consumption device may provide a notification before and/or at a time when an event is scheduled to occur. Further, the interface 646 includes a button 652 to view data captured for the event in an on-demand manner, such as after the event has occurred. FIG. 6-7 illustrates an example interface 654 to present data captured for an event (e.g., real-time data that is captured, and also stored for later viewing). Here, the interface 654 includes a window 656 to control playback of the data associated with the event (e.g., pause, play, fast-forward, rewind, etc. the video data). In some embodiments, the interface 646 of FIG. 6-5 may include a count-down time or that indicates an amount of time until an event starts.

Figures 1, 6:
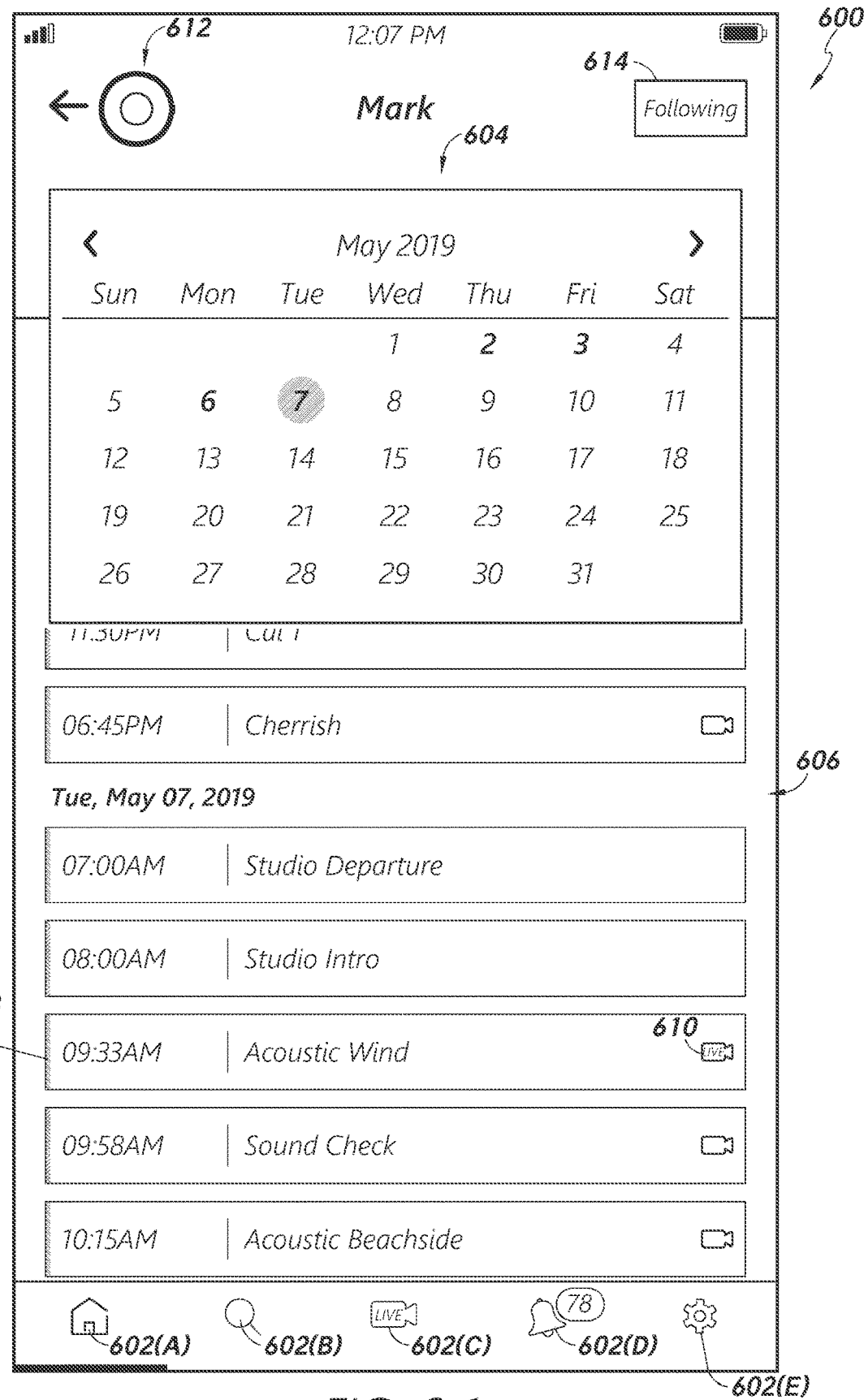
Figures 2, 6:
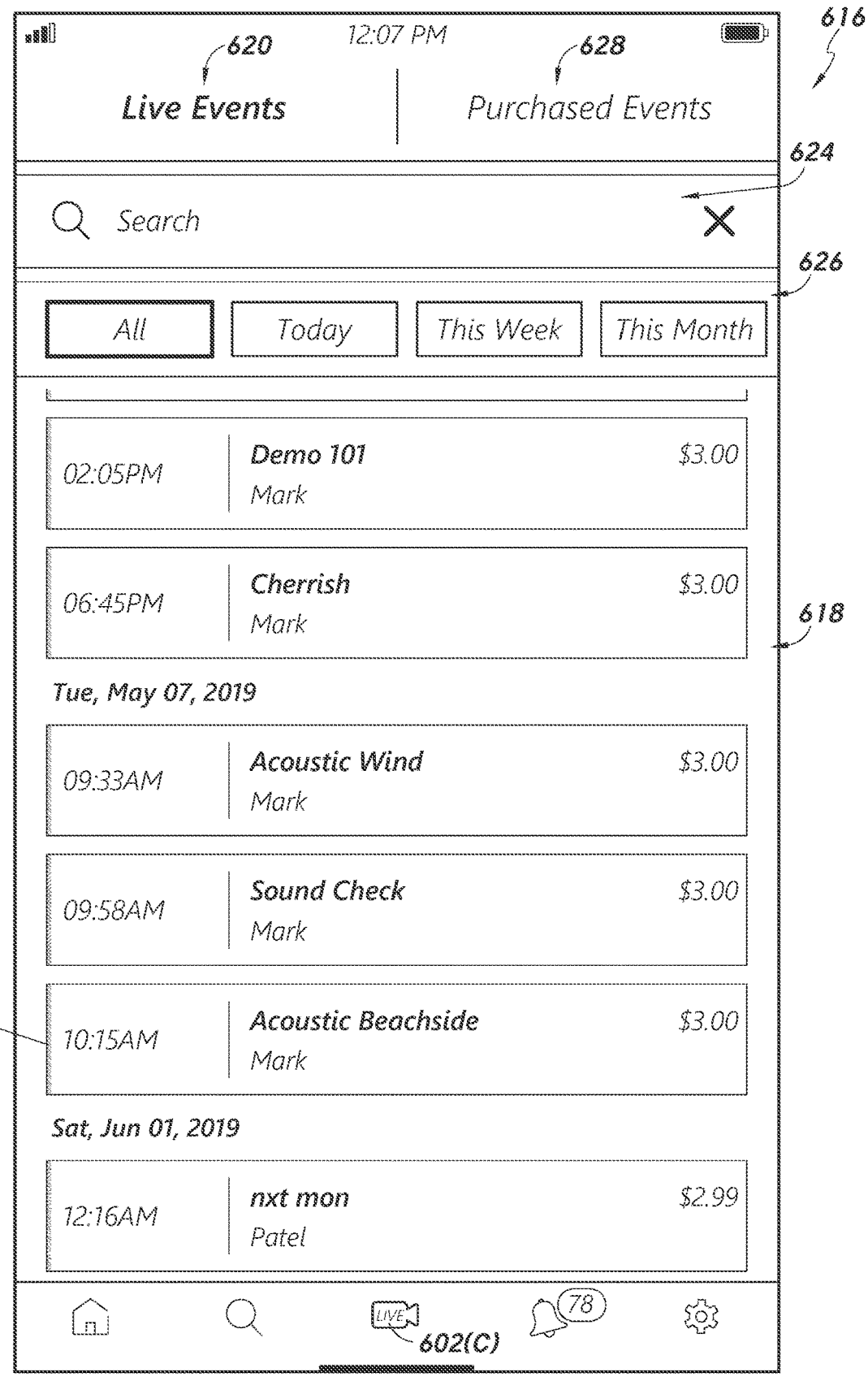
Figures 3, 6:
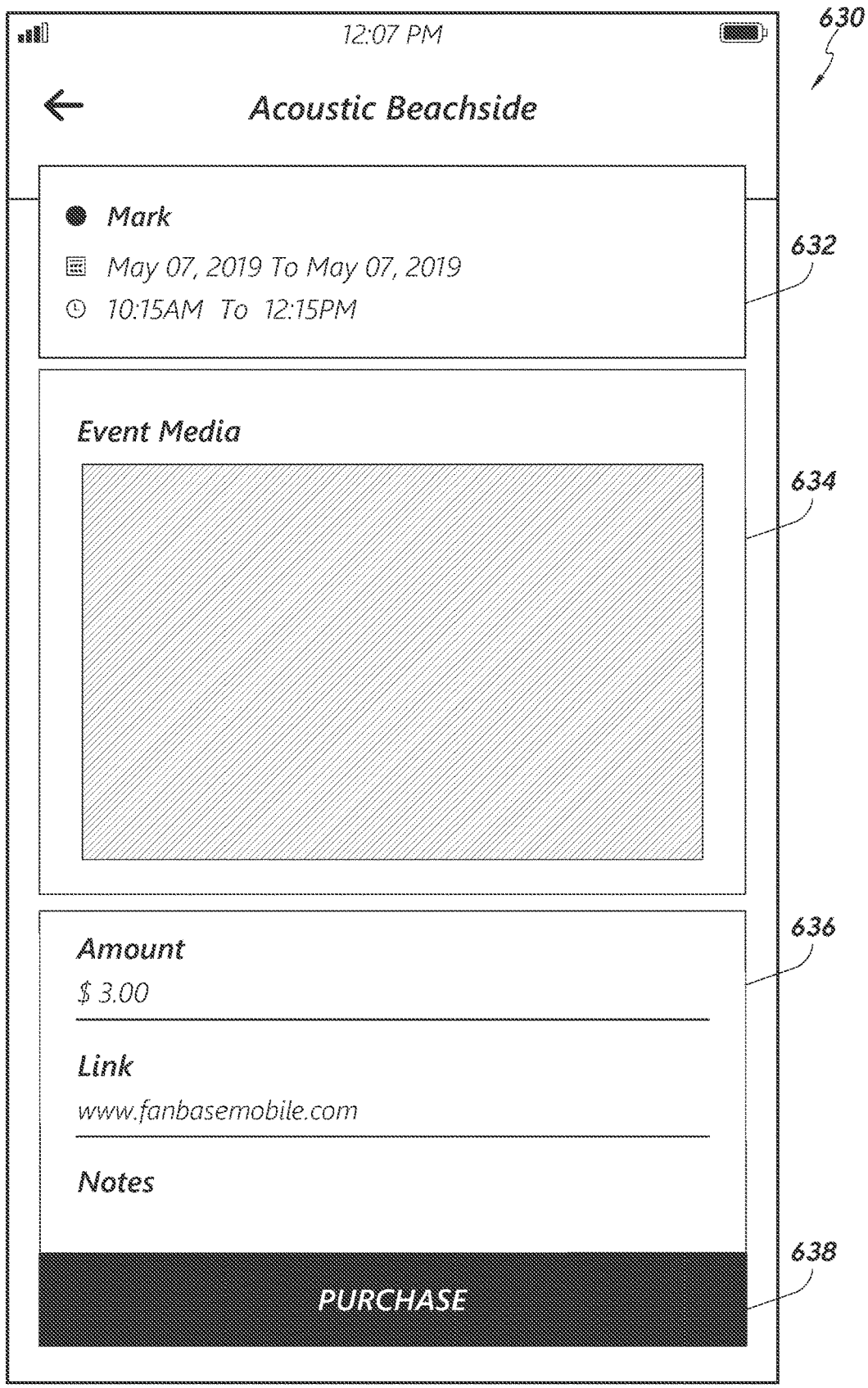
Figures 4, 6:
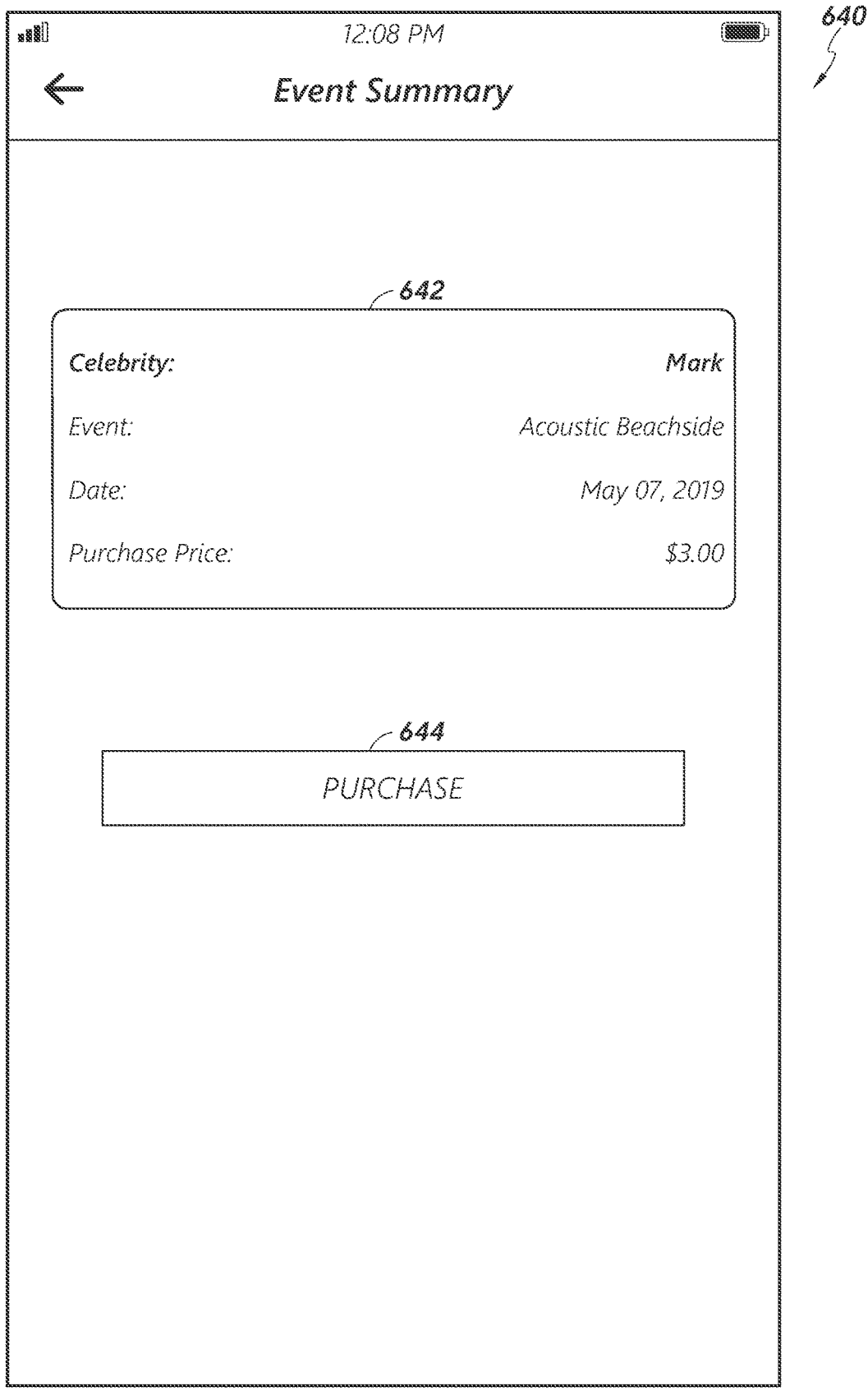
Figures 5, 6:
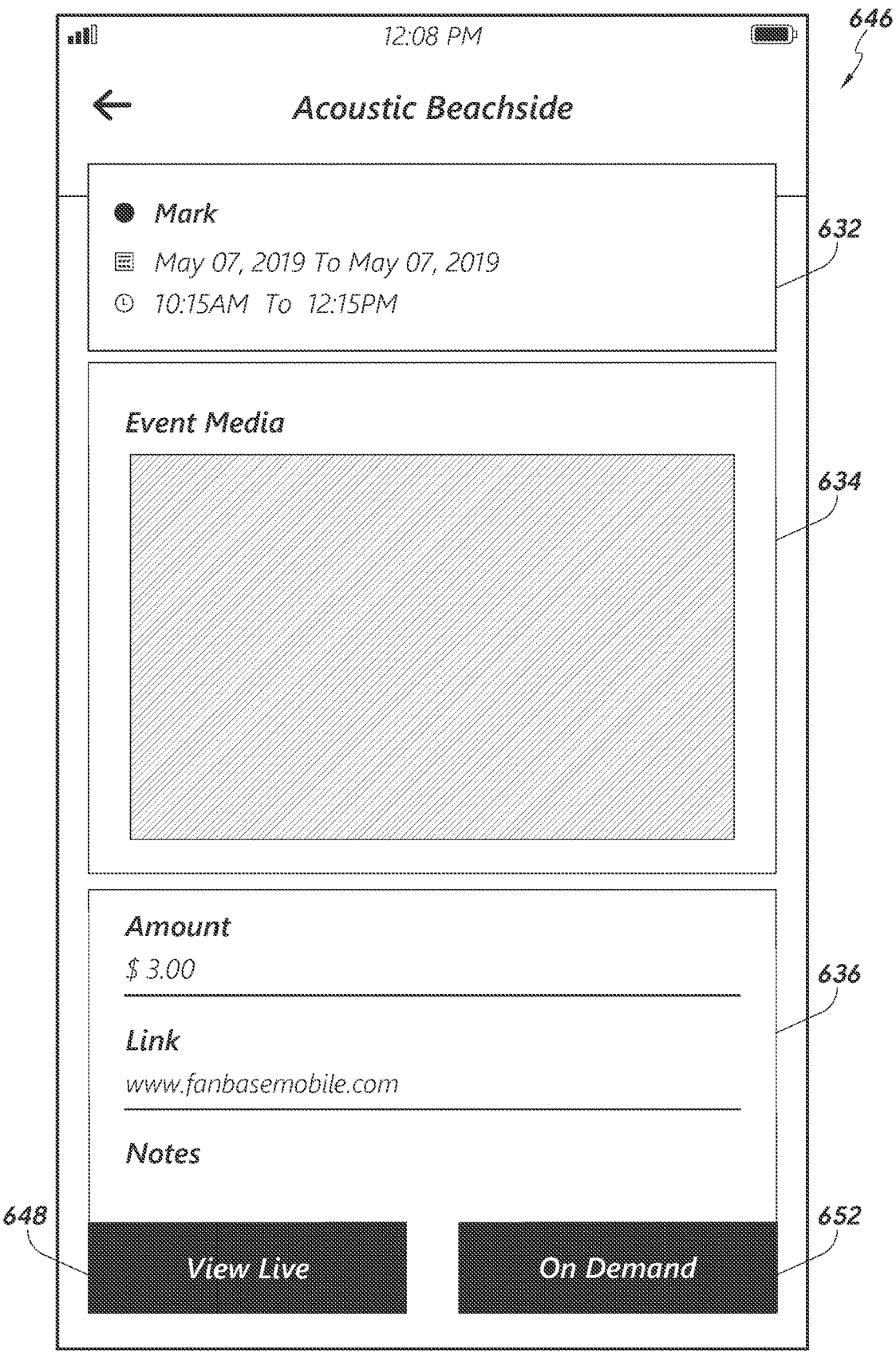
Figure 6:
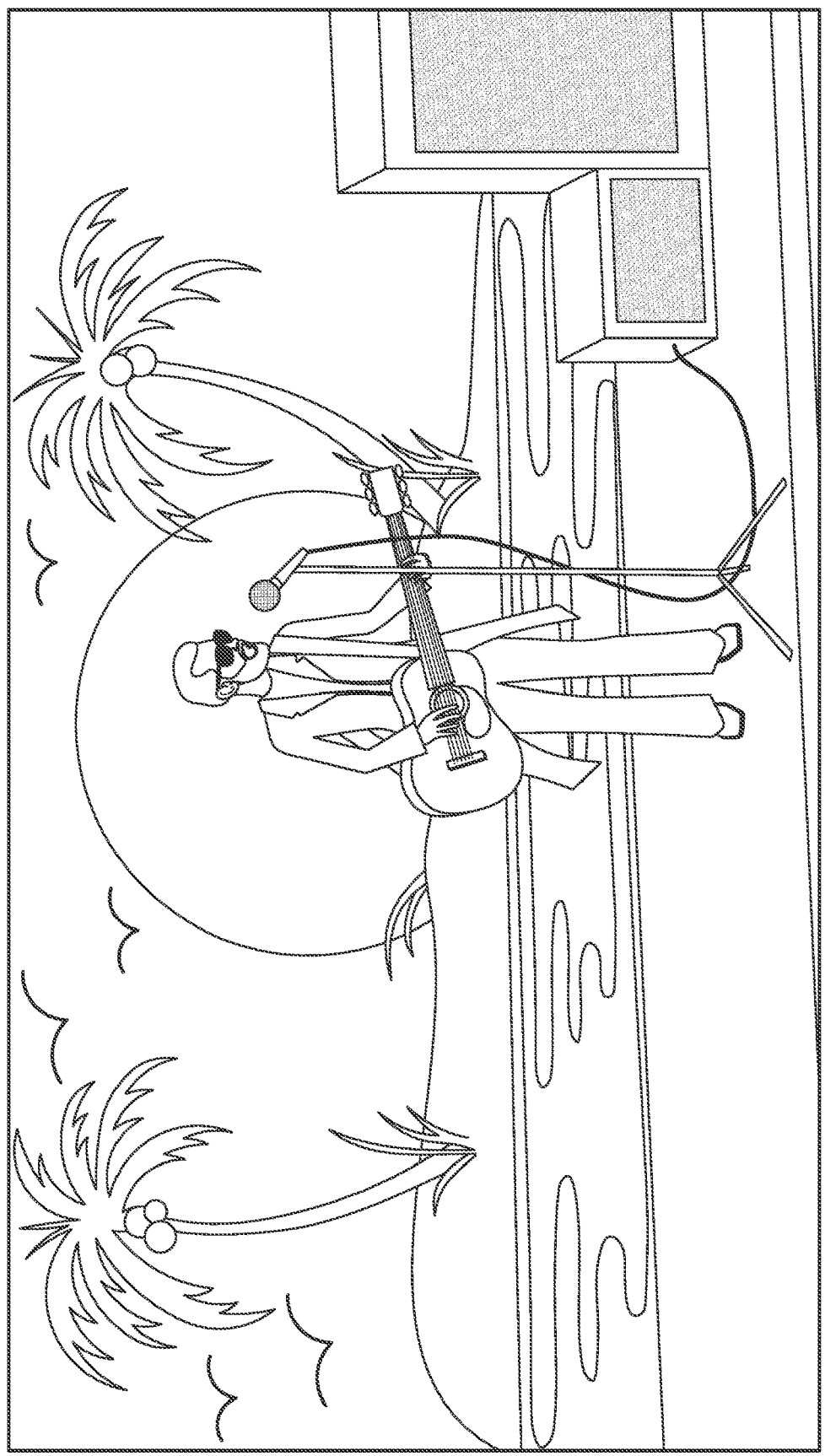
Figures 6, 7:
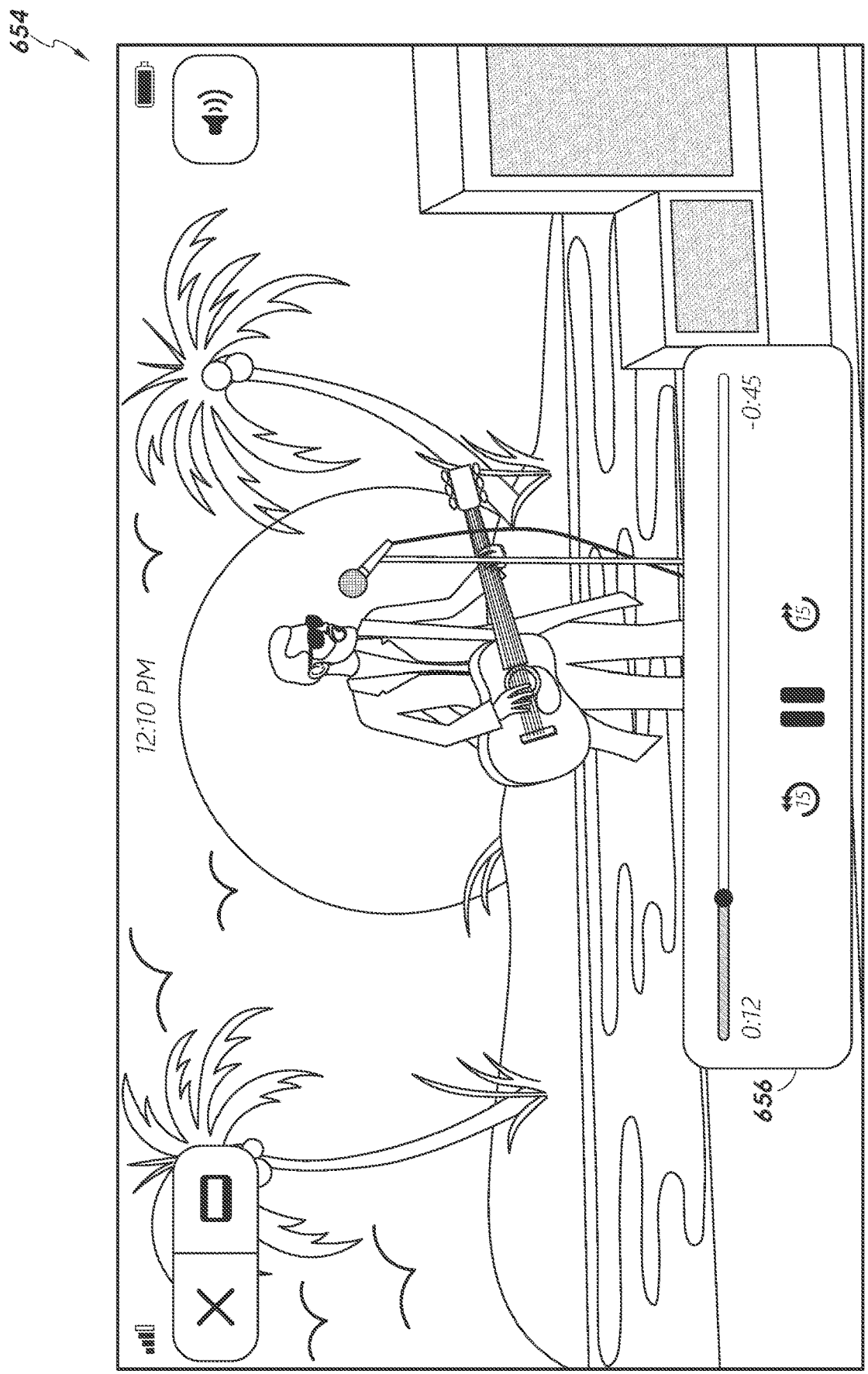
Figures 6, 7, 8:
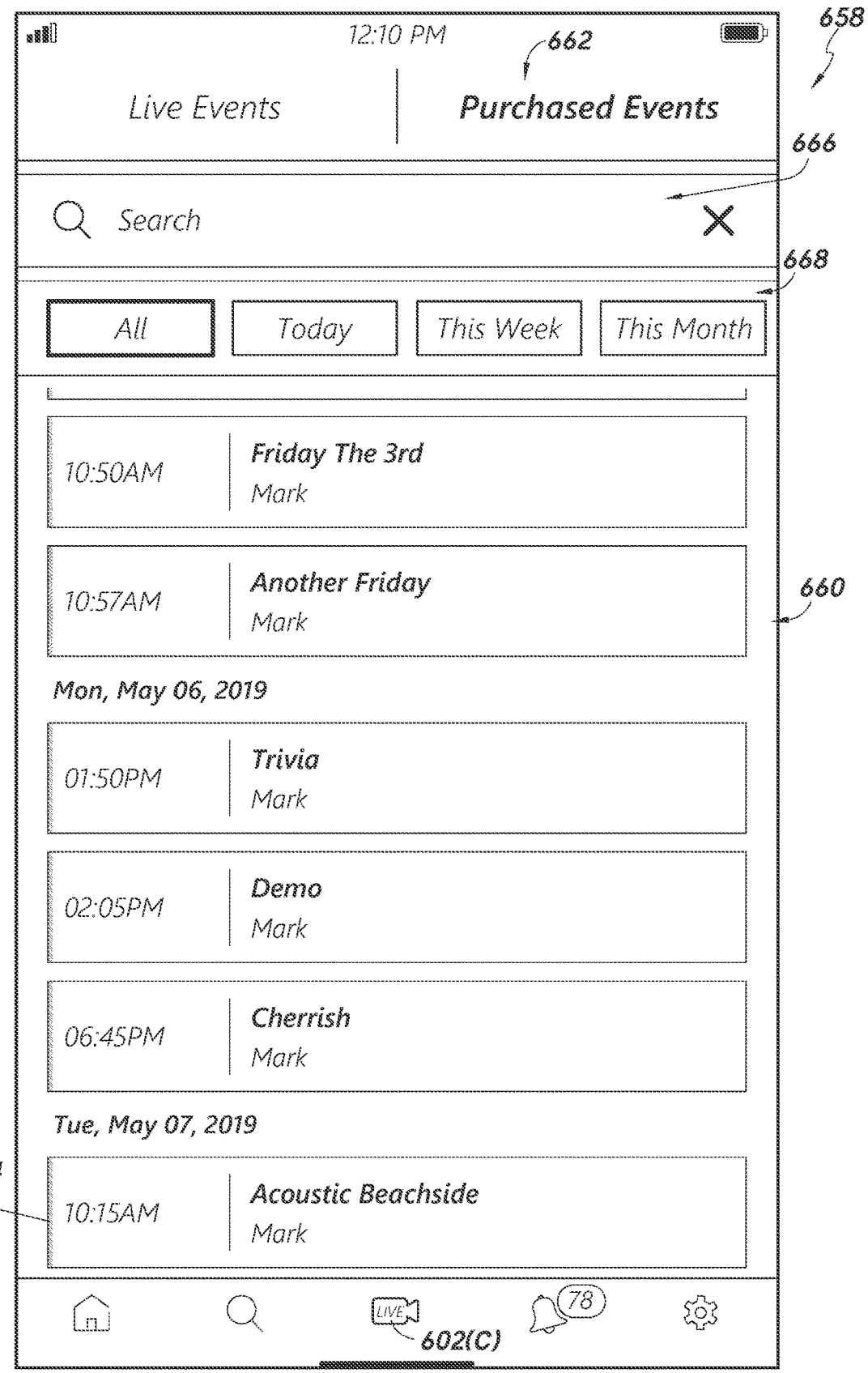

FIG. 6-8 illustrates an example interface 658 to provide a list 660 of data-streaming events that have been purchased by a content consumer. In this example, the interface 616 may be presented upon selection of the visual representation 602(C) and selection of a tab 662 in the interface 658. As shown, the content consumer has purchased the event 664 (i.e., titled "Acoustic Beachside"). The interface 658 also includes a search field 666 and buttons 668 to search through data-streaming events that have been purchased by the content consumer (e.g., filter the data-streaming events to specific search terms, time periods, etc.).

FIG. 6-9 illustrates an example interface 670 to provide a list 672 of notifications regarding one or more events of content creators. In examples, the interface 670 may be presented upon selection of the visual representation 602 (D). The list 672 of notifications may include notifications that have been added (e.g., within a period of time) to calendars of content creators that are been followed by a content consumer. This may be used to inform the content consumer of new events and/or purchase access to the events. For example, a notification 674 may indicate that a content creator (i.e., "Mark") has added a new event (i.e., titled "Meet and Greet") for April 8. Upon selection of the notification 674, the content consumer may add the event to a calendar associated with the content consumer and/or purchase access to the event. In examples, a content consumer may select the text "Calendar," "Live Events," or "Live Now" to filter notifications presented in the list 672.

In some embodiments, one or more of the interfaces of FIGS. 5-1 through 5-7 and FIGS. 6-1 through 6-9 may be implemented in the context of a calendar-based platform that enables content creators to provide content consumers with a schedule of the content creators and/or view data for events. Such platform may provide an integrated interface that enables display of both calendar information and real-time data. This may facilitate efficient use of an interface resources, resulting in reduced transitions between multiple applications (e.g., consuming less computing resources), efficient display of data, reduced network communications (e.g., in comparison to solutions that use multiple applications that each require communication with a service provider), and so on.

Additional Features

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or may be performed at different times.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. In some contexts, description of an operation or event as occurring or being performed "based on," or "based at least in part on," a stated event or condition can be interpreted as being triggered by or performed in response to the stated event or condition.

With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the disclosure herein disclosed and claimed below should not be limited by the particular embodiments described above but should be determined only by a fair reading of the claims that follow.

Unless the context clearly requires otherwise, throughout the description and the claims, the terms "comprise," "comprising," "have," "having," "include," "including," and the like are to be construed in an open and inclusive sense, as opposed to a closed, exclusive, or exhaustive sense; that is to say, in the sense of "including, but not limited to."

The word "coupled", as generally used herein, refers to two or more elements that may be physically, mechanically, and/or electrically connected or otherwise associated, whether directly or indirectly (e.g., via one or more intermediate elements, components, and/or devices. Additionally, the words "herein," "above," "below," and words of similar import, when used in this application, shall refer to this application as a whole, including any disclosure incorporated by reference, and not to any particular portions of the present disclosure. Where the context permits, words in present disclosure using the singular or plural number may also include the plural or singular number, respectively.

The word "or" in reference to a list of two or more items, that word covers all of the following interpretations of the word: any of the items in the list, all of the items in the list, and any combination of the items in the list. Furthermore, as used herein, the term "and/or" used between elements (e.g., between the last two of a list of elements) means any one or more of the referenced/related elements.

As may be used herein, the terms "substantially" and "approximately" provides an industry-accepted tolerance for its corresponding term and/or relativity between items. For some industries, an industry-accepted tolerance is less than one percent, while for other industries, the industry-accepted tolerance may be 10 percent or more. Other examples of industry-accepted tolerances range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than approximately +/−1%). Some relativity between items may range from a difference of less than a percentage level to a few percent. Other relativity between items may range from a difference of a few percent to magnitude of differences.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same, related, or unrelated reference numbers. The relevant features, elements, functions, operations, modules, etc. may be the same or similar functions or may be unrelated.

ADDITIONAL EXAMPLES

In accordance with certain calendar management paradigms, an individual user maintains his or her own calendar, which may be viewable and/or manageable using a computing device, such as a desktop computer, laptop, mobile device (e.g., smartphone), or the like. As used herein, the term "calendar" should be interpreted according to its broad and ordinary meaning and may refer to a calendaring software application, a calendar object or data type, or any other software and/or hardware representation of calendar data, or software and/or hardware utilized in connection therewith. The term "object" is used herein according to its broad and ordinary meaning, and may refer to any type of data structure or data type having one or more parameters associated therewith.

Calendar display and/or management functionality may be implemented, for example, using a combination of hardware and/or software associated with a computing device. In certain embodiments, when a calendar event is to be shared with and/or provided to other users, it may be necessary for a user (e.g., scheduler, or "master" scheduler) to send a calendar event notice to the individual recipients, wherein each of the recipients may be required to add the calendar event to his or her personal calendar/calendar program in order to view the event in the context of the recipient's personal calendar/calendar program. Updates to the original calendar event may require the recipient to incorporate such updates into his or her personal calendar. Furthermore, in certain embodiments, when a recipient wishes to share the calendar event with a secondary recipient, it may be necessary for the recipient to forward the original event in addition to any subsequent updates to the secondary recipient in order to ensure that the up-to-date event information is communicated to the secondary recipient.

Certain calendar system embodiments provide for "shared" calendars. For example, a scheduler (e.g., "master" scheduler) user may make available the scheduler's calendar to the desired recipient(s). The term "shared" is used herein according to its broad and ordinary meaning, and may be used herein in the context of shared calendars and/or events to refer to calendars and/or events that are known or accessible to a plurality of individuals or users. In certain embodiments, it may be desirable for a shared calendar to be carefully managed in order to at least partially prevent undesired overexposure of one or more portions or aspects of the calendar. For example, one or more portions or aspects of a calendar may comprise confidential and/or sensitive information that the scheduler or manager of the calendar may not wish to share beyond a subset of shared users of the calendar. Furthermore, in certain embodiments, it may be necessary or desirable for users to be registered in a substantially centralized directory in order to have access to the shared calendar; a recipient or member associated with the shared calendar may not have the ability and/or permission to invite secondary users/recipients to use the shared calendar and/or calendar event(s) associated with the shared calendar unless such secondary users/recipients are identified in the directory as a potential recipient of the shared calendar and/or one or more calendar events associated therewith, or dependent on authority of the recipient or member to invite secondary users/recipients.

Certain calendar management systems involve management of calendars and/or events for users at the individual event level. In such systems, substantially no calendar-level management or grouped calendar events may be provided. Therefore, in such systems, it may be necessary for a scheduler to manually gather and/or export multiple calendar events in order to perform a single distribution of calendar events to a user group. In addition, in certain systems, updates and/or changes made to individual calendar events may trigger multiple user alerts and/or notifications due to management at the individual event-level versus higher-level calendar or subset of calendar alert and/or notification management.

Certain embodiments disclosed herein advantageously provide calendar management systems and/or methods allowing for shared calendar usage without one or more of the various complexities and/or limitations associated with certain of the calendar systems described and/or referenced above. For example, certain embodiments may not require calendar recipients to be registered with a calendar management system or server prior to accessing shared calendars and/or calendar data. In certain embodiments, a secondary recipient may be able to receive up-to-date calendar event information without the scheduler or original recipient having to take substantial additional steps to update the relevant event(s) or notify the secondary recipient directly. Certain embodiments may further allow for sharing of a calendar, or subset of calendar events associated therewith, in a single process, rather than necessitating the sending of multiple calendar event notifications. Certain calendar management systems/methods may further provide a calendar platform that may be configurable to interface with a computing device's native calendar application/software, or other external calendar system(s), thereby providing a single unified calendar system that integrates otherwise disparate calendar systems.

The systems and methods described herein provide a variety of improvements over certain calendar management paradigms. For example, embodiments provide a configurable, unified calendar platform that allows for exchange and management of media items. Users may provide media items to be associated with an event/meeting. The media items may enhance the calendar platform by allowing the users to provide additional information about an event/meeting. The media items may be indicated/identified using media data (e.g., identifiers, links to the media items, etc.) which are associated with event/meeting. Users who are allowed to access an event/meeting may use the media data to access the media items (e.g., to download/view the media items).

Embodiments further provide a configurable, unified calendar system that allows for transmission and management of digital messages. Users may transmit one or more messages about an event/meeting (e.g., users may have a discussion about the event/meeting). The messages may be stored/represented using discussion data which is associated with an event/meeting. Users who are allowed to access an event/meeting may use the discussion data to view messages (e.g., a discussion) about the event/meeting. Users may also include media items as part of a message. In some embodiments, users may not be required to be registered with a calendar management system or server prior to accessing media items and/or messages associated with an event/meeting.

Example Calendar Management System

FIG. 7A is a block diagram of a calendar management system in accordance with one or more embodiments disclosed herein. The system of FIG. 7A includes a network environment 100 that may comprise one or more host servers 120, client devices 110, and/or other servers 170. The network environment 100 can be connected by any network infrastructure 130, which may be public and/or private, using any suitable or desirable protocol or combination of protocols. For example, in certain embodiments, one or more devices of the network environment 100 may communicate information over the public Internet network, such as via cellular data network(s), whereas one or more devices may further receive information over local wired and/or wireless local area networks (e.g., Ethernet) connected to the Internet via an Internet Service Provider (ISP). In certain embodiments, one or more devices and/or networks may be implemented using a private network over, for example, Ethernet and/or radio network protocols.

The host server(s) 120 may contain a repository of calendar and/or user data 122 as well as a calendar application server 124. The calendar and/or user data repository, or data store, 122 and/or the application server 124 may reside on a single server or may be spread across multiple servers, as desired or practical. As a whole, the host server(s) may be considered a single logical entity for simplicity purposes as described herein; that is, references to a server or host server herein may represent one or more servers or devices configured to provide server-type functionality and/or services. The application server 124 may be implemented according to executable code and/or associated server components used to support computing on the server 120. The calendar/user data 122 may collectively comprise logical data, executable code, and/or associated components to support storage, data management, and retrieval of the data. The calendar/user data 122 may comprise calendar information consisting of one or more of various data structures or data types. For example, calendar data may comprise one or more calendar objects or data structures incorporating various calendar-related parameter(s), and/or calendar event objects or data structures incorporating event-related parameter(s).

In one embodiment, the calendar/user data 122 may include media data and/or discussion data. Media data may be data that indicates/identifies one or more media items that are associated with or are included with an event object (which represents an event/meeting). For example, the media data may include one or more of a name (or other identifier) for a media item, a link to a location of the media item (e.g., a universal resource locator (URL)), a type for the media item (e.g., a video type, a picture type, etc.). Discussion data may be data that indicates/represents one or more messages (e.g., chat/text messages) that are associated with or are included with an event object. In some embodiments, the media data may also be data that indicates/identifies one or more media items that are to be included in messages (e.g., a discussion) associated with or included with an event object.

In one embodiment, the storage server 180 may store media items that are associated with or are included with an event object. For example, a user of a client device 110 may add a media item (e.g., a digital movie) to an event/meeting. The client device 110 may be directed to store the media item on the storage server 180 (e.g., to transmit the media item to the storage server 180), or the client device 110 may transmit the media item to the host servers 120 and the host servers 120 may store the media item on the storage server 180. In one embodiment, the storage server 180 may part of a cloud storage platform. For example, the storage server 180 may be managed and/or hosted by cloud storage vendor/provider that provides storage capacity and/or services. Although the storage server 180 is illustrated as being separate from the network environment 100, one having ordinary skill in the art understands that the storage server 180 may be part of the network environment 100 in other embodiments.

As used herein, a media item may include an electronic file that can be executed or loaded using software, firmware or hardware configured to present digital content (e.g., video, images, audio, text, etc.). Examples of media items include, but are not limited to, digital images/pictures, digital videos/movies, digital audio, streaming videos/movies, audio clips, movie clips, TV clips, music videos, video blogs, short original videos, pictures, photos, other multimedia content, etc. A media item may also be referred to as multimedia, a multimedia item, a digital media, digital content, etc.

The host server(s) 120 may be configured to facilitate calendar information communication between the client devices 110, and possibly other server(s) 170. Client devices 110 may exchange calendar information via the host server(s) 120 over the network 130, directly between client devices 110 via the network 130 and/or through direct device-to-device information exchange, such as over a local pairing or network connection (e.g., Bluetooth, near-field communication, infrared, etc.).

Other servers and services 170 may be provided using other logical server instances or included with the host server(s) 120. The other server and services 170 may provide additional services to the host servers for support processing, or the services may be provided directly to the client devices. Server features and services may be related to calendar information processing and/or other context-driven features. Examples of other server services may include, but are not limited to, credit card processing/billing, video chat features, document collaboration, and the like. The other services may also provide additional services or data to the client devices. Examples include but are not limited to map/navigation and traffic services, advertising/marketing services, local weather/news information alerts, and/or other services.

FIG. 7B is a block diagram of an example client device subsystem 110B. The client devices/systems 110B may be computing devices configured to function as one or more of a calendar scheduler 112 (e.g., where a user creates and/or has authority/capability to create or manage a new calendar or updates to an existing calendar) or a calendar user 114 (e.g., where a user/device receives a new calendar or update to an existing calendar).

FIG. 8 is a block diagram providing a representation of a host server 220 according to one or more embodiments. The host server 220 may provide a representation of one or more of the host server(s) 120 shown in FIG. 7A and described above. Although the illustrated server 220 includes various components illustrated together on a single host server 120, it should be understood that the various components and modules shown in FIG. 8 may be distributed across multiple servers, devices or locations/sites. The host server 220 may contain a calendar/user data repository 222, as well as one or more calendar application server 224 components, which may be utilized for calendar management and/or calendar information exchange between one or more client devices.

The calendar data store 222 may contain at least a portion of calendar data that is made available through various application server 224 processes. Client devices (e.g., client devices 110 in FIG. 7A) may be able to access at least some data stored in the calendar data store 222 via one or more services that may be provided by the application server 224. For convenience, such services, among possibly others, are represented by a calendar data and access management module or interface 225a, as illustrated in FIG. 8. Calendar data may comprise metadata associated with calendar events, users, as well as abstract objects for managing calendar metadata. Such abstract objects for managing calendar metadata may include control information for calendar state (e.g. private, shared, and/or published) as well as device synchronization information such as active device lists, or incremental change records. The calendar data store 222 may be maintained in connection with one or more processes designed to maintain integrity of the data and may further provide various interfaces for interaction with the stored data.

The calendar data store 222 may maintain various types of calendar and/or user-related data. For example, the data stored in the data store may include client account data 223a which may be available to certain system processes for account maintenance and/or management. Client account data 223a may include unique client calendar codes/identifiers and/or account billing information. The client account data may further include security tokens/data for user authentication, such as fingerprint, retina, voice, or any other individual unique identification data, which may be used to manage authorized access to calendar data.

The access management module 225a may be configured to interface with one or more other modules of the application server 224, such as a synchronization module 225c and/or calendar integration module 225d, to determine changes/updates to data stored in the calendar data store 222 as well as to communicate the data to client devices 110, such as via the synchronization module 225c. The access management module 225a may implement one or more forms of authentication of user clients using native device identification (e.g. phone # and text) or through external authentication sources (e.g. third-party social media sites).

Calendar and user data 222 may include network configuration defaults, custom device and/or calendar configuration, user account information, and other calendar-related data. Examples of user data 222 may include device configuration preferences stored on the host server for client device synchronization and/or backup/retrieval, contact lists, or default greetings for calendar users.

In an embodiment, the client account data 223a includes a collection (e.g., array) of calendar user/recipient objects, each associated with a unique user identifier. The unique user identifier may be any suitable or desirable identification value or data structure that may potentially uniquely be associated with a user, such as a phone number, social media account identifier or authorized social media account, unique username, email address, or the like. In certain embodiments, each user/recipient object comprises one or more additional parameters, which may be customized for a particular type of user or calendar. For example, each user/recipient object may comprise a parameter (e.g., array) identifying each calendar, or each calendar of a particular type, with which the user/recipient is associated (i.e., belongs or has been invited and/or accepted to).

The calendar data 223b may comprise a listing or collection of calendar objects, each of which may comprise one or more parameters providing information associated with the calendar. For example, a calendar object may comprise user/authorization, or classification, information, such as an identification of users associated with the calendar and associated information indicating an authorization group/level, or classification indicating a scope of involvement of the user with the calendar, wherein users having different authorization levels or classifications may receive different subsets of the calendar data.

The calendar data and access module 225a may comprise one or more processes and/or information for facilitating sharing of calendar data 223b to users' client devices 110, as well as possibly to promote or ensure confidentiality, integrity, and/or accuracy of calendar data. The calendar data store 222 may further include calendar access information, which may enable at least partially centralized management of a single-calendar while at the same time individualized visibility and/or notification of events associated with the shared calendar, such as based on the user authorization/classification data of the client account data 223a or the calendar data 223b discussed above. Enhanced controls maybe configured when additional layers of confidentiality and/or control are desired for highly sensitive calendar/user data.

In certain embodiments, the distribution of calendar data 223b and the sharing of calendar data between devices is not managed like certain other calendar systems in various respects. For example, calendar events may be grouped together in any number of associated groups/levels/classifications for updates and/or distribution to calendar users (e.g., calendar users 114 in FIG. 7B) while still maintaining ownership and visibility under a single master calendar (e.g., 410 in FIG. 10). In certain embodiments, a calendar scheduler may manage a single calendar in its entirety using a selected usage template 223f, whereas calendar users may have individualized visibility on various devices and/or platforms via relatively simple access-sharing protocols. Although FIG. 8 illustrates a variety of visually-separate blocks representing different types of data, such visual segregation is provided for convenience and any data shown and/or described herein may be integrated with, or separate from, any other data, depending on the embodiment. Furthermore, additional types of data not represented in FIG. 8 may be included in certain embodiments, and certain of the illustrated data types may be omitted, as desired or practical, in certain embodiments.

In some embodiments, the media data 223j may include data that may indicate and/or identify media items that are associated with events (which are included in one or more calendars). For example, the media data 223j may indicate that a media item is associated with a particular event for a particular calendar. In another example, the media data 223j may identify a media item. For example, the media data 223j may include an identifier (e.g., a name, an alphanumeric identifier, etc.) for a media item. In one embodiment, the media data 223j may be included as part of the calendar data 223b.

In some embodiments, the discussion data 223k may include data that may indicate/represent one or more messages about an event/meeting (e.g., a discussion between users about an event/meeting). For example, the discussion data 223k may include a record of chat messages exchanged between two users using the calendar platform. The discussion data 223k may also include and/or refer to media data when a message includes a media item. For example, a user may transmit a message that may include a digital image of an event venue. The discussion data 223k (which may represent/indicate the message) may include media data for the digital image or may refer to media data for the digital image. In one embodiment, the discussion data 223k may be included as part of the client communications data 223e.

Example Calendar Share Identifiers (Share IDs)

The calendar data and access module 225a, or other module of the server (or client) system, may be configured to generate calendar share identifiers (share IDs) or other data (e.g., unique identifiers) in response to certain events or requests, such as when a user indicates a desire to distribute a new calendar or a new set of calendar events to one or more users. For purposes of this disclosure, the terms "share identifier," "share ID," variations thereof and/or like terms may be used interchangeably. A unique share ID may allow for access to calendar events associated or correlated with the share ID. The share ID can be sent to users via the client communication management module 225e or through any external process.

Use of share IDs may allow for a calendar scheduler 112 to easily distribute access/authorization to a calendar to desired calendar recipients/users. In certain embodiments, a share ID is the only key/item a calendar user 114 requires in order to access a calendar and/or to associate a calendar to a user's client device 110. For example, a share ID may be distributed via the calendar application/software 324 to a user's contacts or via a website, news bulletin, and/or mass publication. The share ID may allow a calendar user 114 to automatically receive calendar updates associated with the share ID without requiring the calendar user to initiate checking for calendar updates. In certain embodiments, a share ID plus secondary identification information may be required to access a calendar where additional security is desired. Examples of where a secondary level of security identification may be desired include calendar schedules for doctor/client appointments, personal travel itineraries, and/or employee work schedules.

The relevant calendar/user data store may maintain user/share ID association data indicating for a given user the calendars that the user has been authorized for and/or invited to through share ID distribution as described herein. In certain embodiments, acknowledgment by a user of a received share ID may be required before user/share ID association is complete and represented, for example, at the backend calendar management server.

The application server 224 may implement certain processes to support user device authentication and/or security management. Calendar data 223b on the server 220 may be stored in a secured manner and may be available only to authorized users and/or by authorized methods. Client device security may be integrated as part of existing device security mechanisms or may be independent of the devices mechanisms.

Figures 6, 7, 8, 9:
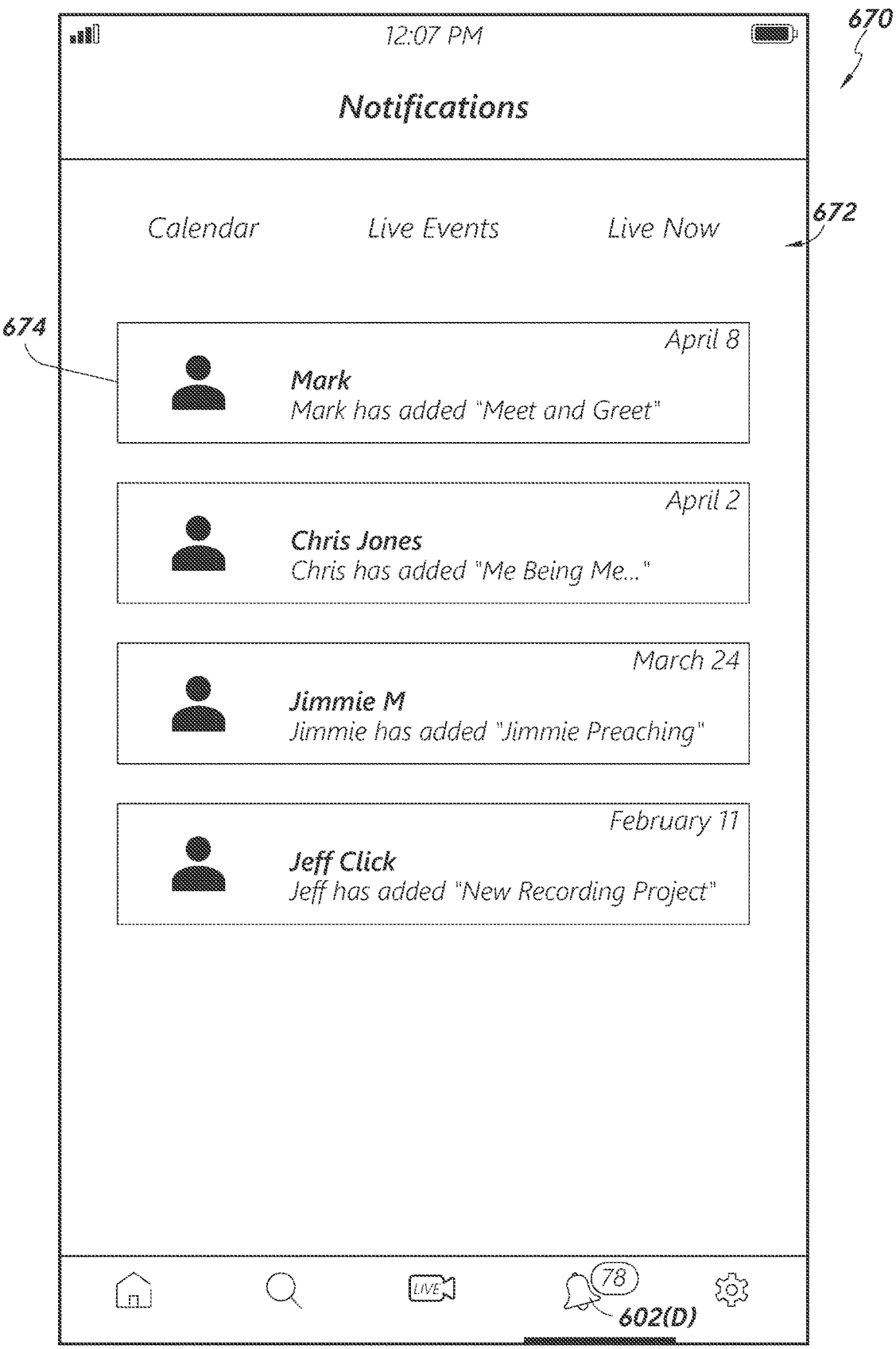
Figure 8:
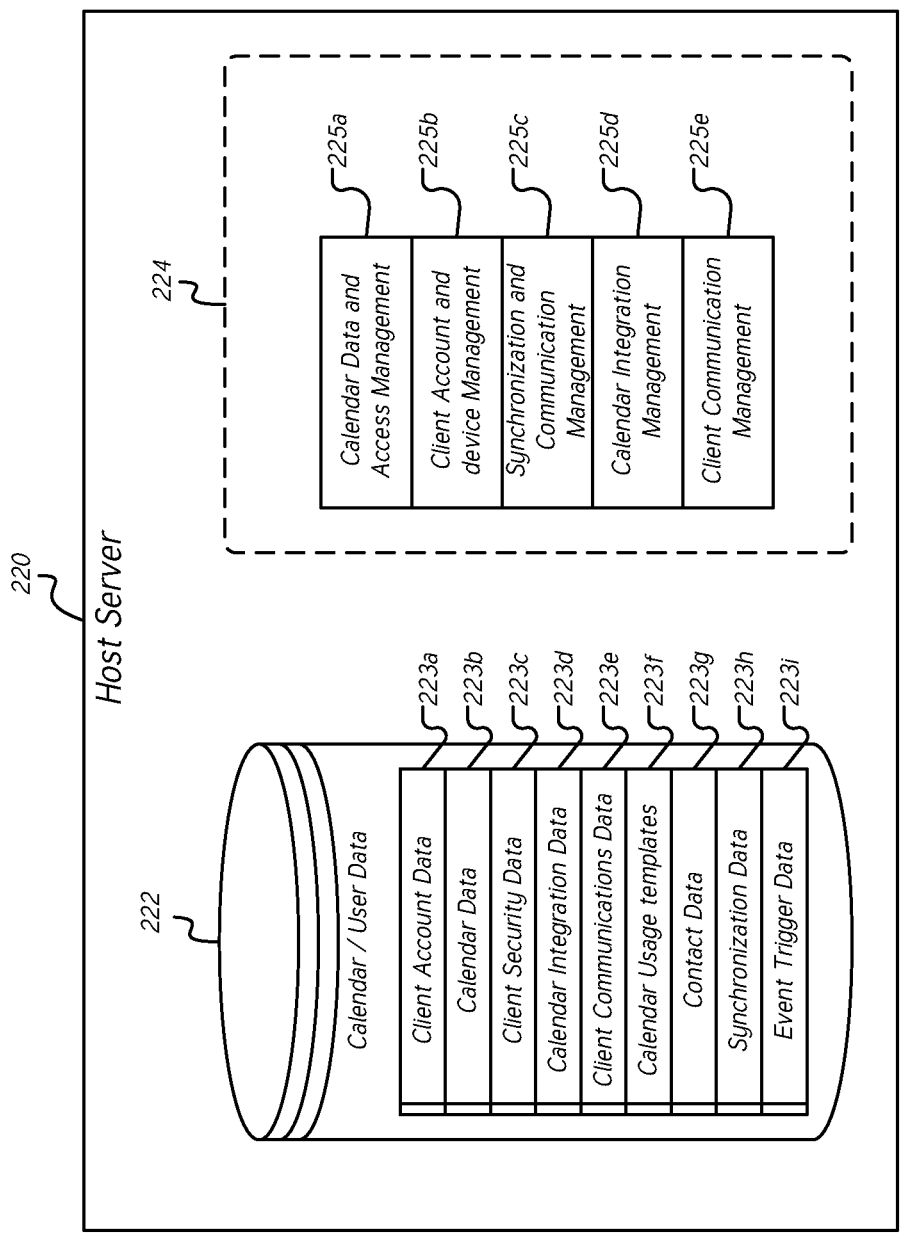
Figure 9:
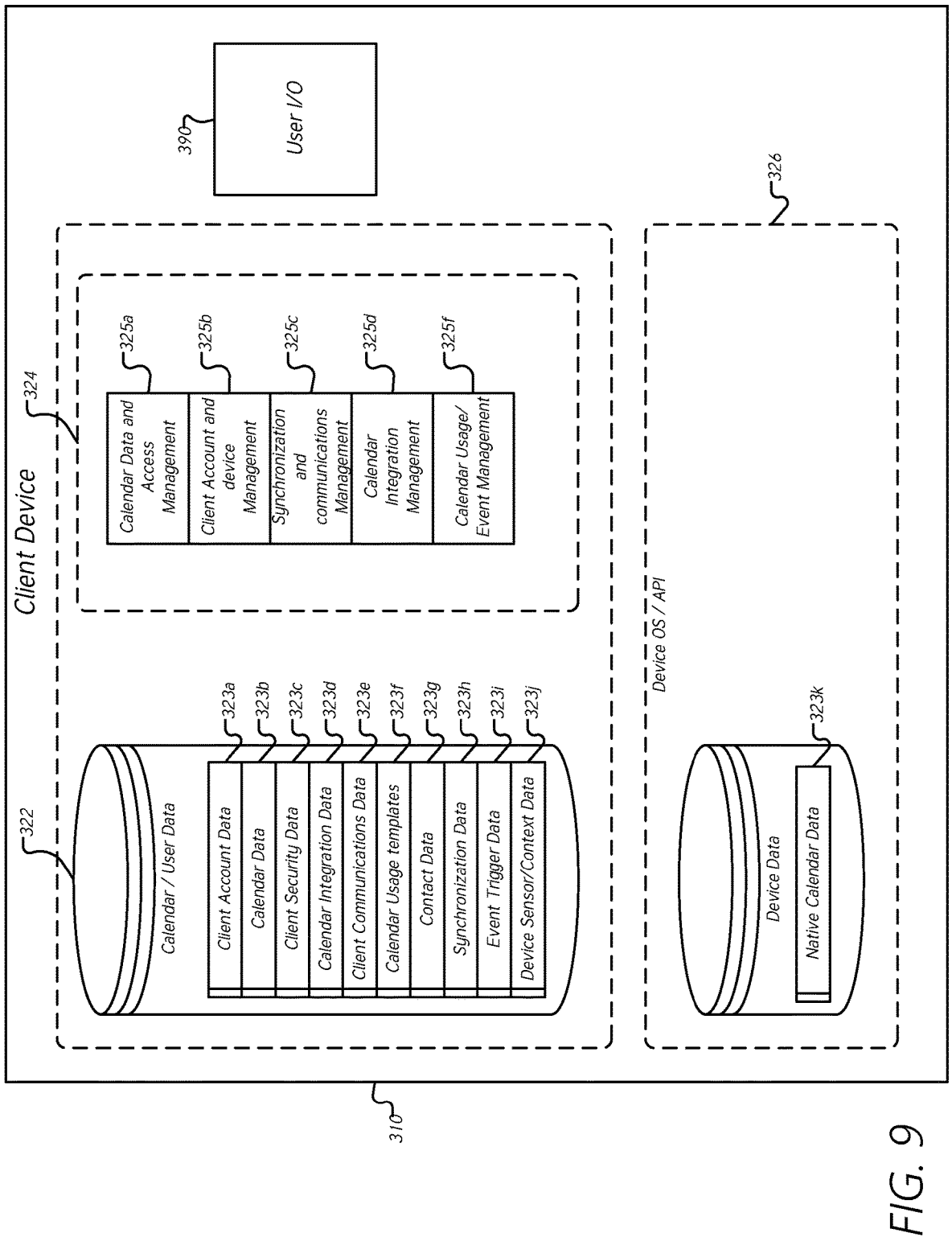

FIG. 9 is a block diagram providing a representation of a client device 320 according to one or more embodiments. For example, the client device 320 may represent an embodiment of one or more client devices of the client subsystem 110 of FIG. 7A and described above. With further reference to FIG. 8, the application server 224 may implement certain processes to support synchronization and communications management 225c. Such processes may maintain synchronization of calendar information 223b between client devices 110. The server synchronization module 225c may work in conjunction with device synchronization modules 325c (shown in FIG. 9) to ensure the accurate and/or integrity of information transferred between client device(s) and host server(s) when a calendar update has been published or any other triggering event occurs. For example, one such triggering event may be after a scheduler has made one or more changes to a calendar and sets the calendar state to "publish," which may trigger the application server to automatically send a notification and update availability to devices as managed by the synchronization module 225c. The synchronization management processes may also support information transfers among client devices for client communication data 323e (see FIG. 9).

The synchronization module 225c may support synchronization of calendar data 223b between the server(s) and device(s), as well as between local device calendar data and the device's native calendar data 323k. For example, in one embodiment a synchronization module may maintain a list of active users/devices connected to the system to target real-time information exchanges between the devices. Another embodiment may allow for a user/device to query the application server 224 to determine a calendar state and determine if a refresh of calendar data is required. The synchronization module 225c may manage conflicts among calendar events and allow the user to respond to the conflict. Examples of conflicts may be event overlap or employee schedule maximums.

The synchronization module 225c may also support synchronization between external calendar systems and the calendar system 100 (see FIG. 7). This synchronization may be necessary if a source of calendar information is another externally-maintained calendar system or as between multiple networks of calendar systems. Examples of possible external calendar system interfaces may be Microsoft Exchange or Google Calendar, or other calendar platforms. In certain embodiments, synchronization and integration processes may support calendar and user data integration between external calendar systems and make them available to calendar users 114 within the calendar application without additional user action.

The synchronization and communications module 225c may contain processes and data required to facilitate communications among host servers (e.g., host server(s) 120 in FIG. 7A), client devices (e.g., client device(s) 110 in FIG. 7A), and/or other servers (e.g., server(s) 170 in FIG. 7A). Communications may be system process data interactions (e.g. data synchronization, system updates, session management) and/or client device user interactions (e.g. text, video chat, document exchanges). For example, additional information exchanges may be used for team coordination of tasks or assignments related to an event, or for confidential payment service processing for a scheduled service. In certain embodiments, the synchronization and communications module 225c may support client communications via direct device to device communication, via host servers, and/or via external services depending. The communication module may support real-time and/or asynchronous communications between users within the system. For example, users may exchange messages (e.g., chat messages, text messages, etc.) to discuss an event/meeting (e.g., to discuss possible venues, agendas, transportation to the event, etc.).

The messages may be associated with an event/meeting and may be stored/represented using discussion data.

The communication process may be initiated at any time by user interaction with the device, by a system event on the user's behalf, and/or by another trigger event of the like. Client communications may be associated to a calendar event when initiated within the context of a calendar event.

Example Cross Platform Calendar Integration

With further reference to FIG. 8, the calendar application 224 may contain calendar integration management processes 225d to support import/export and/or conversion of calendar information between external calendar data types and/or various calendar systems. In certain embodiments, calendar integration data 223d may contain conversion mappings of possible data types for import/export of calendar information between systems and/or devices. The calendar integration module allows for the communication between external calendar systems and between the proprietary calendar data type and native device calendar data types. The calendar integration module allows for the integration of the system calendar information with any calendar platform.

The calendar integration module 225e is critical to supporting multiple calendar data import/export and distribution of the calendar system on multiple device platforms. The calendar integration module allows for the calendar system to bridge calendar platform boundaries and for the calendar system to work across current technical limitations. In certain embodiments, the calendar integration module 225e may provide linkage to an external calendar system where a calendar scheduler wishes to share calendar events from the external calendar system without exposing access credentials to and/or awareness of the external calendar system.

For example, a calendar scheduler (e.g., calendar scheduler 112 in FIG. 7B) may desire to share publicly-specific calendar event information from a work calendar system. The calendar event information may be reoccurring but may have additional information updated regularly within the calendar event. The calendar integration module may allow for the user to link to the work calendar system with appropriate credentials to associate specific calendar items to be grouped by a share ID. The share ID may be publicly distributed and calendar users may automatically be provided updates of the calendar events whenever the calendar events are updated within the work calendar system.

With respect to FIG. 7A, the calendar integration module may be implemented by the host servers 120, by the client devices 110, by other servers 170, or by any combination thereof.

The calendar application/software 224 may contain data type definitions and patterns of usage for calendar data according to one or more embodiments. Usage templates 223f may define allowable parameters of user interactions for specific use cases. The usage templates may be configured and customizable as needed for efficient calendar scheduling where predetermined interactions and/or behaviors may facilitate ease of calendar entry and management. Examples of possible patterns may include calendar entry for team events, client/patient appointments, and employee schedules.

The usage templates 223f may facilitate relatively efficient and easy-to-use user interaction to calendar data. Specialized controlled methods of user interaction with calendar data may include, but are not limited to, data entry, view/display, notification alerts, and device interface interactions. The calendar usage template modules may use any system or device data available such as calendar data, device sensory data, and event trigger data. Configurable behaviors may also include notification or a prompt when schedule conflicts are detected by the system.

Each template may have a unique set of calendar event attributes as well as specific available behavior methods to act upon the calendar data. The combination of data and interaction methods is identified by the template. Interaction methods may also include specific process sequencing or event triggers.

FIG. 9 shows a block diagram illustrating an embodiment of a client device 320. Although the various components are shown together as components of a single client device 320, it should be understood that the various components may be distributed across multiple devices or a cluster of devices. The client device 320 may contain calendar and/or user data maintained in a data store 322, as well as one or more calendar application modules 324, which may be used for calendar management and/or calendar data exchange between client devices (e.g., client devices 110 in FIGS. 7A, 7B).

The calendar application 324 and calendar/user database 322 may contain some or all of the data and/or processes to implement the calendar system functionality on the device. The device OS/API 326 may provide one or more interfaces to general device services, such as data storage or memory, user interface components, and/or network layer communications. The device OS/API may also provide certain device-specific interface(s) to native device calendar data and/or sensor or user context data.

The calendar data 322 repository may contain the device's local calendar information, which may comprise at least a portion of calendar data as identified by share IDs that is available through the calendar application 324 process(es). In certain embodiments, a user may access the device's calendar repository 322 via the calendar data and access management 325a interface(s)/module(s). Calendar data may comprise certain metadata associated with calendar events, as well as possibly abstract objects that may be required or useful in managing calendar metadata. The calendar data store 322 may be maintained in connection with one or more processes designed to maintain integrity of the data, and may provide interfaces for interaction with the stored data. The device's calendar data 322 may contain individualized calendar data specifically tailored to the user as determined by the calendar data and access management module 325a, such as one or more calendar objects and event objects, as described above with respect to the maintenance of such data by the system illustrated in FIG. 8.

The calendar data store 322 may maintain various types of calendar and/or user-related data. For example, the data stored in the data store may include client account data 323a, which may be available to certain system processes for account maintenance and/or management. Client account data 323a may include unique client calendar codes/identifiers and/or account billing information. The client account information 323a may further include security tokens/data for user authentication such as fingerprint, retina, voice, or any other individual unique identification data, which may be used to manage authorized access to calendar data 323b.

The access management module 325a may be configured to interface with one or more other modules of the calendar application 324, such as a synchronization and communications module 325c and/or calendar integration module 325d to determine changes/updates to data stored in the device's calendar data store 322 as well as to communicate the data to host servers 120 and client devices 110, such as via the synchronization module 325*c*.

Calendar and user data 322 may include network configuration defaults, custom device or calendar configuration, user account information, and/or other calendar-related data. Examples of user data 322 may include device configuration preferences stored on the host server for client device synchronization and/or backup/retrieval, contact lists, or default greetings for calendar users.

The calendar data and access module 325*a* may comprise one or more processes and/or information for facilitating using and sharing of calendar information 323*b* to other client devices as well as possibly to promote or ensure confidentiality, integrity, and/or accuracy of calendar data. The calendar data store 322 may further include calendar access information, which may enable at least partially centralized management of a single-calendar while at the same time individualized visibility and/or notification of events associated with the shared calendar. A user may interact with the calendar data 323*b* to view specific calendar events or the entire calendar in entirety.

In certain embodiments, the distribution of calendar data 323*b* and the sharing of calendar data between devices is not managed like certain other calendar systems in various respects. For example, calendar events may be grouped together in any number of associated groups for updates and/or distribution to calendar users 114 while still maintaining ownership within a single master calendar 410. Such grouping of calendar data and events may be facilitated through the use of calendar, user, and/or event objects, which may comprise parameter data associated calendars with user identifiers and/or share IDs, as well as associating users with associated calendars and/or events. In certain embodiments, a calendar scheduler may manage a single calendar in its entirety using a selected usage template 323*f*, whereas calendar users may have individualized visibility on various devices and/or platforms via relatively simple access-sharing protocols.

The calendar data and access module 325*a* may be configured to generate unique share identifiers (share IDs) or other data (e.g. unique identifiers) in response to certain events or requests, such as when a user indicates a desire to distribute a new calendar or a new set of calendar events to one or more users. A unique share ID, which may be stored as part of a calendar object, may allow for access to calendar events associated or correlated with the share ID. The share ID can be sent to users via the synchronization and communication management module 325*c* or through any external process.

In certain embodiments, when an authenticated client device receives or has a unique calendar ID added to the user/devices calendar list, a single notification message may be sent to the user/device and all relevant calendar data may be available to the client device to refresh the local calendar data.

The device security module 325*b* may contains processes and data required to support user device authentication and security management. Calendar information 323*b* on the device may be stored in a secured manner and available only to authorized users and/or by authorized methods. The client device security 325*b* may be integrated as part of existing device security mechanisms or may be independent of the devices mechanisms as needed.

The calendar application 324 may implement certain processes to support synchronization and communications management 325*c*. Such processes may maintain synchronization of calendar information 323*b* between a host server (e.g., host server(s) 120), other client devices 110, other servers 170, and/or native device calendar data (if applicable) 323*k*. The client device's synchronization module 325*c* may work in conjunction with host server synchronization modules to ensure the accuracy and/or integrity of information transferred between client devices and host server(s) when a calendar update has been made or any other triggering event occurs. The synchronization management processes may support information transfers/updates among client devices for client communication data 323*e*.

In certain embodiments, the synchronization module 325*c* may manage synchronization of calendar data 323*b* between the host servers and client devices as well as possibly between the local device calendar data 323*b* and the device's native calendar data 323*k*. The module may manage any conflicts among calendar events and allow the user to respond to the conflict. Examples of conflicts may be event overlap or employee schedule maximums.

The device synchronization module 325*c* may also support synchronization between external calendar systems and the calendar application 324. This synchronization may be necessary or desirable if a source of calendar information is another, externally-maintained, calendar system, or as between multiple networks of calendar systems. An example of possible external calendar system interfaces may be Microsoft Exchange, Google Calendar, or the like.

The synchronization and communications module 325*c* may contain certain processes and/or data required to facilitate communications among relevant host server(s), client device(s), and/or other server(s). Communications may be system process data interactions (e.g. data synchronization, system updates, session management) or client device user interactions (e.g. text, video chat, document exchanges). The synchronization and communications module 325*c* may support client communications via direct device-to-device communication, via host servers, or external services, depending possibly on implementation configuration. The communication module may support substantially real-time and/or asynchronous communications between users within the system.

In certain embodiments, the communication process(es) may be initiated substantially at any time by user interaction with the device and/or on the user's behalf when triggered by a system event. Client communications may be associated with a calendar event when initiated within the context of a calendar event.

The various components of FIG. 9 may provide cross-platform calendar integration functionality. For example, the calendar integration module 325*d* may contain system processes and data needed to import/export or convert calendar information between any calendar data types. The calendar integration data 323*d* may contain conversion mappings of various data types possible for import/export of calendar information. In certain embodiments, the calendar integration module may allow for the communication between external calendar systems and/or between the proprietary calendar data types disclosed herein and native device calendar data types. The calendar integration module 325*d* may allow for the integration of the system calendar information with any calendar platform.

The calendar integration module 325*d* may serve to supporting multiple calendar data import/export and/or distribution of the calendar system on multiple device platforms. In certain embodiments, the calendar integration module may allow for the calendars to cross platform boundaries and for the calendar system to work across certain current technical limitations. The calendar integration module 325d may be implemented by the host servers, by the client devices, by other server(s), or by any combination thereof.

The calendar usage/event module 325f may contain the data type definitions and/or patterns for usage for calendar types to be used by system processes and client devices. The usage templates may define allowable parameters of user interactions for specific use cases. In certain embodiments, the usage templates 323f can be configured and customizable as needed for efficient calendar scheduling. Examples of usage templates may include calendar entry parameters and behaviors for team events, client/patient appointments, and employee schedules, among others.

These usage templates may facilitate relatively efficient and easy-to-use user interaction to calendar data. The specialized controlled methods of user interaction to calendar data may include, but is not limited to, user interface controls, data entry, view/display, and/or notification alerts. The calendar usage template modules may use any system or device data available, such as calendar data, device sensory data, event trigger data, and/or combinations thereof. Configurable behaviors may also include notification or a prompt when schedule conflicts are detected by the system.

Each template may have a unique set of calendar event attributes as well as specific user behavior methods to act upon the calendar data. The combination of data and interaction methods may be identified by the template. Interaction methods may also include specific process sequencing or event triggers. Event parameters may be internal to calendar application processes or derived from device sensor and/or context information 323j. The calendar usage and event module 325f may interface with the device's sensors and context information 323j to provide parameter inputs for the usage templates were applicable.

Examples of sensory information may include GPS location and movement, network availability, media availability (phone, camera, etc.), and system services availability. Examples of device context information may include phone status, call ID, application status, date/time information within application text, and voice recognition.

In some embodiments, the media data 323n may include data that may indicate and/or identify media items that are associated with events (which are included in one or more calendars). For example, the media data 323n may indicate that a media item is associated with a particular event for a particular calendar. In another example, the media data 323n may identify a media item. For example, the media data 323n may include an identifier (e.g., a name, an alphanumeric identifier, etc.) for a media item. In one embodiment, the media data 323n may be included as part of the calendar data 323b. The media items may be provided by a user using various graphical user interfaces (GUIs) presented by the user I/O module 390 (as discussed in more detail below).

In some embodiments, the discussion data 323m may include data that may indicate/represent one or more messages about an event/meeting (e.g., a discussion between users about an event/meeting). For example, the discussion data 323m may include a record of chat messages exchanged between two users using the calendar platform. The discussion data 323m may also include and/or refer to media data when a message includes a media item. For example, a user may transmit a message that may include a digital image of an event venue. The discussion data 323m (which may represent/indicate the message) may include media data for the digital image or may refer to media data for the digital image. In one embodiment, the discussion data 323m may be included as part of the client communications data 323e. A user may transmit/provide one or more messages using various GUIs provided by the user I/O module 390 (as discussed in more detail below).

The client device 310 may further include a user input/output module 390, which may comprise one or more hardware and/or software components for receiving user input. For example, in certain embodiments, the user I/O module 390 may comprise one or more of a keyboard, touchpad, microphone, speaker, wireless and/or wired communication controller configured to communicate according to one or more protocols, or the like. The user may utilize the user I/O module 390 to generate new calendar and/or event objects, input share IDs or other identifiers or authorization codes/values.

Although FIG. 9 illustrates a variety of visually-separate blocks representing different types of data and/or functional modules, such visual segregation is provided for convenience and any data and/or functionality shown and/or described herein may be integrated with, or separate from, any other data and/or functionality, depending on the embodiment. Furthermore, additional types of data and/or functionality not represented in FIG. 8 may be included in certain embodiments, and certain of the illustrated data types and/or functional modules may be omitted, as desired or practical, in certain embodiments.

Figure 10:
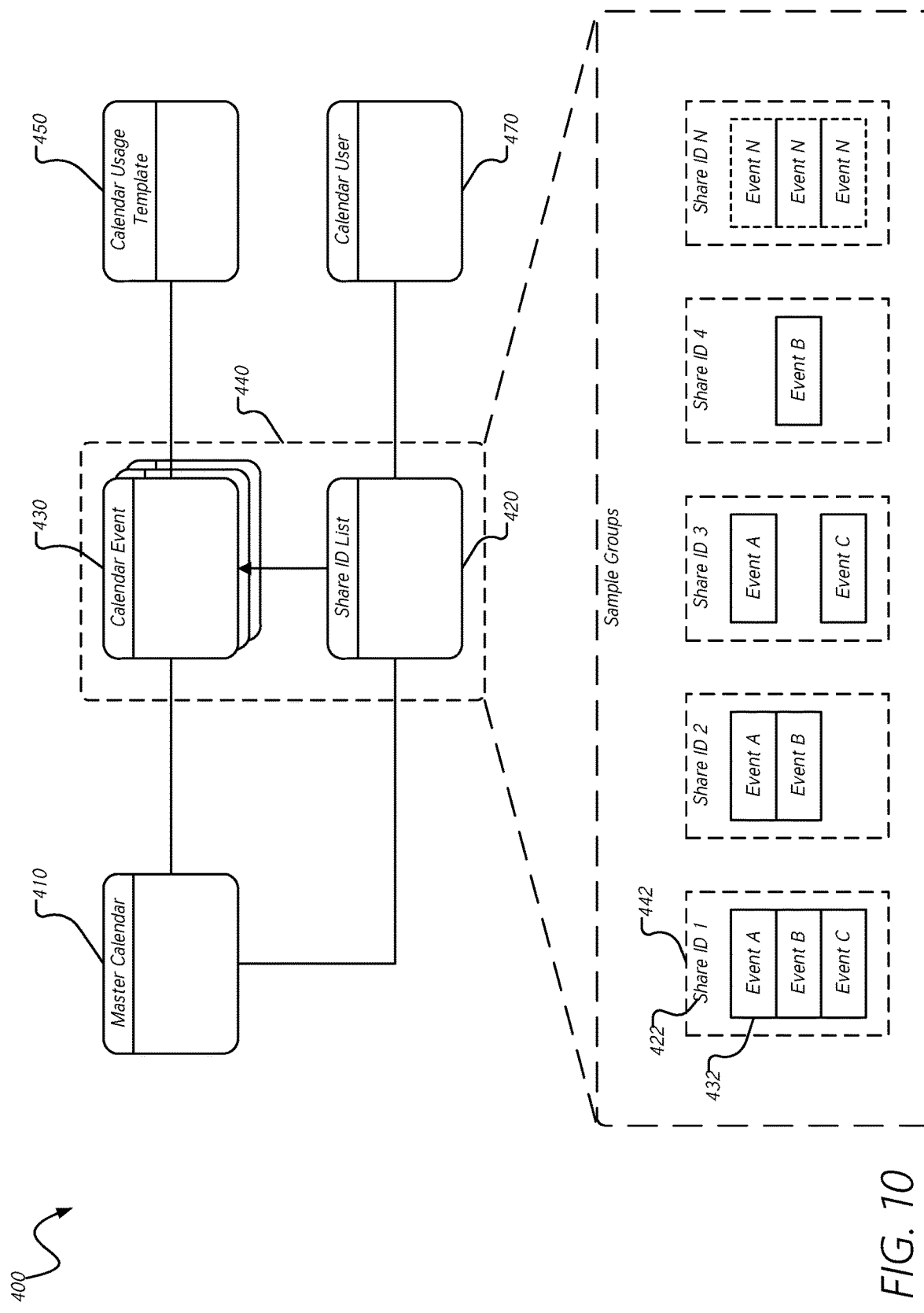
FIG. 10 is a block diagram illustrating a calendar data management system according to one or more embodiments.

FIG. 10 is a block diagram illustrating a calendar data management system 400 according to one or more embodiments. The system 400 may represent one or more embodiments of possible instances of a calendar data type which may be used in connection with one or more embodiments of calendar management systems and/or methods disclosed herein. In certain embodiments, a master calendar 410 (e.g., calendar object) may be managed by an individual user, or management may be shared among a group of users. A calendar may contain one or more calendar events 430 (e.g., calendar event objects), wherein the calendar events 430 may represent individual files, data structures, or collections of the same. Calendar events 430 may contain various parameters/attributes, such as date, time start, time end, organizer, invitees, and/or additional types of information.

In typical calendar exchanges, a calendar may be managed on a user's own calendar and then an event is shared or pushed to another user's calendar. In certain embodiments, updates to the calendar user's event may be implemented by sending another updated calendar event. In certain alternative embodiments, the calendar may be shared with a calendar user to allow access to the entire calendar. At this point, the calendar user may go to the shared calendar to access any updated information.

Here, the calendar data type may allow for calendar events 430 to be managed on a single master calendar 410 with the additional capability feature of granular visibility of calendar events. The calendar may be managed by an individual or group in similar fashion to certain traditional calendar systems. Additionally, individual calendar events or groups of calendar events 430 may be associated with individuals or groups. A usage template 450 applied to the calendar event may determine the default for whether an individual or group is associated. An instance of Share ID 422 may be associated with one or more calendar events 432 to create a unique calendar group 442 that can be shared with any calendar user or group using the Share ID 422. Individual calendar users 470, through the use of one or more Share IDs on a device, may have access to the aggregate of associated calendar events 440, while possibly not having access to the entire calendar.

Example Calendar Management Operation

Figure 11:
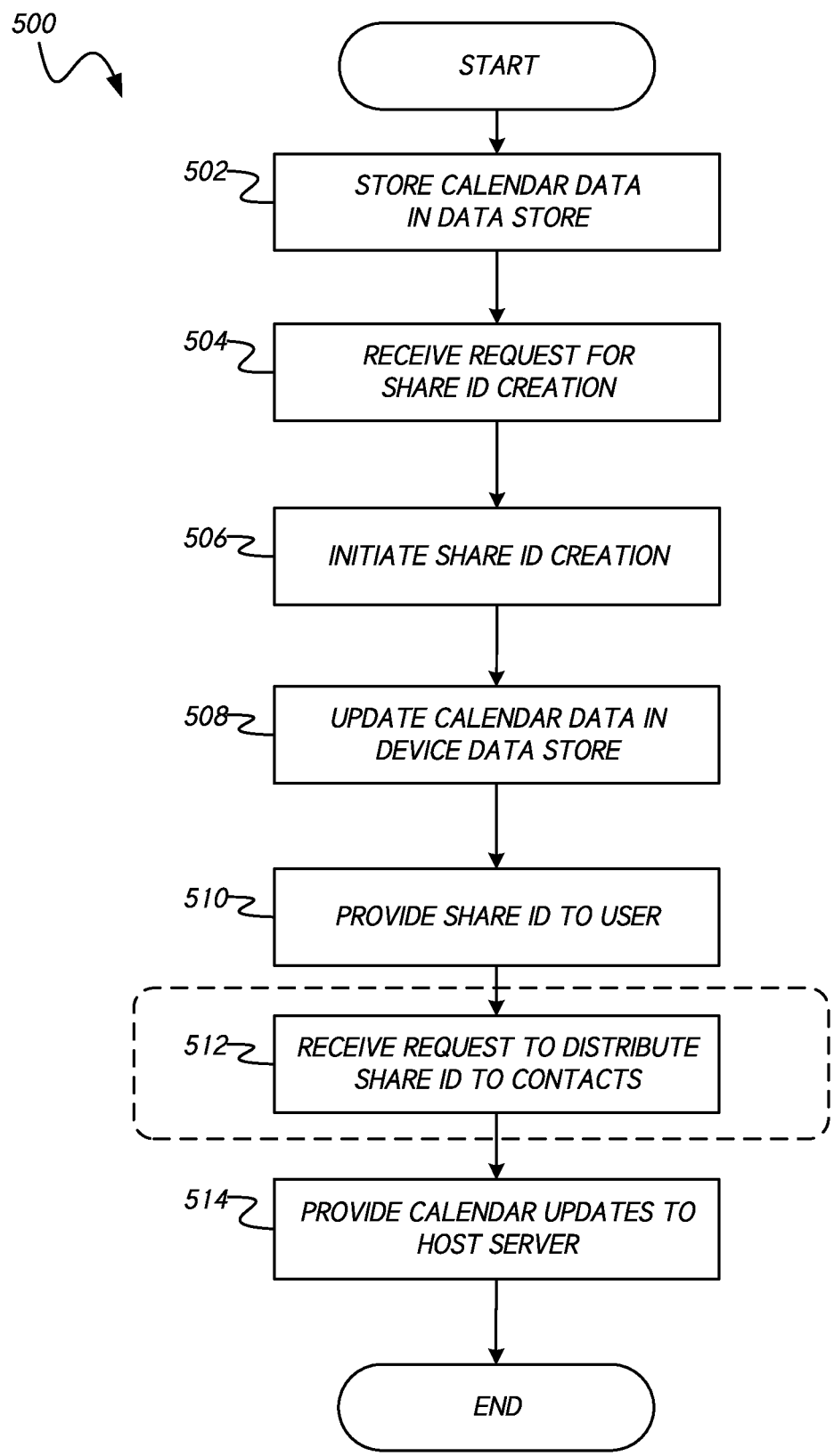
FIG. 11 is a flow diagram illustrating a process for the creation and publishing of a Share ID associated with a calendar, calendar event, and/or group of calendar events by a calendar scheduler according to one or more embodiments.

FIG. 11 is a flow diagram illustrating a process for the creation and publishing of a Share ID associated with a calendar, calendar event, and/or group of calendar events by a calendar scheduler (e.g., calendar scheduler 112) according to one or more embodiments. In certain embodiments, a calendar scheduler/user may have created and saved a calendar in a local and/or remote data store 502. As a default, a calendar object may start in a private (non-shared) state which could allow for a scheduler to make several updates before making the calendar and/or certain data associated therewith available to others. Several updates may be made to the saved calendar before moving out of this process step. After a calendar and/or group of calendar events has been created and/or identified, the process 500 may involve receiving a request for the creation of a Share ID to associate with a calendar, a calendar event, and/or group of calendar events 504. Upon receipt of the request, the system may initiate the creation of the Share ID as represented in process step 506. The Share ID creation may be processed on the device in whole, and/or may include other/additional requests provided to a host server to create and/or validate the Share ID. Upon receipt of a Share ID, the process 500 may involve the calendar system updating the calendar data in the device's data store with the new Share ID as shown in 508, and may then make the Share ID available to the calendar scheduler.

In certain embodiments, after a calendar scheduler has received a generated Share ID, a calendar scheduler may choose to distribute the Share ID via the calendar system through a selection of contacts 512, and/or a calendar scheduler may choose to distribute the Share ID via external processes. In some embodiments, the system may push a notification message directly to selected calendar users based on calendar membership information.

After a Share ID has been created and/or the calendar system has received the request to distribute the Share ID to a set of users, the device calendar system may provide the calendar update to the host server for processing, as shown in block 514. The calendar update may include calendar data and/or associated metadata, such as where a new calendar has been generated, and/or the calendar update may include changes for dissemination to the host and other devices using the Share ID.

Additional process steps may include a calendar scheduler receiving updates of Share ID use by a calendar user(s), and/or subsequent communications between client devices (e.g., client devices 110) which may or may not be associated to specific a calendar, and/or Share ID. The process 500 of FIG. 11 may be performed at least in part under the control of one or more processors or controllers of a computing device.

Figure 12:
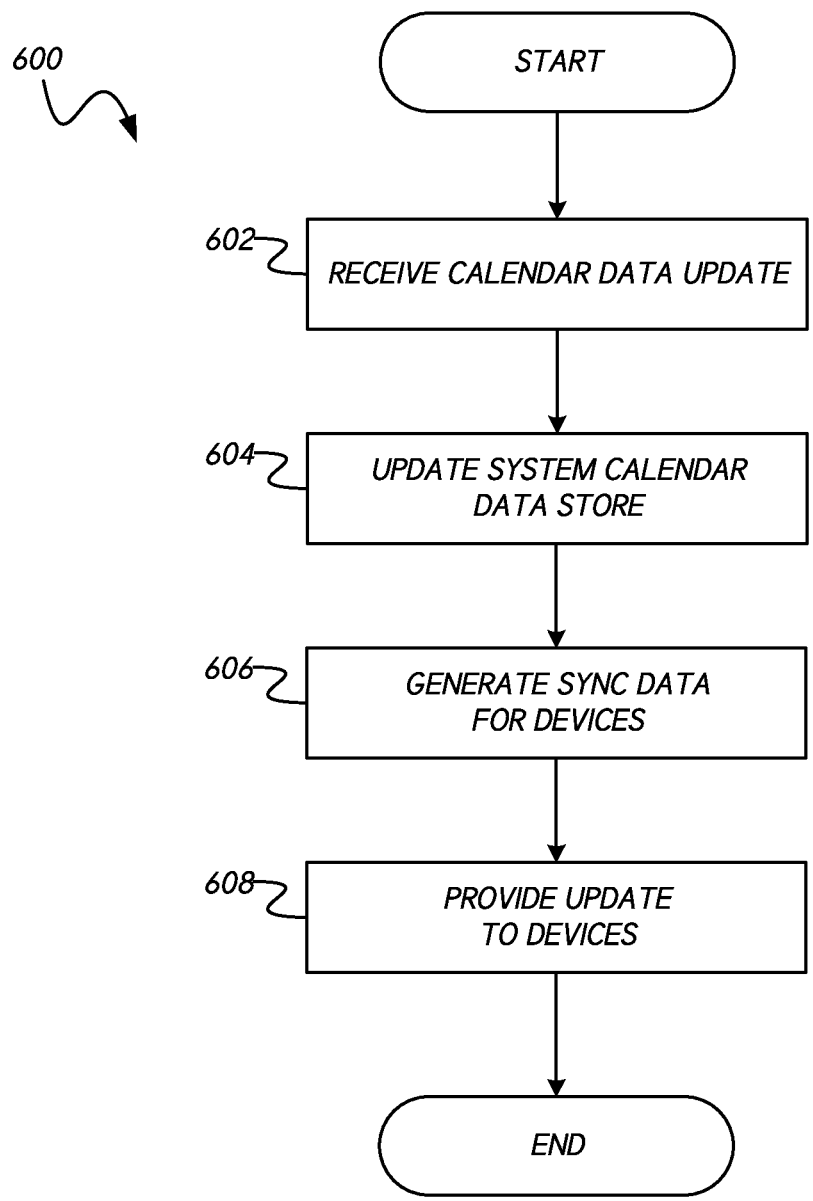
FIG. 12 is a flow diagram illustrating a process for storing and/or distributing calendar data by a host server according to one or more embodiments.

FIG. 12 is a flow diagram illustrating a process for storing and/or distributing calendar data by a host server (e.g., host server 120 in FIG. 7A) according to one or more embodiments. In certain embodiments, a host server may receive a request to update calendar data. In certain embodiments, the request may indicate a data trigger identifying the need to update other user/device calendars. A request may come from a calendar scheduler, calendar user (e.g., calendar user 114), other calendar system(s), and/or other servers/services. Calendar data may be converted into calendar system data types if received from a different calendar system format through by an integration management module, for example. In one embodiment, the request may include and/or refer to media data and/or discussion data. For example, if a user adds one or more media items to an event/meeting, the event/meeting (e.g., the event object) may be updated to include media data for the one or more media items. In another example, if a user transmits a message (e.g., a chat message) about an event/meeting, the event/meeting (e.g., the event object) may be updated to include the discussion data.

An update to calendar data may contain calendar data for a new calendar (e.g., calendar object), and/or updates to a current calendar, as specified. After receipt and/or possible conversion of calendar data formats, the calendar data may be updated in the system calendar data store 604.

After the system calendar data store is updated, the calendar system may generate synchronization data (block 606) to be distributed to client devices. For example, synchronization data may comprise a set of notifications to push to users via a sockets service list and/or associated targets for calendar ID. The notification on the client device may trigger a pull of the calendar data. Synchronization data may include, but would not be limited to, notification messages, calendar change history, summarized calendar data, and/or other data. In certain embodiments, this data may be substantially immediately processed by the system, such as where the client devices are actively connected to the calendar system and an immediate push of calendar data updates is desired or possible, such as through the use of sockets and a target list of active users/devices. In certain other embodiments, this process step may not be immediate, and/or instead triggered by a calendar user request for an update of calendar data.

After synchronization data has been created, the system may provide calendar data updates to a client device as identified by the Share ID in process step 608. A calendar user requesting calendar data may be provided updates according to one or more identified Share ID(s). The process 600 of FIG. 12 may be performed at least in part under the control of one or more processors or controllers of a computing device.

Figure 13:
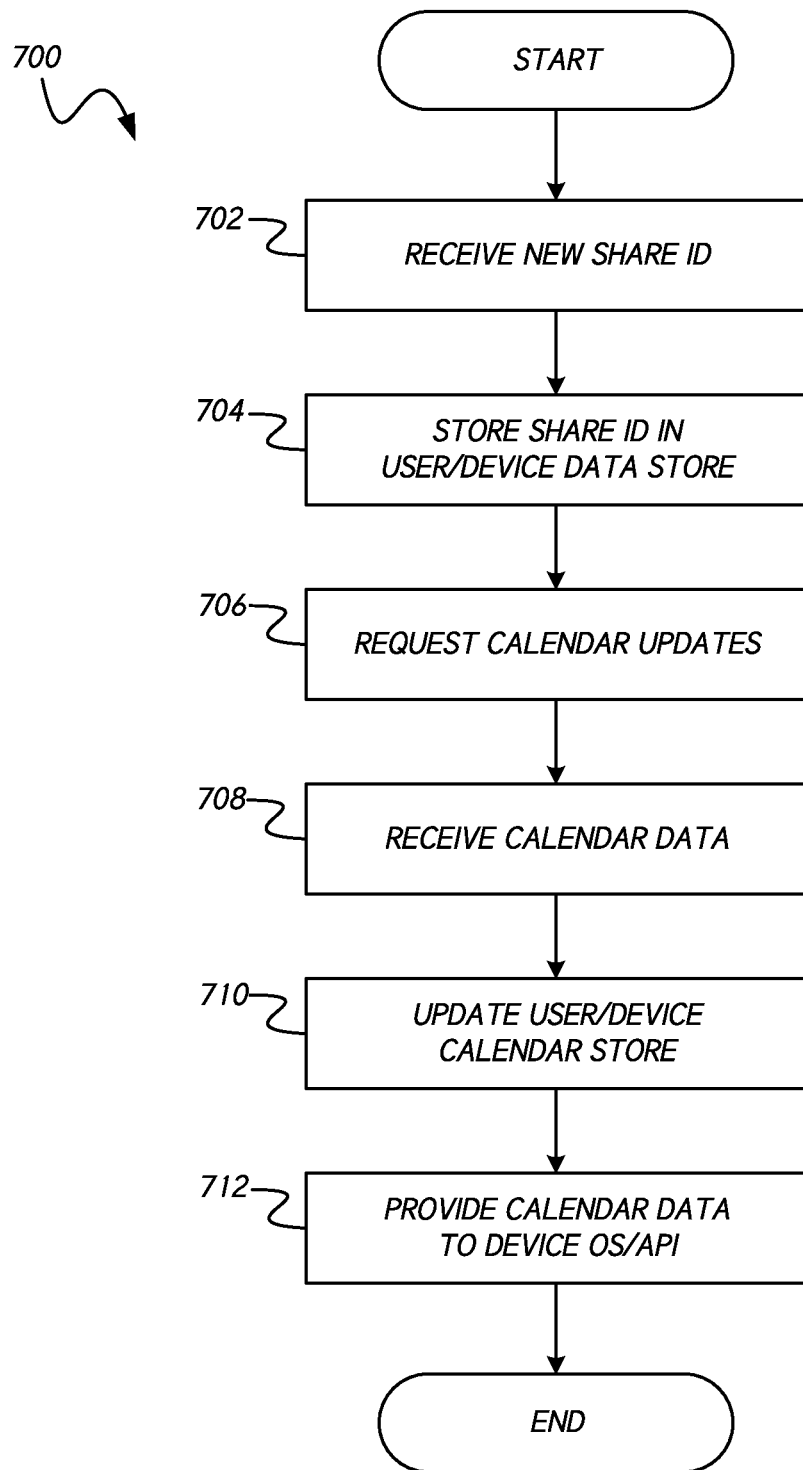
FIG. 13 is a flow diagram illustrating a process for the use of a Share ID by a calendar user associate one or more calendars to a client device according to one or more embodiments.

FIG. 13 is a flow diagram illustrating a process for the use of a Share ID by a calendar user associate one or more calendars to a client device according to one or more embodiments. In step 702, a Share ID is received by the calendar system on a client device. In certain embodiments, the receipt of a Share ID may be via the calendar system whereas in other certain embodiments, the receipt of a Share ID may be initiated via calendar user entry, and/or other process.

Upon receipt of a new Share ID, the calendar system may store the Share ID in the device's local data store 704 for persistent storage of calendar Share IDs.

After update of the data store with a new Share ID, a device's calendar system may request calendar updates from a host server and/or other server/service, as shown in block 706. In certain embodiments, the request for calendar updates may be initiated by a calendar user, and/or autonomously by the calendar system. The request for calendar updates may include one or more Share ID(s). In addition to providing initial calendar information, the host server may provide the device and Share ID information to synchronization and/or communication modules for immediate registration for future calendar updates.

In step 708, a device's calendar system receives calendar data as possibly determined by the synchronization and communication modules. Upon receipt of calendar data, the calendar system may convert the calendar data into a calendar system data type. In certain embodiments, a conversion of data into a device's native calendar data type may occur where an update of a device's native calendar system is desired. After receipt and/or possible data conversion, the calendar system may store the calendar data to the device's calendar data store in step 710. In certain embodiments, schedule conflict alerts may be raised to the user at this time for resolution. In one embodiment, media data and/or discussion data may be included as part of the calendar data. Media data identifies one or more media items associated with an event/meeting and discussion data represents one or more messages (e.g., a discussion) for an event/meeting, as discussed above.

In the next step 712, the calendar system provides the calendar data to the device OS/API for possible further processing such as user notification, device event context updates, and/or native calendar updates.

In certain embodiments, additional process steps may include client communications such as secondary distribution of Share ID(s), text and/or video messaging, device location information, device calendar status receipt, external system notifications, and/or account maintenance activities. The process 700 of FIG. 13 may be performed at least in part under the control of one or more processors or controllers of a computing device.

Figure 14:
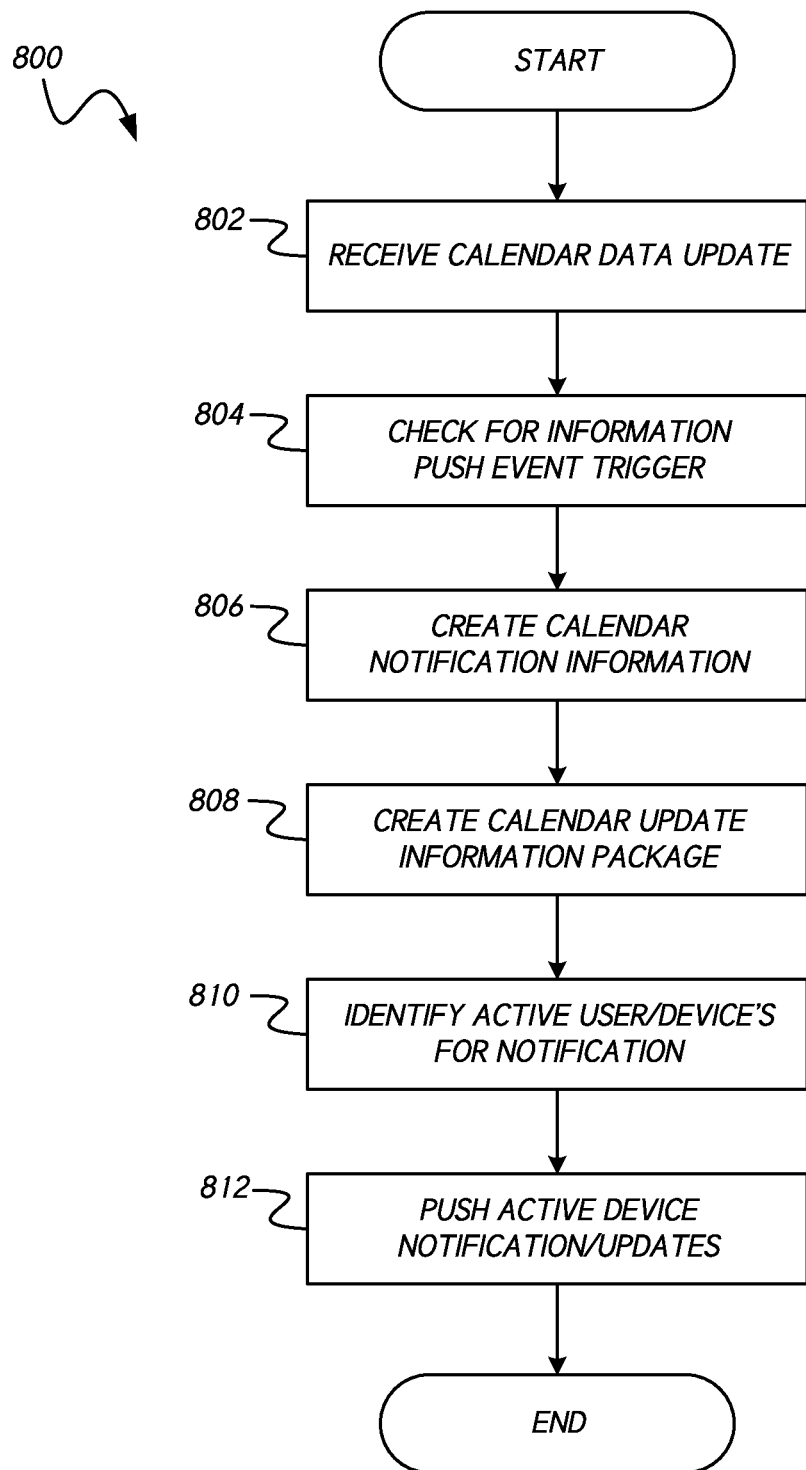
FIG. 14 is a flow diagram illustrating a process for the refresh of calendar information on multiple devices by an event trigger, notification and update according to one or more embodiments.

FIG. 14 is a flow diagram illustrating a process for the refresh of calendar information on multiple devices by an event trigger, notification and update according to one or more embodiments. In step 802, the system has received an update of information for a specific event, group of events, calendar, and/or group of calendars. The system update may be anywhere the calendar information has been persisted. The update of information may be to calendar specific information and/or to calendar metadata as determined by specific embodiment. In some embodiments, the update of information may include media data and/or discussion data.

In step 804, the system checks for a combination of information elements determined to require and/or desire an update of information on any other user/client device. For example, in some embodiments the triggering information may be a calendar status change to a "published" state, change to a calendar event time/location, and/or a preset time duration interval from a prior update status. In another example, adding media data (e.g., adding a new media item to an event/discussion), modifying media data (e.g., changing media items associated with an event/discussion), and/or adding discussion data (e.g., adding one or more messages to a discussion for an event/meeting) may be triggers/triggering information. Multiple combinations of event triggers may be configured as needed to achieve an appropriate balance between resource utilization and immediate information availability and refresh frequency.

Once the requirement for a calendar update has been made, step 806 depicts the creation of appropriate notification information based on the notification event triggering parameters. In some embodiments, the notification information may be tailored as desired for individual user/device consumption or otherwise maintained at the calendar/event level.

In step 808, the creation of a calendar update information package in an embodiment represents the preparation of a set of calendar information for delivery to user/devices. Creation of an update information package may be done in any way to facilitate the refresh of calendar information appropriate to the triggering event determined in 804. In some embodiments, the range of information package data may be from an incremental change information package and/or through a complete refresh of calendar information. The information package will contain all information required by a user/device to be in sync with the calendar information as per calendar update.

Upon package of calendar update information, the system will identify and verify any active user/devices to be targeted for calendar update notification and information update in step 810. An example of such identification could be to gather a status on users/devices in current communication to the system. The determination of an "active" user/device may be based on the end-to-end communication platform available between devices and may be tailored as such to maximize efficacy.

In step 812, the system will transmit the calendar update information package as has been determined for a specific user/device as identified by step 810. Whether synchronous or asynchronous communications is used may be determined by embodiment and communication platform implementation.

In some embodiments, the user/device may continue according to general device update processing similar to that shown in step 708.

Figure 15:
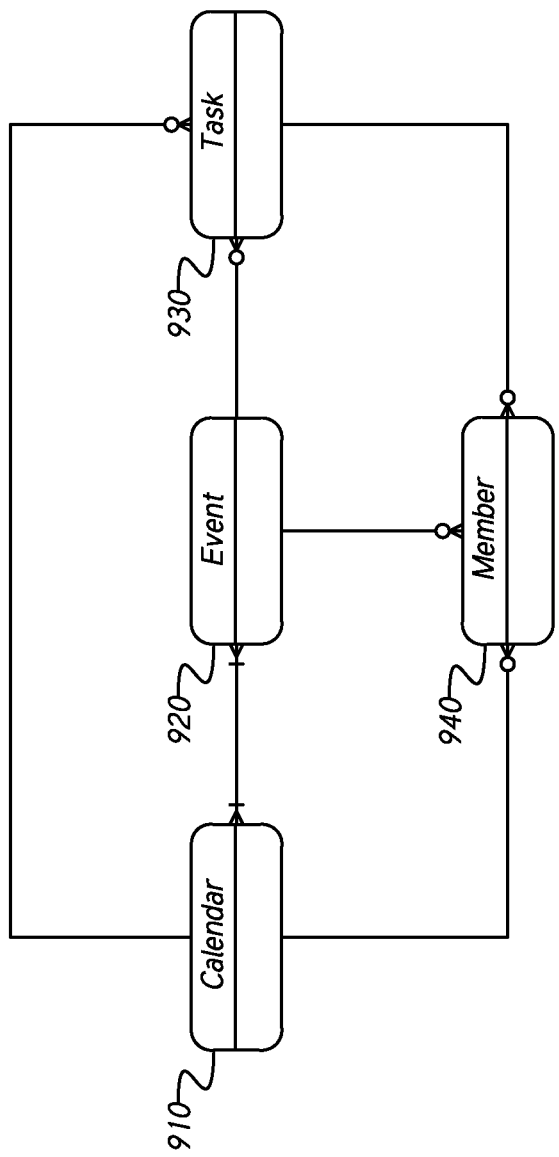
FIG. 15 is an entity-relationship diagram illustrating a conceptual modelling the relationship amongst calendar, events, tasks, and members entities according to one or more embodiments.

FIG. 15 is an entity-relationship diagram illustrating a conceptual modelling the relationship amongst calendar, events, tasks, and members entities according to one or more embodiments.

The calendar 910 may represent one or more embodiments of possible instances of a calendar entity which may be used in connection with one or more embodiments of calendar management systems and/or methods disclosed herein. In certain embodiments, a calendar 910 may represent a single instance of a calendar or may represent a group of one or more individual calendar instances. A calendar may have an association to one or more events 920. A calendar may also have an association to one or more tasks 930 and an association to one or more members 940.

The event 920 may represent one or more embodiments of possible instances of an event entity which may be used in connection with one or more embodiments of calendar management systems and/or methods disclosed herein. In certain embodiments, an event 920 may represent a single instance of an event or may represent a group of one or more individual event instances. An event may have an association to one or more calendars 910. An event may also have an association to one or more tasks 930 and an association to one or more members 940.

The task 930 may represent one or more embodiments of possible instances of a calendar entity which may be used in connection with one or more embodiments of calendar management systems and/or methods disclosed herein. In certain embodiments, a task 910 may represent a single instance of a task or may represent a group of one or more individual task instances. A task may have an association to one or more calendars 910. A task may also have an association to one or more events 920 and an association to one or more members 940.

The member 940 may represent one or more embodiments of possible instances of a calendar entity which may be used in connection with one or more embodiments of calendar management systems and/or methods disclosed herein. In certain embodiments, a member 940 may represent a single instance of a member or may represent a group of one or more individual member instances. A member may have an association to one or more calendars 910. A member may also have an association to one or more events 920 and an association to one or more tasks 930.

Figure 16:
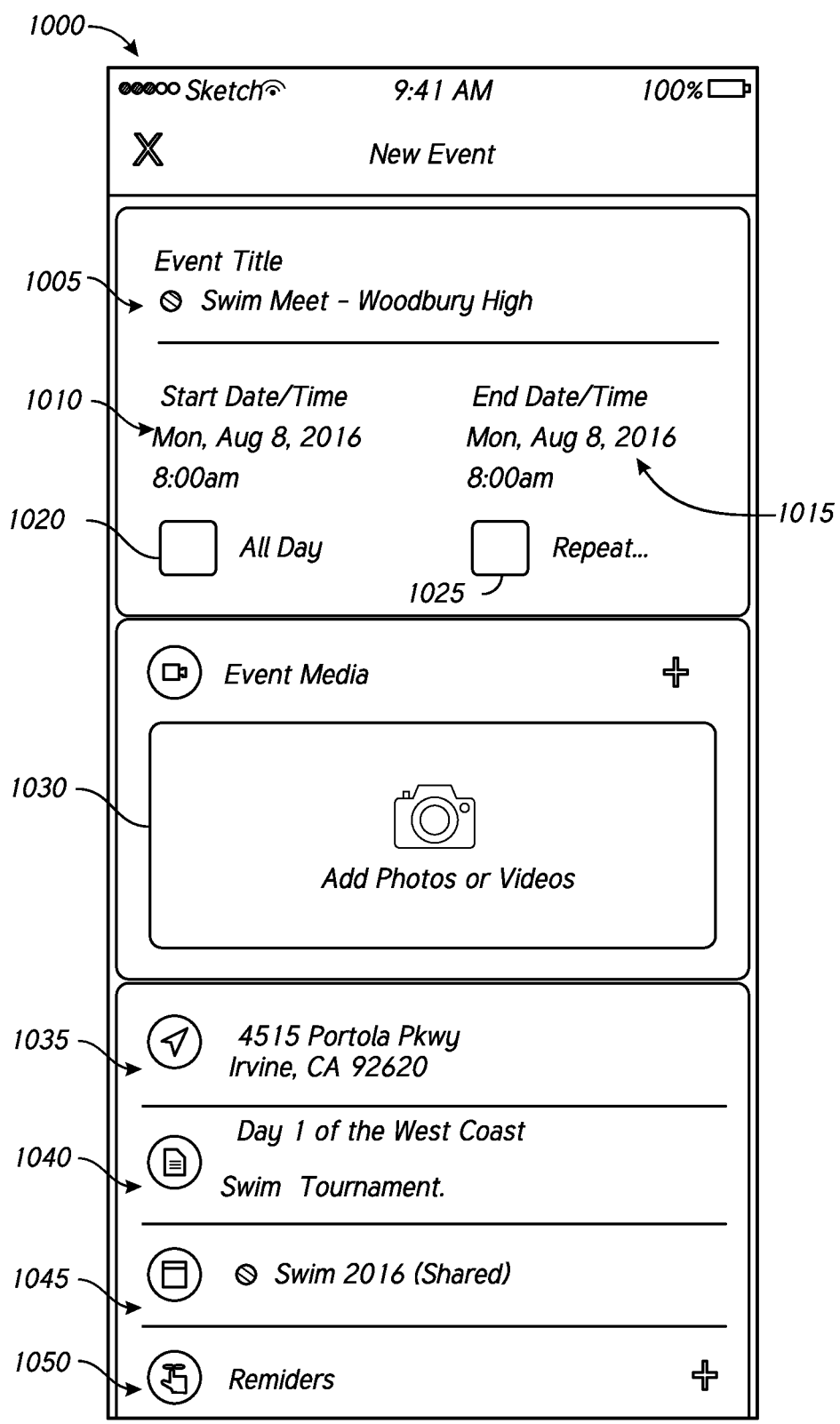
FIG. 16 is a diagram illustrating an example graphical user interface (GUI) according to one or more embodiments.

FIG. 16 is a diagram illustrating an example GUI 1000 according to one or more embodiments. In one embodiment, the GUI 1000 may be an interface for creating a new event/meeting and/or modifying an existing event/meeting. The GUI 1000 may be presented by a calendar application (e.g., an app, an application, a program, a software module/component, etc.) that may allow a user to create/modify events/meetings and may be used to invite other users to the event/meeting. The calendar application (e.g., app) may be executing/operating on a computing device (e.g., a client device) of a user (e.g., a smartphone, a tablet computer, etc.). In another embodiment, the GUI 1000 may be a webpage provided/presented by a calendar platform. For example, the GUI 1000 may be presented by and/or displayed within a web browser when the user accesses or logs into a calendar platform via the web browser. The GUI 1000 includes a buttons 1005, 1010, 1015, 1030, 1035, 1040, 1045, and 1050. The GUI 1000 also includes checkboxes 1020 and 1025. Although the GUI 1000 is illustrated using buttons, checkboxes, text fields, etc., one having ordinary skill in the art understands that other embodiments may use links and/or other graphical user interface controls or elements in place of one or more of the buttons, checkboxes, text fields, etc.

Button 1005 may allow the user to specify a name for the event (and/or to modify the name for the event). Activating (e.g., pressing, clicking, tapping, etc.) button 1005 may cause the GUI 1000 to present a text field that may allow the user to specify/modify the name for the event. Buttons 1010 and 1015 may allow the user to specify/modify a start time and an end time for the event, respectively. Activating button 1010 or button 1015 may cause the GUI 1000 to present a text field or another GUI that displays a monthly calendar, to allow the user to specify/modify the start time or end time.

Activating button 1035 may cause GUI 1000 to present a text field or a map that may allow the user to specify/modify the location for the meeting/event. Activating button 1040 may cause the GUI 1000 to present a text field to allow the user to specify/modify notes and/or other information about the event/meeting (e.g., the purpose of the meeting, an agenda, items to bring to the meeting, etc.). Activating button 1045 may cause the GUI 1000 to present a list of calendars that may include the event/meeting. This may allow the calendar platform to associate the meeting/event (or the event object for the meeting/event) with different calendars (or calendar objects). Activating button 1050 may cause the GUI 1000 to present a monthly calendar, a clock, a text field, etc., that may allow the user to specify a time for a reminder (for the event/meeting).

Activating button 1030 may cause the GUI 1000 to present buttons, lists, text fields, other user interface elements, etc., to allow the user to indicate one or more media items that should be included in and/or associated with the event/meeting (which are discussed in more detail below). This may allow the user to provide more information about the event/meeting in the event object. For example, including media items may allow the user to provide video/pictures of an event venue, video/pictures of speakers/attendees of the event, video/pictures of food that will be provided at the event, etc. As discussed above, a media item may be content such as digital video, digital images, digital audio, text, etc.

Figure 17:
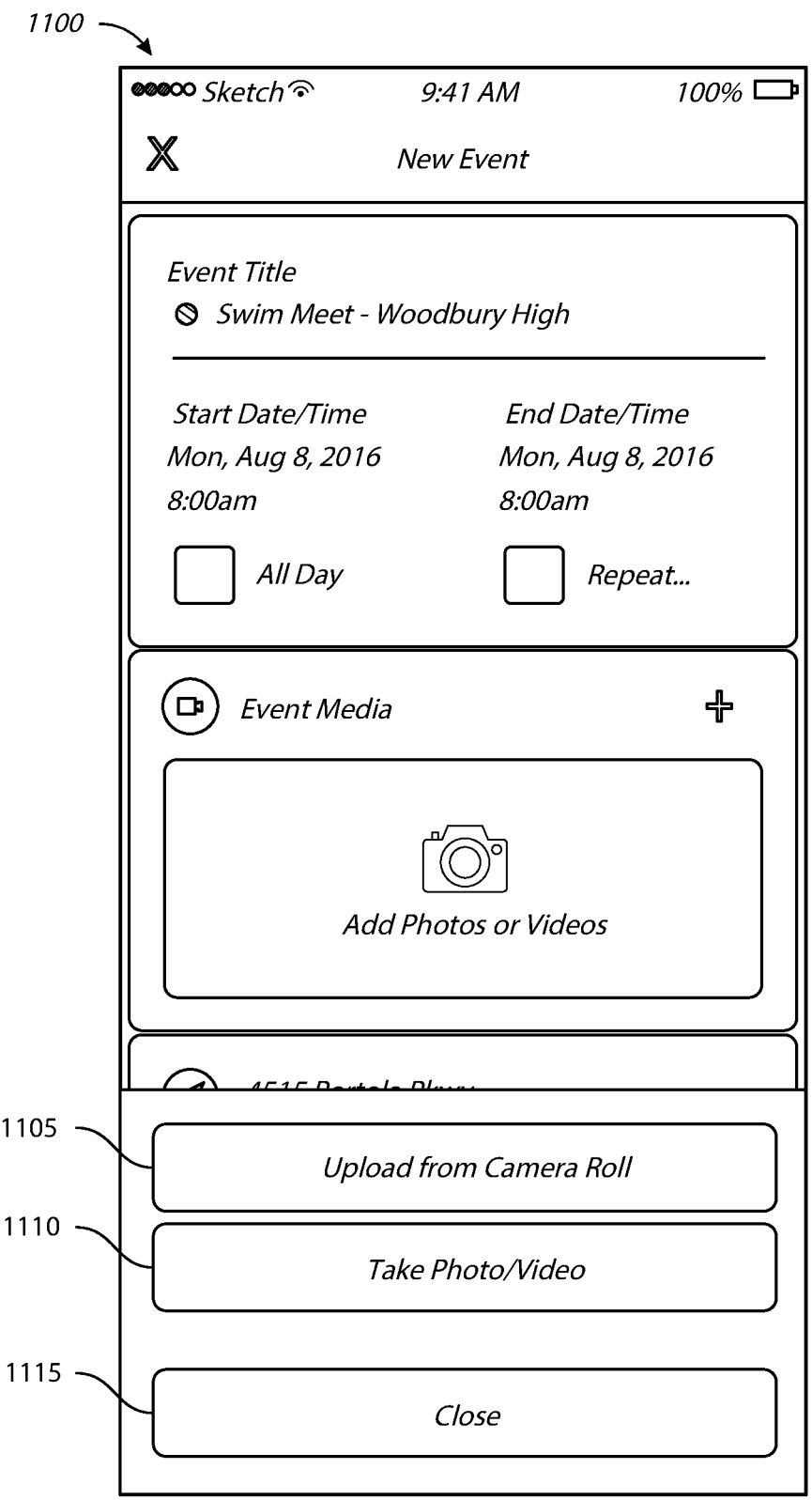
FIG. 17 is a diagram illustrating an example GUI according to one or more embodiments.

FIG. 17 is a diagram illustrating an example GUI 1100 according to one or more embodiments. In one embodiment, the GUI 1100 may be an interface for selecting one or more media items to be included in and/or associated with an event/meeting. The GUI 1100 may be presented by a calendar application (e.g., an app, an application, a program, a software module/component, etc.) executing on a user's computing device, as discussed above. In another embodiment, the GUI 1100 may be a webpage provided/presented by a calendar platform, as discussed above. The GUI 1100 includes a buttons 1105, 1110, and 1115. Although the GUI 1100 is illustrated using buttons, one having ordinary skill in the art understands that other embodiments may use links and/or other graphical user interface controls or elements in place of one or more of the buttons.

As discussed above, a user may want to include one or more media items (e.g., videos, images, audio, etc.) in an event/meeting that has been scheduled on one or more calendars. The GUI 1100 may be presented when the user activates (e.g., clicks, taps, selects, presses, etc.) button 1030 illustrated in FIG. 16. Activating button 1105 may allow the user to select one or more media items from that are stored on the user's computing device (e.g., that are stored on the user's smartphone or tablet computer). In one embodiment, a media viewer application (e.g., a default "camera roll") of the device may be presented when the user activates button 1105. In another embodiment, the GUI 1100 may present another user interface that allows the user to view/select media items stored on the user's computing device (e.g., the calendar app may include a media viewer/selector).

Activating button 1110 may allow the user to create one or more new media items (e.g., to take a picture and/or record a video). In one embodiment, a camera application (e.g., a default camera app on a smartphone/tablet computer) may be presented when the user activates button 1110. In another embodiment, the GUI 1100 may present another user interface to take one or more pictures/videos (e.g., the calendar app may include a camera app). Activating button 1115 may allow the user to return to the previous GUI (e.g., GUI 1000 illustrated in FIG. 16).

Figure 18:
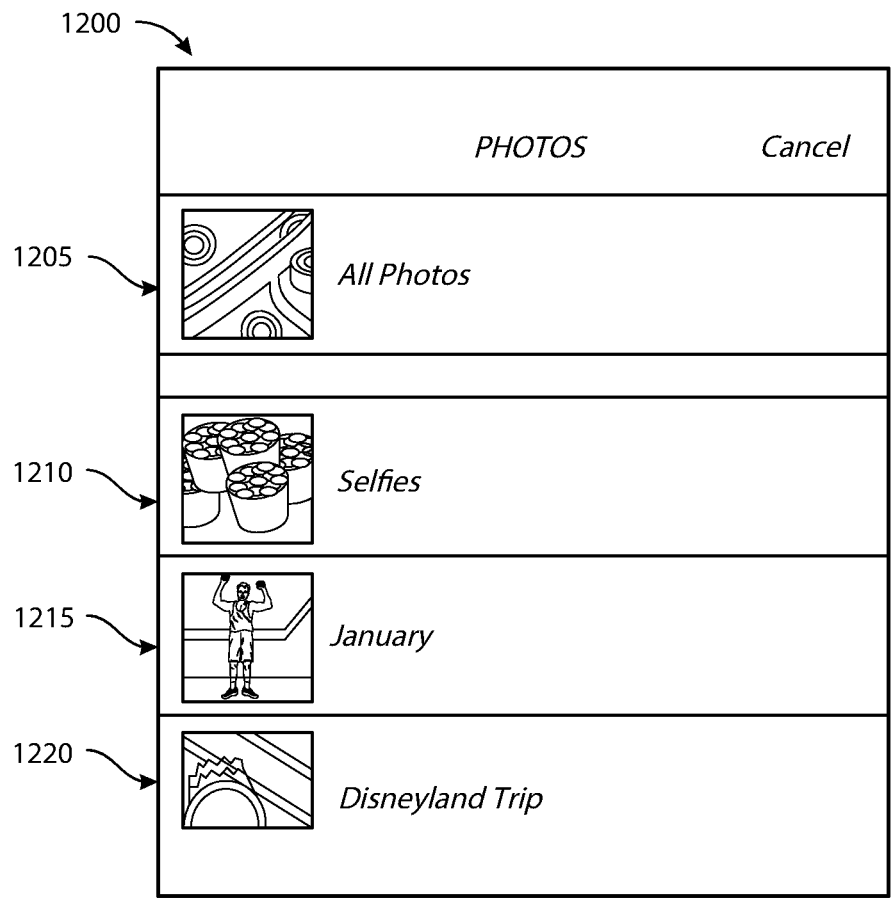
FIG. 18 is a diagram illustrating an example GUI according to one or more embodiments.

FIG. 18 is a diagram illustrating an example GUI 1200, in accordance with some embodiments of the present disclosure. In one embodiment, the GUI 1200 may be an interface for selecting one or more media items to be included in and/or associated with an event/meeting. The GUI 1200 may be presented by a media viewer/player application (e.g., an app, an application, a program, a software module/component, etc.) executing on a user's computing device, as discussed above. The GUI 1200 includes buttons 1205, 1210, 1215, and 120. Although the GUI 1200 is illustrated using buttons, one having ordinary skill in the art understands that other embodiments may use links and/or other graphical user interface controls or elements in place of one or more of the buttons. The GUI 1200 may be presented by a media player/viewer application (e.g., a "camera roll"). The media player/viewer application may be a separate application or may be part of the calendar application.

Activating button 1205 (e.g., the "All Photos" button) may allow the user to view a list (e.g., a complete list) of all of the media items (e.g., videos, pictures, etc.) that are stored on the user's computing device. For example, activating button 1205 may cause a list of thumbnails to be presented to the user. The thumbnails may be previews of the videos and/or images that are stored on the user's computing devices. As illustrated in FIG. 18, the button 1205 may include a thumbnail (e.g., preview) of one or more of the media items that are stored in the user's computing device. Activating one of the buttons 1210, 1215, or 1220 may allow the user to view different groups (e.g., albums) of media items. For example, activating button 1210 may allow the user to view a list of media items (e.g., videos and/or pictures) that are in the "Selfies" group/album. Each of the buttons 1210, 1215, and 1220 may also include a thumbnail of one or more media items that are in a respective group/album. For example, button 1215 may include a thumbnail of one or more media items in the "January" group/album.

The groups/albums illustrated in FIG. 18 are merely examples. One having ordinary skill in the art understands that that a user's computing device may include fewer or more albums and that the albums may sort media items various factors/criteria such as time, location, subject matter, user preferences, etc.

Figure 19:
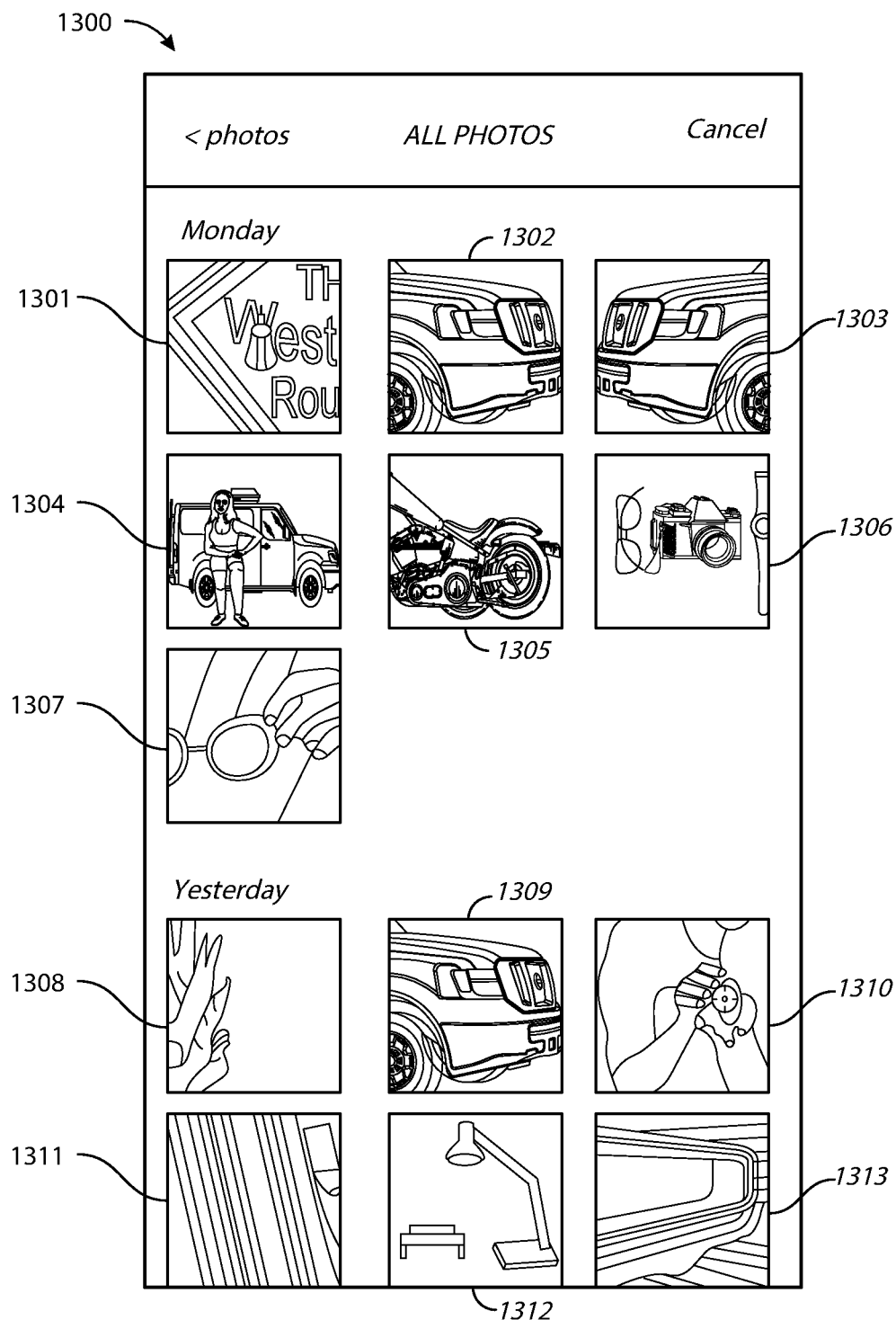
FIG. 19 is a diagram illustrating an example GUI according to one or more embodiments.

FIG. 19 is a diagram illustrating an example GUI 1300, in accordance with some embodiments of the present disclosure. In one embodiment, the GUI 1300 may be an interface for selecting one or more media items to be included in and/or associated with an event/meeting. The GUI 1300 may be presented by a media viewer/player application (e.g., an app, an application, a program, a software module/component, etc.) executing on a user's computing device, as discussed above. The GUI 1300 may be presented when the user activates button 1205 (illustrated in FIG. 18). The GUI 1300 includes a plurality of thumbnails 1301-1313 (e.g., previews of media items). In one embodiment, each of the thumbnails 1301-1313 may function as a checkbox and/or a button. Although the GUI 1300 is illustrated using thumbnails, buttons, checkboxes, etc., one having ordinary skill in the art understands that other embodiments may use links and/or other graphical user interface controls or elements in place of one or more of the thumbnails, buttons, checkboxes, etc. The GUI 1300 may be presented by a media player/viewer application (e.g., a "camera roll"). The media player/viewer application may be a separate application or may be part of the calendar application.

Each of the thumbnails 1301-1313 illustrated in FIG. 19 may represent a media item that is stored on the user's computing device. As illustrated in FIG. 19, the top seven thumbnails 1301-1307 may represent media items (e.g., pictures) on the user's computing device that were created on Monday. The bottom six thumbnails 1308-1313 may represent media items that were created Sunday (i.e., Yesterday). The thumbnails 1301-1313 may allow the user to select one or more media items to include in an event/meeting for one or more calendars. For example, the thumbnails 1301-1313 may allow the user to select a video of a meeting venue for an event/meeting. In one embodiment, the user may activate (e.g., block, press, tap, tap and hold, etc.) a thumbnail to select the media item represented by the thumbnail, as discussed in more detail below.

Figure 20:
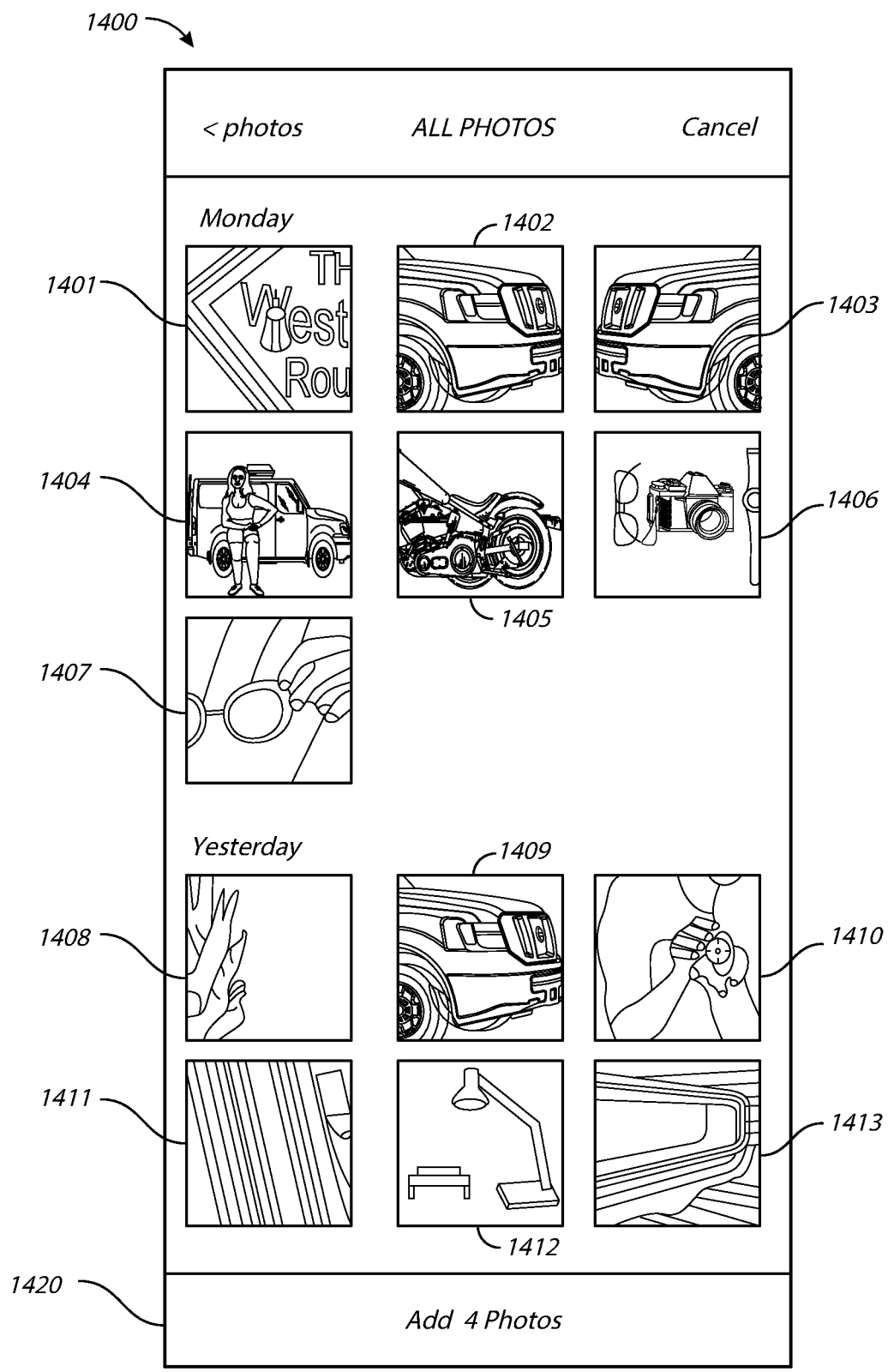
FIG. 20 is a diagram illustrating an example GUI according to one or more embodiments.

FIG. 20 is a diagram illustrating an example GUI 1400, in accordance with some embodiments of the present disclosure. In one embodiment, the GUI 1400 may be an interface for selecting one or more media items to be included in and/or associated with an event/meeting. The GUI 1400 may be presented by a media viewer/player application (e.g., an app, an application, a program, a software module/component, etc.) executing on a user's computing device, as discussed above. The GUI 1400 may be presented when the user activates one or more thumbnails. The GUI 1400 includes a plurality of thumbnails 1401-1413 (e.g., previews of media items) and button 1420. In one embodiment, each of the thumbnails 1401-1413 may function as a checkbox and/or a button. Although the GUI 1400 is illustrated using thumbnails, buttons, checkboxes, etc., one having ordinary skill in the art understands that other embodiments may use links and/or other graphical user interface controls or elements in place of one or more of the thumbnails, buttons, checkboxes, etc. The GUI 1400 may be presented by a media player/viewer application (e.g., a "camera roll"). The media player/viewer application may be a separate application or may be part of the calendar application.

Each of the thumbnails 1401-1413 illustrated in FIG. 20 may represent a media item that is stored on the user's computing device, as discussed above. As illustrated in FIG. 20, the user has selected thumbnails 1401, 1405, 1407 and 1409. This may indicate that the user wants to include the media items represented by the thumbnails 1401, 1405, 1407 and 1409, to be included in an event/meeting that is in one or more calendars. The GUI 1400 may allow the user to select additional media items (by activating additional thumbnails) or by unselecting a media item (by activating one of thumbnails 1401, 1405, 1407, or 1409). When the user is done selecting/unselecting thumbnails, the user may activate (e.g., press, tap, click etc.) button 1420. Activating button 1420 may cause the calendar application (or webpage) to store the selected media items on one or more servers. For example, the calendar application may store the selected media items (represented by thumbnails 1401, 1405, 1407, and 1409) on a storage server.

Figure 21:
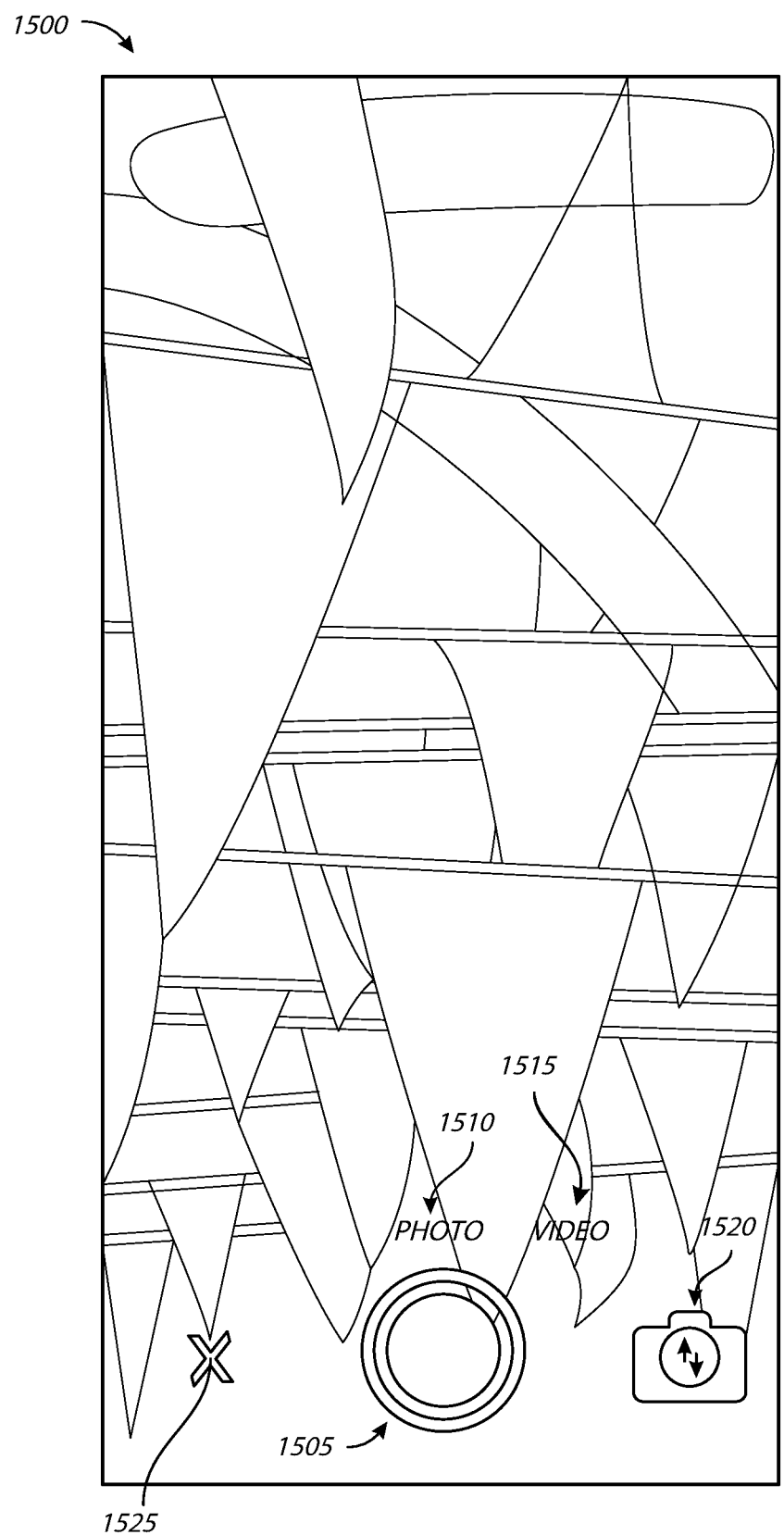
FIG. 21 is a diagram illustrating an example GUI according to one or more embodiments.

FIG. 21 is a diagram illustrating an example GUI 1500, in accordance with some embodiments of the present disclosure. In one embodiment, the GUI 1500 may be an interface for creating a new media item to be included in and/or associated with an event/meeting. The GUI 1500 may be presented by a camera application (e.g., an app, an application, a program, a software module/component, etc.) executing on a user's computing device, as discussed above. The GUI 1500 may be presented when the user activates button 1110 illustrated in FIG. 17. The GUI 1500 includes buttons 1505, 1510, 1515, 1520, and 1525. Although the GUI 1500 is illustrated using buttons, one having ordinary skill in the art understands that other embodiments may use links and/or other graphical user interface controls or elements in place of one or more of the buttons. The GUI 1500 may be presented by a camera application (e.g., a camera app) on the user device. The media player/viewer application may be a separate application or may be part of the calendar application.

The GUI 1500 may display the images/video that are captured by the camera and/or camera application of a user device. Activating (e.g., pressing, clicking, tapping, etc.) button 1510 may allow a user to capture an image (e.g., take a picture, create a media item) when the button 1505 is activated. Activating button 1515 may allow the user to capture a video (e.g., take a video, create a media item) when the button 1505 is activated. Activating 1505 may allow a user to take a picture and/or a video, based on whether button 1510 or button 1515 is activated. Activating button 1520 may allow the user to switch between using a forward-facing camera or a rear-facing camera of the computing device. Activating button 1525 may allow the user to return to a previous user interface (e.g., GUI 1100 illustrated in FIG. 17).

Figure 22:
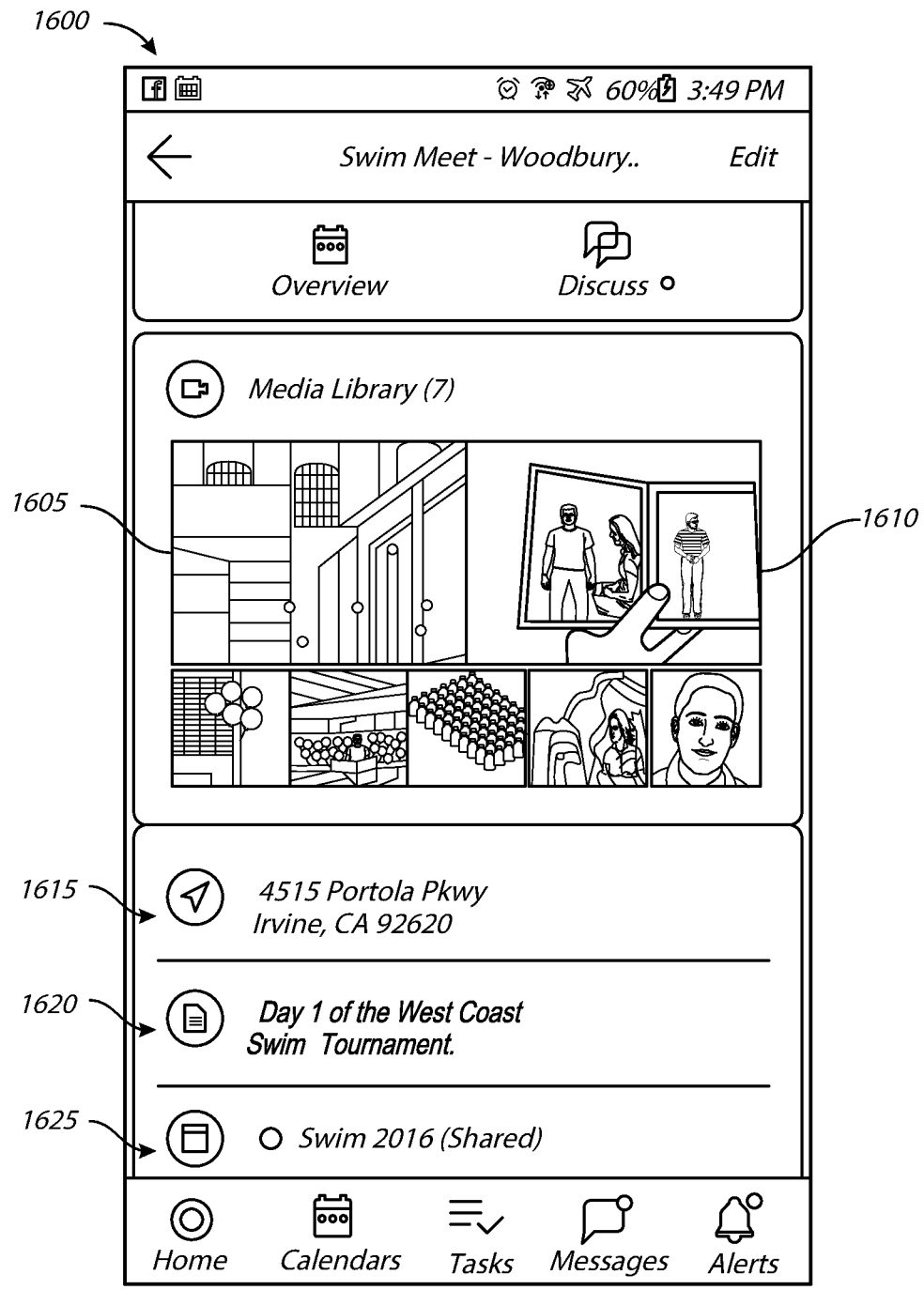
FIG. 22 is a diagram illustrating an example GUI according to one or more embodiments.

FIG. 22 is a diagram illustrating an example GUI 1600 according to one or more embodiments. In one embodiment, the GUI 1600 may be an interface for creating a new event/meeting and/or modifying an existing event/meeting. The GUI 1600 may be presented by a calendar application (e.g., an app, an application, a program, a software module/component, etc.) that may allow a user to create/modify events/meetings and may be used to invite other users to the event/meeting. The calendar application (e.g., app) may be executing/operating on a computing device of a user (e.g., a smartphone, a tablet computer, etc.). In another embodiment, the GUI 1600 may be a webpage provided/presented by a calendar platform. For example, the GUI 1600 may be presented by and/or displayed within a web browser when the user accesses or logs into a calendar platform via the web browser. The GUI 1600 includes various thumbnails (including thumbnails 1605 and 1610) and buttons 1615, 1620, and 1625. Although the GUI 1600 is illustrated using buttons, thumbnails, etc., one having ordinary skill in the art understands that other embodiments may use links and/or other graphical user interface controls or elements in place of one or more of the buttons, thumbnails, etc.

The GUI 1600 may present information about an event/meeting (e.g., a "Swim Meet") that has been created for one or more calendars. Button 1615 may allow a user to specify a location (e.g., a new location) for the event/meeting. Button 1615 may also provide information about the current location of the event/meeting (e.g., the button 1615 may indicate the address "4515 Portola Pkwy, Irvine, CA 92620"). Button 1620 may allow a user to provide additional information (e.g., notes, an agenda, etc.) for the event/meeting. Button 1625 may indicate one or more calendars that include the event/meeting indicated in GUI 1600.

As illustrated in FIG. 22, the GUI 1600 includes a plurality of thumbnails. The thumbnails may represent media items that have been associated with the event/meeting by a user (e.g., an administrator, a creator of the event/meeting, etc.). The user may activate one of the thumbnails to view the media item represented by a corresponding thumbnail. For example, when the user activates thumbnail 1605, a media player/viewer application may be presented to the user. The media player/view application may play the movie (e.g., media item) that is represented by thumbnail 1605. In another example, when the user activates thumbnail 1610, the media player/viewer may display the picture (e.g., media item) that is represented by thumbnail 1610. In one embodiment, the media items may be accessed from storage server (e.g., a cloud storage platform) to display/present the media item to the user. For example, a video may be streamed from the storage server when the user activates thumbnail 1605. In another example, a picture (e.g., an image) may be downloaded from the storage server when the user activates thumbnail 1610.

Figure 23:
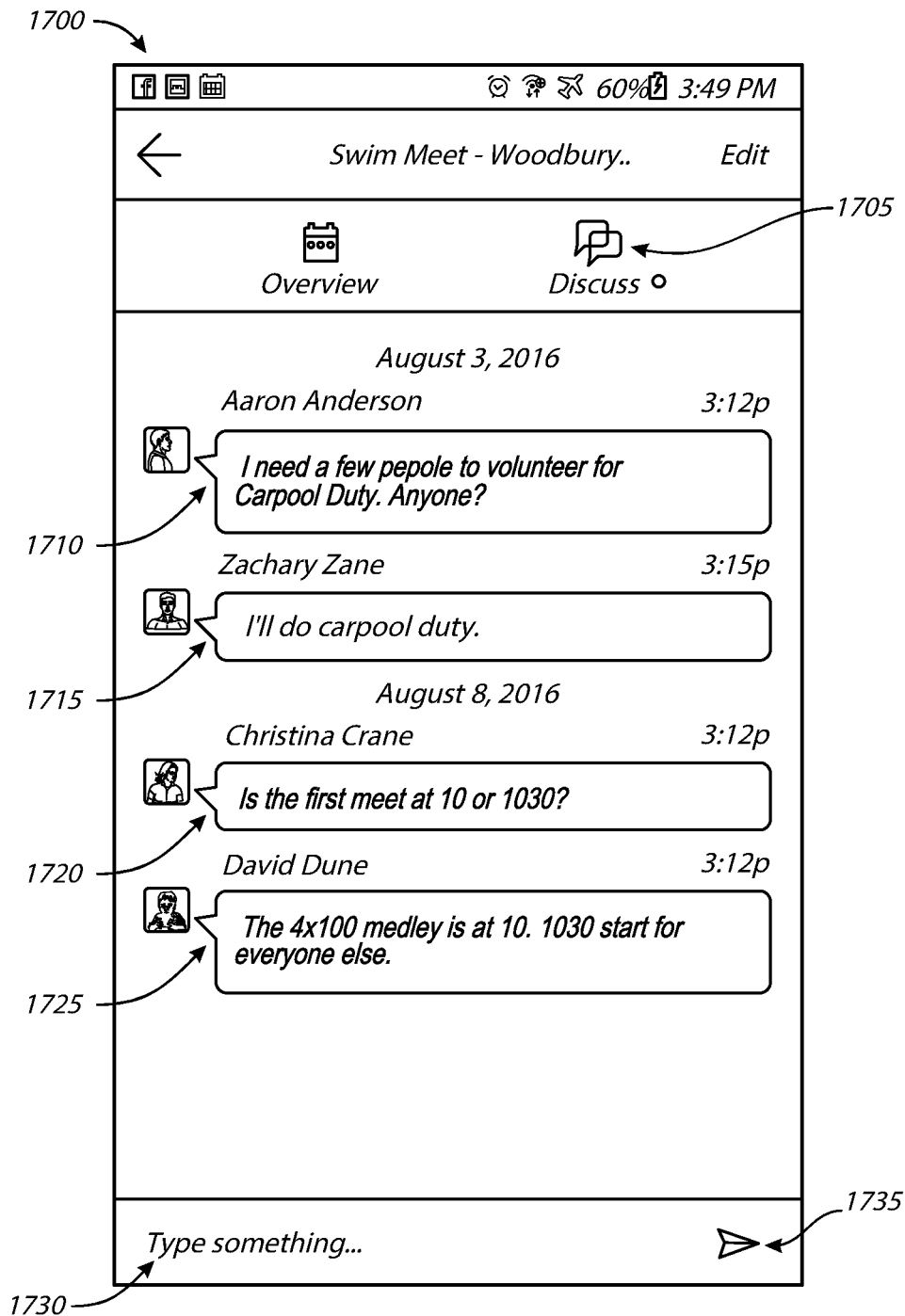
FIG. 23 is a diagram illustrating an example GUI according to one or more embodiments.

FIG. 23 is a diagram illustrating an example GUI 1700 according to one or more embodiments. In one embodiment, the GUI 1700 may be an interface viewing one or more messages associated with an event/meeting. The GUI 1700 may be presented by a calendar application (e.g., an app, an application, a program, a software module/component, etc.) that may allow a user to create/modify events/meetings and may be used to invite other users to the event/meeting. The calendar application (e.g., app) may be executed/operated on a computing device of a user (e.g., a smartphone, a tablet computer, etc.). In another embodiment, the GUI 1700 may be a webpage provided/presented by a calendar platform. For example, the GUI 1700 may be presented by and/or displayed within a web browser when the user accesses or logs into a calendar platform via the web browser. The GUI 1700 includes button 1705, text field 1730, button 1735, and messages 1710, 1715, 1520, and 1720. Although the GUI 1700 is illustrated using buttons, text fields, etc., one having ordinary skill in the art understands that other embodiments may use links and/or other graphical user interface controls or elements in place of one or more of the buttons, text fields, etc.

As illustrated in FIG. 23, a user may activate (e.g., click, select, tap, etc.) button 1705. When button 1705 is activated, the GUI 1700 may present one or messages (e.g., messages 1710-1725) related to or associated with an event/meeting. The messages 1710-1725 may be associated with the event/meeting illustrated in FIG. 22 (e.g., the "Swim Meet" event/meeting). The messages 1710-1729 may be part of a discussion related to or associated with the event/meeting. In one embodiment, the messages 1710-1725 may be from users who are authorized to access/view the event/meeting. In another embodiment, the messages 1710-1725 may be from users who have indicated that they will attend the event/meeting. The messages 1710-1725 may allow the users to communicate additional information related to the event/meeting. For example, the messages 1710-1725 may allow users to coordinate when activities in the event/meeting will occur, to coordinate transportation to the event/meeting etc. The messages 1710-1725 may also be referred to as chat messages, chats, text messages, text, multimedia messages, etc.

In one embodiment, the GUI 1700 may present one or more additional buttons or other user interface elements (not illustrated in FIG. 23) to allow the user to add media items to a discussion (e.g., to write a message that includes a media item). For example, the GUI 1700 may present one or more buttons similar to button 1105, 1110, and 1115 illustrated in FIG. 17. Activating these buttons may cause the GUI 1700 to present user interfaces similar to those illustrated in FIGS. 18-21 (e.g., GUI 1200, GUI 1300, GUI 1400, GUI 1500, etc.) to allow the user to select a media item (from a computing device of the user) to be added to a message. This may allow users to exchange messages (e.g., chat messages) to discuss various aspects and/or information for an event/meeting.

In one embodiment, the storage server may be separate from the calendar platform. For example, the storage server may be part of a cloud storage platform. In another embodiment, the storage server may be part of the cloud storage platform, as discussed above.

ADDITIONAL EMBODIMENTS

In accordance with and/or in addition to the various embodiments and features disclosed above, certain additional embodiments and features fall within the scope of the present disclosure. For example, in certain embodiments, no traditional email communications are required for certain calendar notifications.

Calendar synchronization in accordance with embodiments disclosed herein may be implemented in various novel ways. For example, in certain embodiments, a single notification may be used for multi-calendar/multi-event updates; multiple calendar events may push to individual users by single notification. Certain embodiments provide for indirect public calendar sharing. For example, a shared calendar may be made available for anyone to access without direct invitation by the calendar owner/manager through sharing of link or calendar ID.

Systems, devices and methods disclosed herein may be used in any practical or desirable application or use case. As an example implementation, when a calendar update is published, multiple process steps and/or entities may be involved, such as the following possible entities/steps: a publish calendar message object may be sent from user device to user calendar manager on server; on the server, a listening service may trigger a calendar synchronization event; an event trigger object may be sent a synchronization manager service; a synchronization service module/device may push calendar update data object to other client devices; client devices may apply calendar update data object and return acknowledgement response; and/or other entities/steps.

In certain embodiments, new user setup and/or identification may be implemented at least in part by the following steps: a new user downloads an application to a device; a new user setup of and account without email communication may be implemented. Furthermore, calendar creation and/or updates may be implemented at least in part using one or more of the following steps: a user creates a private calendar; the user creates an event within the private calendar providing for calendar synchronization; the user may download an application on another device and set up the same account on a second device; the user may update events within a private calendar on the first device and view updates on the second device.

In certain embodiments, multi-event/multi-user calendar publication may be implemented using one or more of the following steps: a calendar owner may create a shared calendar; the calendar owner may create multiple events and may assign individual users to events; the calendar owner may publish the calendar; individual users may receive single calendar notification push to devices; the calendar owner may update several events within the calendar and republish the entire calendar.

In certain embodiments public sharing of a shared calendar may be implemented using one or more of the following steps: a calendar owner may make a shared calendar link/identifier available to the public (e.g., via web/voice), or a subsection thereof; a non-calendar user may obtain the calendar link/identifier and wish to join the calendar; the user may submit the share identifier to a calendar management server, and thereby be granted access to the calendar by the calendar management server.

Those skilled in the art will appreciate that in some embodiments, other types of calendar management systems can be implemented while remaining within the scope of the present disclosure. In addition, the actual steps taken in the processes discussed herein may differ from those described or shown in the figures. Depending on the embodiment, certain of the steps described above may be removed, and/or others may be added.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

The various illustrative logical blocks, modules, data structures, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, data structures, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices—for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, a hard disk, a removable disk, a CD-ROM, memory capable of storing firmware, or any other form of computer-readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concur-

EXAMPLE CLAUSES

Example A, a method of visualizing and managing data structures, the method comprising: generating, by control circuitry of a service provider, first user interface data representing a first visual representation of at least a portion of a first time-based data structure associated with a first user; transmitting, by the control circuitry, the first user interface data to a first device associated with the first user; receiving, by the control circuitry and from the first device, event data indicating a data-streaming event and multiple values to associate with the data-streaming event, the multiple values including an acquisition value; based at least in part on the event data: generating, by the control circuitry, event object data indicative of the data-streaming event, the event object data including multiple parameters; associating, by the control circuitry, the multiple values with the multiple parameters, respectively; and storing, by the control circuitry, the event object data in association with the first time-based data structure; generating, by the control circuitry, second user interface data representing a second visual representation of at least a portion of the first time-based data structure and a third visual representation of at least a portion of the event object data; transmitting, by the control circuitry, the second user interface data to a second device associated with a second user; receiving, by the control circuitry and from the second device, a data access request to acquire access to the data-streaming event; based at least in part on the data access request, performing, by the control circuitry, an authorization process to acquire access to the data-streaming event for the acquisition value; upon authorizing the second user, associating, by the control circuitry, at least a portion of the event object data with a second time-based data structure associated with the second user; receiving, by the control circuitry, real-time image data and an identifier indicative of the data-streaming event; based at least in part on the identifier, associating, by the control circuitry, the real-time image data with the event object data; determining, by the control circuitry, that the second time-based data structure is associated with the event object data; and based at least in part on the determination, transmitting, by the control circuitry, the real-time image data to the second device.

Example B, the method of Example A, further comprising: in response to storing the event object data in association with the first time-based data structure: determining that the second user has subscribed to receive data regarding the first time-based data structure; and transmitting, to the second device, a notification indicative of the data-streaming event.

Example C, the method of Example A or B, further comprising: receiving, while the real-time image data is being displayed via the second device, feedback data for the real-time image data, the feedback data being indicative of how the real-time image data is being received; associating the feedback data with the real-time image data; and transmitting at least a portion of the feedback data to the first device.

Example D, the method of any of Examples A-C, further comprising: generating indicator data representing an indicator for the third visual representation indicative of the event object data being associated with a real-time event; and transmitting the indicator data to the second device.

Example E, the method of any of Examples A-D, further comprising: analyzing a plurality of data structures associated with a plurality of users, respectively; based at least in part on the analysis, generating metric data indicative of a most available time period within the plurality of data structures, the plurality of users including the second user; and transmitting the metric data to the first device.

Example F, the method of any of Examples A-E, further comprising: generating metric data indicative of a total number of acquisitions of the data-streaming event; and transmitting the metric data to the first device.

Example G, the method of any of Examples A-F, further comprising: generating metric data indicative of a total number of acquisitions of events associated with the first user; and transmitting the metric data to the first device.

Example H, a system comprising: control circuitry; and memory communicatively coupled to the control circuitry and storing executable instructions that, when executed by the control circuitry, cause the control circuitry to perform operations comprising: generating first user interface data representing a first visual representation of at least a portion of a first time-based data structure associated with a first user, the first time-based data structure including a plurality of data slots associated with a plurality of time periods, respectively; sending the first user interface data to a first device associated with the first user; receiving, from the first device, event data indicating a data-streaming event and multiple values to associate with the data-streaming event, the multiple values including an acquisition value; generating event object data indicative of the data-streaming event, the event object data including the multiple values; storing the event object data in association with the first time-based data structure; generating second user interface data representing a second visual representation of at least a portion of the first time-based data structure and a third visual representation of at least a portion of the event object data; sending the second user interface data to a second device associated with a second user; receiving, from the second device, a data access request to acquire access to the data-streaming event; based at least in part on the data access request, performing an authorization process to acquire access to the data-streaming event for the acquisition value; associating at least a portion of the event object data with a second time-based data structure associated with the second user; receiving real-time image data; and sending the real-time image data to the second device or a third device associated with the second user.

Example I, the system of Example H, wherein the operations further comprise: in response to storing the event object data in association with the first time-based data structure: determining that the second user has subscribed to receive data regarding the first time-based data structure; and causing display of, via the second device or a third device associated with the second user, a notification indicative of the data-streaming event.

Example J, the system of Example H or I, wherein the operations further comprise: receiving feedback data for the real-time image data, the feedback data being indicative of how the real-time data is being received; and sending at least a portion of the feedback data to the first device or a fourth device associated with the first user.

Example K, the system of any of Examples H-J, wherein the operations further comprise: generating indicator data representing an indicator for the third visual representation indicative of the event object data being associated with a real-time event; and sending the indicator data to the second device.

Example L, the system of any of Examples H-K, wherein the operations further comprise: analyzing a plurality of data structures associated with a plurality of users, respectively; based at least in part on the analysis, generating metric data indicative of a most available time period within the plurality of data structures, the plurality of users including the second user; and sending the metric data to the first device or a fourth device associated with the first user.

Example M, the system of any of Examples H-L, wherein the operations further comprise: generating metric data indicative of a total number of acquisitions of the data-streaming event; and sending the metric data to the first device or a fourth device associated with the first user.

Example N, the system of any of Examples H-M, wherein the operations further comprise: generating metric data indicative of a total number of acquisitions of events associated with the first user; and sending the metric data to the first device or a fourth device associated with the first user.

Example O, one or more non-transitory computer-readable media storing computer-executable instructions that, when executed by control circuitry, cause the control circuitry to perform operations comprising: causing display of a first user interface that includes a first visual representation of at least a portion of a first time-based data structure associated with a first user, the first time-based data structure including a plurality of data slots associated with a plurality of time periods, respectively; receiving event data indicating a data-streaming event and multiple values to associate with the data-streaming event, the multiple values including an acquisition value; generating event object data indicative of the data-streaming event, the event object data including the multiple values; storing the event object data in association with the first time-based data structure; causing display of a second user interface that includes a second visual representation of at least a portion of the first time-based data structure and a third visual representation of at least a portion of the event object data; receiving a data access request to acquire access to the data-streaming event; based at least in part on the data access request, performing an authorization process to acquire access to the data-streaming event for the acquisition value; associating at least a portion of the event object data with a second time-based data structure associated with the second user; receiving real-time image data and an identifier indicative of the data-streaming event; and based at least in part on the identifier, causing display of the real-time image data via the second user interface.

Example P, the one or more non-transitory computer-readable media of Example O, wherein the operations further comprise: in response to storing the event object data in association with the first time-based data structure: determining that the second user has subscribed to receive data regarding the first time-based data structure; and causing display of, via the second user interface, a notification indicative of the data-streaming event.

Example Q, the one or more non-transitory computer-readable media of Example O or P, wherein the operations further comprise: receiving feedback data for the real-time image data, the feedback data being indicative of how the real-time data is being received; and causing display of, via the first user interface at least a portion of the feedback data.

Example R, the one or more non-transitory computer-readable media of any of Examples O-Q, wherein the operations further comprise: causing display of, via the second user interface, an indicator indicative of the event object data being associated with a real-time event.

Example S, the one or more non-transitory computer-readable media of any of Examples O-R, wherein the operations further comprise: analyzing a plurality of data structures associated with a plurality of users, respectively; identifying a most available time period within the plurality of data structures based at least in part on the analysis, the plurality of users including the second user; and causing display of a notification indicative of the most available time period.

Example T, the one or more non-transitory computer-readable media of any of Examples O-S, wherein the operations further comprise: determining a collective acquisition value associated with at least one of (i) acquisitions of the data-streaming event or (ii) acquisitions of the data-streaming event and a plurality of other data-streaming events associated with the first user; and causing display of the collective acquisition value.

Example AA, a calendar management device comprising: a non-volatile data storage medium; a user input interface; a wireless transmitter; and a controller configured to: generate a calendar object configured to store unique calendar user identifiers identifying users associated with the calendar object and one or more event objects, each of the one or more event objects comprising an authorization value; generate a calendar share identifier associated with the calendar object; store the calendar object in the non-volatile data storage medium; cause the calendar share identifier to be provided to each of a plurality of calendar users; receive user input via the user input interface, the user input indicating a new event associated with the calendar object; in response to the user input: determine an authorization level of the new event based on the user input; generate a calendar event object comprising the authorization level; and automatically send a publication request to a remote server over a network using the wireless transmitter; receive media data indicative of one or more media items associated with the new event; and associate the media data with the event object.

Example BB, the calendar management device of Example AA, wherein the controller is further configured to: store the one or more media items on a storage server.

Example CC, the calendar management device of Example AA or BB, wherein the media data comprises links to the one or more media items.

Example DD, the calendar management device of any of Examples AA-CC, wherein the controller is further configured to: receive discussion data indicative of one or more messages associated with the new event; and associate the discussion data with the event object.

Example EE, the calendar management device of Example DD, wherein the discussion data comprises one or more messages from one or more users authorized to access the new event.

Example FF, the calendar management device of Example EE, wherein the discussion data further comprises media data indicative of one or more media items associated with the one or more messages.

Example GG, the calendar management device of any of Examples AA-FF, wherein said sending the publication request directs the remote server to determine a subset of the plurality of calendar users based on the authorization level and to send the event object to each of the subset of the plurality of calendar users.

Example HH, the calendar management device of any of Examples AA-GG, wherein the controller is further configured to receive an acknowledgement response from each of the plurality of calendar users in response to said causing the calendar share identifier to be provided to each of the plurality of calendar users.

Example II, the calendar management device of Example HH, wherein the controller is further configured to, in response to receiving the acknowledgment responses, store unique user identifiers associated with each of the plurality of calendar users in the non-volatile data storage media as part of the calendar object.

Example JJ, the calendar management device of any of Examples AA-II, wherein the controller is further configured to transmit the calendar object and the calendar share identifier to the remote server over the network using the wireless transmitter.

Example KK, the calendar management device of Example JJ, wherein when one of the plurality of calendar users provides the share identifier to the remote server, said providing the share identifier directs the remote server to provide a copy of the calendar object to the one of the plurality of calendar users.

Example LL, a method for managing calendar data using a calendar management device, the method comprising: generating a calendar object configured to store unique calendar user identifiers identifying users associated with the calendar object and one or more event objects, each of the one or more event objects comprising an authorization value; generating a calendar share identifier associated with the calendar object; storing the calendar object in a non-volatile data storage medium; causing the calendar share identifier to be provided to each of a plurality of calendar users; receiving user input via a user input interface, the user input indicating a new event associated with the calendar object; in response to said receiving the user input: determining an authorization level of the new event based on the user input; generating a calendar event object comprising the authorization level; and automatically sending a publication request to a remote server over a network using a wireless transmitter; receiving media data indicative of one or more media items associated with the new event; and associating the media data with the event object.

Example MM, the method of Example LL, further comprising: storing the one or more media items on a storage server.

Example NN, the calendar management device of Example LL or MM, wherein the media data comprises links to the one or more media items.

Example OO, the method of any of Examples LL-NN, further comprising: receiving discussion data indicative of one or more messages associated with the new event; and associating the discussion data with the event object.

Example PP, the method of any of Examples LL-OO, wherein said sending the publication request directs the remote server to determine a subset of the plurality of calendar users based on the authorization level and to send the event object to each of the subset of the plurality of calendar users.

Example QQ, a calendar management system comprising: a master scheduler device; a plurality of calendar user devices; and a remote calendar management server configured to be communicatively coupled to the master scheduler device and the one or more recipient devices over a network; wherein the master scheduler device is configured to: generate a calendar object configured to store unique calendar user identifiers identifying users associated with the calendar object and one or more event objects, each of the one or more event objects comprising an authorization value; generate a calendar share identifier associated with the calendar object; store the calendar object in a non-volatile data storage medium; cause the calendar share identifier to be provided to the plurality of calendar user devices; receive user input via a user input interface, the user input indicating a new event associated with the calendar object; in response to said receiving the user input: determine an authorization level of the new event based on the user input; generate a calendar event object comprising the authorization level; and automatically send a publication request to a remote server over a network using the wireless transmitter; receive media data indicative of one or more media items associated with the new event; and associate the media data with the event object.

Example RR, the calendar management system of Example QQ, wherein the master scheduler device is further configured to: store the one or more media items on a storage server.

Example SS, the calendar management system of Example QQ or RR, wherein the master scheduler device is further configured to: receive discussion data indicative of one or more messages associated with the new event; and associate the discussion data with the event object.

Example TT, the calendar management system of any of Examples QQ-SS, wherein said sending the publication request directs the remote calendar management server to determine a subset of the plurality of calendar user devices based on the authorization level and to send the event object to each of the subset of the plurality of calendar user devices.

What is claimed is:

1. A method for managing calendar data for a calendar associated with a social media site, the method comprising:
    generating a calendar object representing a calendar;
    generating a calendar share identifier associated with the calendar object;
    storing the calendar object in a data storage medium;
    identifying a plurality of calendar users associated with the social media site;
    causing the calendar share identifier to be provided to each of the plurality of calendar users;
    receiving user input data for a streaming event to associate with the calendar object;
    generating a calendar event object indicative of the streaming event;
    associating the calendar event object with the calendar object;
    causing update data to be sent to one or more devices associated with one or more of the plurality of calendar users, the update data indicating the streaming event;
    providing a first graphical user interface to a first user, the first graphical user interface including one or more first graphical interface elements to receive media data to associate with the streaming event;
    receiving video data to associate with the streaming event;
    linking the video data to the calendar event object;
    providing a second graphical user interface that includes information about the streaming event and one or more second graphical interface elements to access the video data;
    receiving, via the second graphical user interface, a request for a second user to access the calendar event object;
    facilitating a payment process for the second user to access the streaming event;
    authorizing the second user to access the streaming event based at least in part on social media account information associated with the second user;

and providing the second user with access to the video data based on successful completion of the authorization and payment process.

2. The method of claim 1, further comprising:
storing the video data on a storage server.

3. The method of claim 1, further comprising:
receiving discussion data; and
associating the discussion data with the calendar event object.

4. The method of claim 1, further comprising:
determining a subset of the plurality of calendar users based at least in part on an authorization level;
wherein the update data is sent to each of the subset of the plurality of calendar users.

5. The method of claim 1, further comprising:
determining if individual ones of the plurality of calendar users are associated with a user contacts list;
wherein the calendar share identifier is provided to each of the plurality of calendar users based at least in part on if individual ones of the plurality of calendar users are associated with the user contacts list.

6. A calendar management system for a social media site comprising:
one or more non-transitory computer-readable media; and
one or more controllers communicatively coupled to the one or more non-transitory computer-readable media to:
generate a calendar object representing a calendar;
generate a calendar share identifier associated with the calendar object;
store the calendar object;
identify a plurality of calendar users associated with the social media platform;
sending the calendar share identifier to a plurality of calendar user devices associated with the plurality of calendar users, respectively;
receive user input data for a streaming event to associate with the calendar object;
generate a calendar event object indicative of the streaming event;
associate the calendar event object with the calendar object;
cause update data to be sent to one or more of the plurality of calendar user devices, the update data indicating the streaming event;
provide a first graphical user interface to a first user, the first graphical user interface including one or more first graphical interface elements to receive media data to associate with the streaming event;
receive video data to associate with the streaming event;
link the video data to the calendar event object;
provide a second graphical user interface that includes information about the streaming event, and one or more second graphical interface elements to access the video data;
receive, via the second graphical user interface, a request for a second user to access the calendar event object;
facilitate payment processing for the second user to access the streaming event;
authorize the second user to access the streaming event based at least in part on social media account information associated with the second user; and
provide the second user with access to the video data based on successful completion of the payment and authorization.

7. The calendar management system of claim 6, wherein the one or more controllers
stores the video data on a storage server.

8. The calendar management system of claim 6, wherein the one or more controllers
receives discussion data; and
associates the discussion data with the calendar event object.

9. The calendar management system of claim 6, wherein the one or more controllers
determines a subset of the plurality of calendar user devices based at least in part on an authorization level;
wherein the calendar event object is sent to each of the subset of the plurality of calendar user devices.

10. The calendar management system of claim 6, wherein the sending the calendar share identifier to the plurality of calendar user devices comprises sending the share identifier to the plurality of calendar user devices without sending another email notification to the plurality of calendar users.

11. The calendar management system of claim 6, wherein the one or more controllers
determines that individual ones of the plurality of calendar users are associated with a user contacts list;
wherein the calendar share identifier is sent to the plurality of calendar user devices based at least in part on determining that individual ones of the plurality of calendar users are associated with the user contacts list.

* * * * *